United States Patent
Greer et al.

(10) Patent No.: US 9,430,462 B2
(45) Date of Patent: Aug. 30, 2016

(54) GUIDED ARTICLE AUTHORSHIP

(71) Applicant: Edanz Group Ltd., Fukuoka (JP)

(72) Inventors: Kerry Alexander Greer, Fukuoka (JP); Benjamin Edward Shaw, Beijing (CN); Bruce David Cummings, Evanston, IL (US); Richard Michael Parris, Beijing (CN); Warren Sean Raye, Padbury (AU); Thomas Alexandre da Costa, Fukuoka (JP)

(73) Assignee: Edanz Group Ltd., Hong Kong (CN)

( * ) Notice: Subject to any disclaimer, the term of this patent is extended or adjusted under 35 U.S.C. 154(b) by 0 days.

(21) Appl. No.: 14/444,291

(22) Filed: Jul. 28, 2014

(65) Prior Publication Data
US 2015/0039297 A1   Feb. 5, 2015

Related U.S. Application Data

(60) Provisional application No. 61/860,095, filed on Jul. 30, 2013.

(51) Int. Cl.
*G06F 17/27* (2006.01)
*H04L 29/08* (2006.01)
*H04L 29/06* (2006.01)

(52) U.S. Cl.
CPC ......... *G06F 17/2785* (2013.01); *H04L 67/141* (2013.01); *H04L 67/42* (2013.01)

(58) Field of Classification Search
CPC ................ G06F 17/2785; H04L 67/141
USPC ................................ 704/1–10, 275
See application file for complete search history.

(56) References Cited

U.S. PATENT DOCUMENTS

| | | | |
|---|---|---|---|
| 6,772,396 B1* | 8/2004 | Cronin | G06F 17/3089 345/629 |
| 2008/0147661 A1 | 6/2008 | Carden | |
| 2009/0112652 A1 | 4/2009 | Kelsey et al. | |
| 2010/0106669 A1 | 4/2010 | Guo | |
| 2010/0250341 A1 | 9/2010 | Hauser | |
| 2011/0313757 A1* | 12/2011 | Hoover | G06F 17/274 704/9 |
| 2012/0072422 A1* | 3/2012 | Rollins | G06F 17/2745 707/737 |

FOREIGN PATENT DOCUMENTS

KR   10-2002-7016713   12/2002

OTHER PUBLICATIONS

International Search Report, App. No. PCT/US2014/048677, dated Nov. 7, 2014, pp. 1-14.
Authorea, Online collaborative editor: Write papers in LaTeX and Markdown, captured Jul. 26, 2013, https://web.archive.org/web/20140726073130/https://www.authorea.com, downloaded May 13, 2016, pp. 1-4.
colwiz—Research Management, Collaboration and Productivity in one place, captured Aug. 11, 2011, https://web.archive.org/web/20110802055507/http://www.colwiz.com, downloaded May 13, 2016, pp. 1-2.

(Continued)

*Primary Examiner* — Marcellus Augustin
(74) *Attorney, Agent, or Firm* — Brinks Gilson & Lione

(57) ABSTRACT

A method includes, determining a target publication, identifying one or more content suggestions associated with the target publication, and causing a user to be prompted to input content. The input content satisfies at least a portion of the one or more content suggestions.

20 Claims, 58 Drawing Sheets

(56) References Cited

OTHER PUBLICATIONS

Write Better with draft, captured Jul. 22, 2013, https://web.archive.org/20130722205249/http://draftin.com, downloaded May 13, 2016, 1 page.

Purdy, Kevin, Draft Is a Writing App with Serious Version and Draft Control, Apr. 2, 2013, http://lifehacker.com/5993339/draft-is-a-writing-app-with-serious-versionand-draft-control, downloaded May 13, 2016, pp. 1-4.

The Idea Behind Fidus Writer, captured Aug. 29, 2013, https://web.archive.org/web/20130829044607/http://fiduswriter.org/how-, downloaded May 13, 2016, pp. 1-2.

Compiled list of software writing tools, Mar. 27, 2013, pp. 1-4.

SquareCirclez, The IntMath blog, Review: writeLaTeX (now Overleaf), captured Jul. 22, 2013, http://www.intmath.com/blog/mathematics/review-write-latex-8391, downloaded May 13, 2016, pp. 1-6.

Scrivener for Microsoft Windows, captured Jan. 13, 2013, https://web.archive.org/web/20130113164639/ http:/www.literatureandlat . . . , downloaded May 13, 2016, pp. 1-8.

writeLaTeX for Authors—Write and Collaborate Online with LaTeX, captured Feb. 9, 2014, https://web.archive.org/web/20140209204254/https://www.writelatex.co . . . , downloaded May 13, 2016, pp. 1-2.

International Preliminary Report on Patentability, Int'l App. No. PCT/US2014/048677, dated Feb. 11, 2016, pp. 1-11.

\* cited by examiner

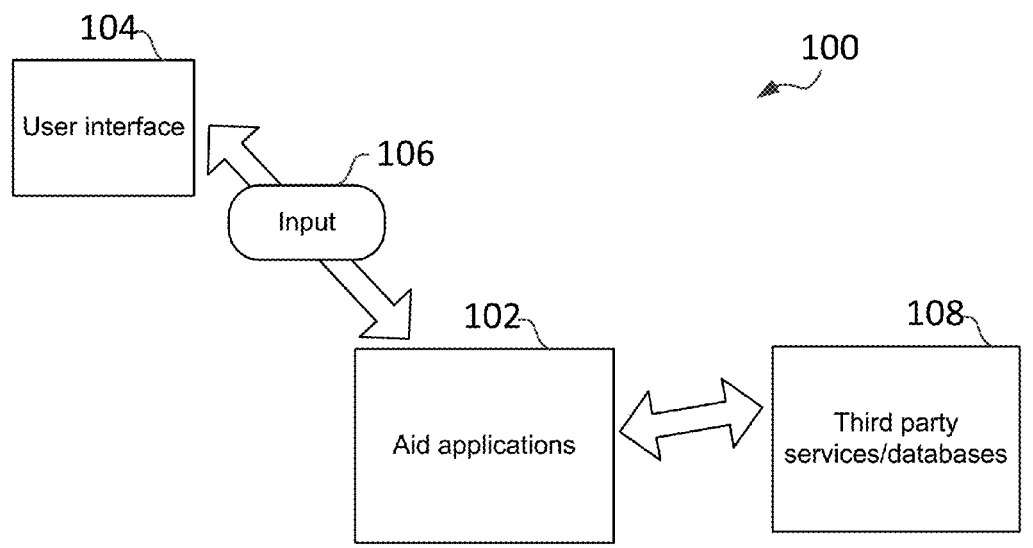
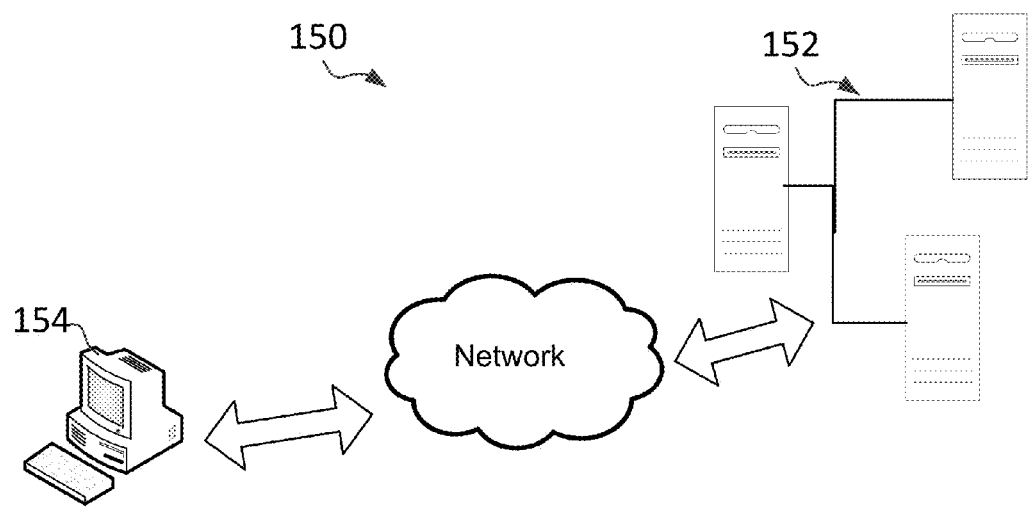
Figure 1

900

Let's create an outline for your manuscript

| Instructions |
|---|
|  |

- ☐ Title
- ☐ Authors
- ☐ Abstract
  - ☐ Introduction
  - ☐ Methods
  - ☐ Results
  - ☐ Conclusions
- ☐ Keywords
- ☐ Introduction
- ☐ Methods
- ☐ Results
- ☐ Discussion
- ☐ Acknowledgements
- ☐ References
- ☐ Supplementary Information

[ Add a section to this outline ]

[ Create your project ]

[ Create my outline ]

Figure 9

1100
Your manuscripts
Project 1
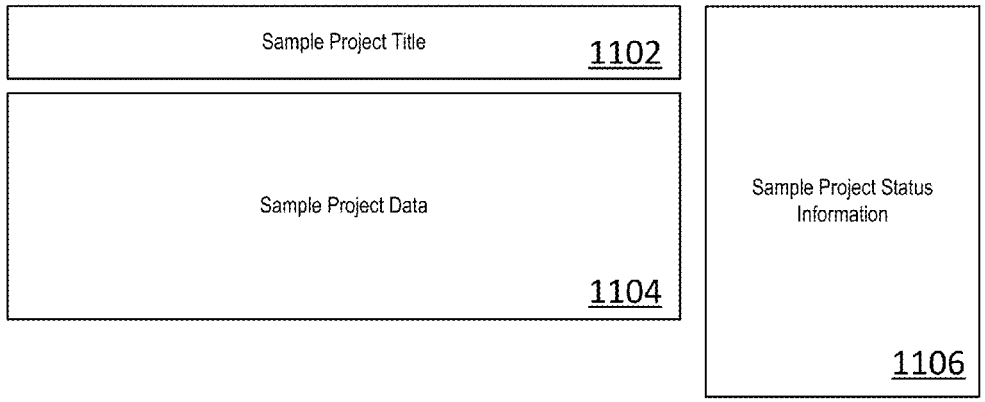
Project 2
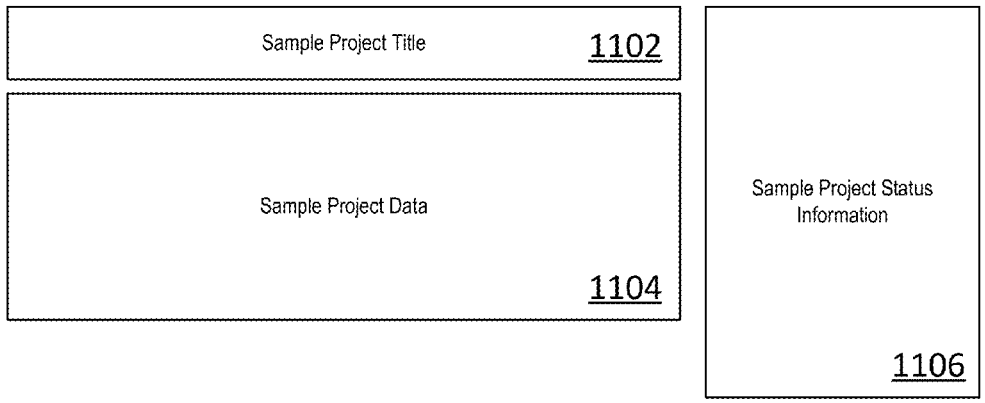
Figure 11

1300

To get started please select your field of research

Instructions

Life Sciences
Description →

Clinical Medicine
Description →

Physical Sciences
Description →

Earth and Environmental Sciences
Description →

Social Sciences
Description →

Outline

- ☐ Title
- ☐ Authors
- ☐ Abstract
  - ☐ Introduction
  - ☐ Methods
  - ☐ Results
  - ☐ Conclusions
- ☐ Keywords
- ☐ Introduction
- ☐ Methods
- ☐ Results
- ☐ Discussion
- ☐ Acknowledgements
- ☐ References
- ☐ Supplementary Information

[Add a section to this outline]

Explanatory Media

1599

[Save my work]    [NEXT: References]

Edanz Acceptance Wizard

| Writing your manuscript | Reviewing your manuscript |

Outline

References

Explanatory Media

1599

📄 Let's start with your references

| Instructions | 599 |

| Upload my references | Enter my references |

EXAMPLE: References

Example References

2799

Your Manuscript Guide
☑ Outline
☑ References
☐ Methods
☐ Results
☐ Display Items
☐ Introduction
☐ Discussion
☐ Abstract
☐ Keywords
☐ Title/Authors
☐ References Review
☐ Acknowledgements

Edanz Acceptance Wizard

| Writing your manuscript | Reviewing your manuscript |

Outline

References

Explanatory Media

1599

📄 Upload your reference files

Instructions

599

EXAMPLE: References

Example References

2799

Your Manuscript Guide
- ☑ Outline
- ☑ References
- ☐ Methods
- ☐ Results
- ☐ Display Items
- ☐ Introduction
- ☐ Discussion
- ☐ Abstract
- ☐ Keywords
- ☐ Title/Authors
- ☐ References Review
- ☐ Acknowledgements

Figure 28

Edanz Acceptance Wizard

| Writing Your Manuscript | Reviewing Your Manuscript |

2900

Outline

References
1599

[ Explanatory Media ]

Enter Your References Below — 599

[ Instructions ]

Reference 1
Author(s) [            ]
Journal Title [            ]
Article Title [            ]
Issue Number [      ]
Page Number [      ]

Reference 2
Author(s) [            ]
Journal Title [            ]
Article Title [            ]
Issue Number [      ]
Page Number [      ]

[ Enter More References ]

[ Save My Work ]          [ Next: Methods ]

EXAMPLE: References
2799
[ Example References ]

Your Manuscript Guide
☑ Outline
☑ References
☐ Methods
☐ Results
☐ Display Items
☐ Introduction
☐ Discussion
☐ Abstract
☐ Keywords
☐ Title/Authors
☐ References Review
☐ Acknowledgements

Edanz Acceptance Wizard

| Writing your manuscript | Reviewing your manuscript |
|---|---|

Outline
References
Methods
Results

Results

Explanatory Media

1599

Your Manuscript Guide
- ☑ Outline
- ☑ References
- ☐ Methods
- ☐ Results
- ☐ Display Items
- ☐ Introduction
- ☐ Discussion
- ☐ Abstract
- ☐ Keywords
- ☐ Title/Authors
- ☐ References Review
- ☐ Acknowledgements 📄 Let's look at what you found during your research Instructions 599

| Save my work | NEXT: Display Items |

Example Results Section Content

Edanz Acceptance Wizard                                3600

| Writing your manuscript | Reviewing your manuscript |

- Outline
- References
- Methods
- Results
- Display Items
- Introduction
- Discussion
- Abstract

Abstract

Explanatory Media

1599

Your Manuscript Guide
- ☑ Outline
- ☑ References
- ☐ Methods
- ☐ Results
- ☐ Display Items
- ☐ Introduction
- ☐ Discussion
- ☐ Abstract
- ☐ Keywords
- ☐ Title/Authors
- ☐ References Review
- ☐ Acknowledgements 📄 What was done?

Suggested input based on previous user-entered content
3602

📄 Why did you do it?

Suggested input based on previous user-entered content
3604

📄 What did you find?

Suggested input based on previous user-entered content
3606

📄 Why are these findings useful and important?

Suggested input based on previous user-entered content
3608

[Save my work]   [NEXT: Keywords]

Edanz Acceptance Wizard

| Writing your manuscript | Reviewing your manuscript |
|---|---|

| Outline |
|---|
| References |
| Methods |
| Results |
| Display Items |
| Introduction |
| Discussion |
| Abstract |
| Keywords |

Abstract

Explanatory Media

1599

📄 What keywords best represent your paper?

Instructions

599

Suggested keywords based on previous user entered content

3702

[ Save my work ]   [ NEXT: Title and Authors ]

EXAMPLE: Keywords

Example article titles and associated keywords

3799

Your Manuscript Guide
- ☑ Outline
- ☑ References
- ☐ Methods
- ☐ Results
- ☐ Display Items
- ☐ Introduction
- ☐ Discussion
- ☐ Abstract
- ☐ Keywords
- ☐ Title/Authors
- ☐ References Review
- ☐ Acknowledgements

Figure 37

Edanz Acceptance Wizard                    3800

| Writing Your Manuscript | Reviewing Your Manuscript |

Outline
References
Methods
Results
Display Items
Introduction
Discussion
Abstract
Keywords
Title/Authors

Title and Authors — 1599

Explanatory Media

Let's Start With the Title and Authors — 599

Instructions

1599 — Context-dependent Instruction
Explanatory Media — 3099

Who Wrote the Paper? List the Name of All Authors Involved.

3802

Name     Email address
                          ○ Primary Author
Name     Email address
                          ○ Primary Author Add another author Save My Work                    Next: References Your Manuscript Guide
☑ Outline
☑ References
☐ Methods
☐ Results
☐ Display Items
☐ Introduction
☐ Discussion
☐ Abstract
☐ Keywords
☐ Title/Authors
☐ References Review
☐ Acknowledgements

Edanz Acceptance Wizard

| Writing your manuscript | Reviewing your manuscript |
|---|---|

| Outline |
|---|
| References |
| Methods |
| Results |
| Display Items |
| Introduction |
| Discussion |
| Abstract |
| Keywords |
| Title and Author |
| References |

References Review

Explanatory Media

1599

📄 Let's look at where you ideas and evidence came from

| Instructions | 599 |
|---|---|

Suggested references based on previous user input

3902

| Save my work | NEXT: Acknowledgements |
|---|---|

EXAMPLE: References

Example references

3999

Your Manuscript Guide
- ☑ Outline
- ☑ References
- ☐ Methods
- ☐ Results
- ☐ Display Items
- ☐ Introduction
- ☐ Discussion
- ☐ Abstract
- ☐ Keywords
- ☐ Title/Authors
- ☐ References Review
- ☐ Acknowledgements

Edanz Acceptance Wizard

| Writing your manuscript | Reviewing your manuscript |
|---|---|
| Outline | |
| References | |
| Methods | |
| Results | |
| Display Items | |
| Introduction | |
| Discussion | |
| Abstract | |
| Keywords | |
| Title and Author | |
| References | |
| Acknowledgements | |

Acknowledgements

Explanatory Media
1599

📄 Who do you need to thank?

Instructions 599

[ Save my work ]  [ NEXT: Review my manuscript ]

EXAMPLE: Acknowledgements

Example Acknowledgements
4099

Your Manuscript Guide
- ☑ Outline
- ☑ References
- ☐ Methods
- ☐ Results
- ☐ Display Items
- ☐ Introduction
- ☐ Discussion
- ☐ Abstract
- ☐ Keywords
- ☐ Title/Authors
- ☐ References Review
- ☐ Acknowledgements

Edanz Acceptance Wizard                    4400

| Peer Review Comments | Peer Review Responses |
|---|---|

PEER REVIEW
Comments Received 00-Month-00
Response due by 00-Month-00

Editor's Letter
Reviewer #2

Letter Content

4402

Reviewer's Comments
Reviewer #2

General reviewer comments

4404

Section Title

Section Specific Comments

4406

Section Title

Section Specific Comments

4406

☐ Respond to Peer Reviewer #2's comments

Peer Review Guide
☐ Editor's Letter
☐ Peer Reviewer Comments
☐ Peer Review Response

[ Need more help? ]

Edanz Acceptance Wizard

| Writing Your Manuscript | Reviewing Your Manuscript | Submitting Your Manuscript |

Final Review

Let's Do One More Check Before Submission — 5102

| | Content | Plagiarism | Format |
|---|---|---|---|
| Section Title | Passed | 1 Issue | Passed |
| Section Title | Passed | Passed | Passed |
| Section Title | 2 Issues | Passed | Passed |
| Section Title | 1 Suggestion | Passed | Passed |
| Section Title | 2 Suggestions | 3 issues | Passed |
| Section Title | Passed | Passed | Passed |
| Section Title | Passed | Passed | Passed |
| Section Title | Passed | Passed | Passed |
| Section Title | Passed | Passed | Passed |
| Section Title | Passed | Passed | Passed |

? What did we check?
- Content Review
- Plagiarism Check
- Format Review

[Save My Work]   [NEXT: Submit your Manuscript]

5100

Your submission guide
☐ Cover Letter Creation
☐ Cover Letter Review
☐ Target Journal Review
☐ Final Review

Manuscripts | Workspace | My Profile

Manuscript Project Title

NOTIFICATION: 3 New Comments on this manuscript

Project Information

View Manuscript | Edit Manuscript

Manuscript Guide
- [ ] References
- [ ] Methods
- [ ] Results
- [ ] Display Items
- [ ] Introduction
- [ ] Discussion
- [ ] Abstract
- [ ] Keywords
- [ ] Title/Authors
- [ ] Acknowledgements Create a Cover Letter Instructions Create Manuscript Outline Past publications Link to past project(s)

GUIDED ARTICLE AUTHORSHIP

PRIORITY CLAIM

This application claims priority to provisional application Ser. No. 61/860,095, filed 30 Jul. 2013, which is entirely incorporated by reference.

FIELD

The present disclosure relates generally to the field of article publication. In various implementations, a system for guided authorship and document analysis is disclosed.

BRIEF DESCRIPTION OF THE DRAWINGS

FIG. 1 shows an example publication aid system and an example network environment for the publication aid system.

FIG. 9 shows an example user interface for a project outline.

FIG. 11 shows an example user interface for multi-project management.

FIG. 13 shows an example user interface for project field selection.

FIG. 16 shows an example user interface for journal selection.

FIG. 17 shows an example user interface for journal selection.

FIG. 26 shows an example user interface for generation of a project outline.

FIG. 27 shows an example user interface for reference generation.

FIG. 28 shows an example user interface for reference upload.

FIG. 29 shows an example user interface for reference entry.

FIG. 31 shows an example user interface for aided results section drafting.

FIG. 32 shows an example user interface for display item support.

Figure 34:
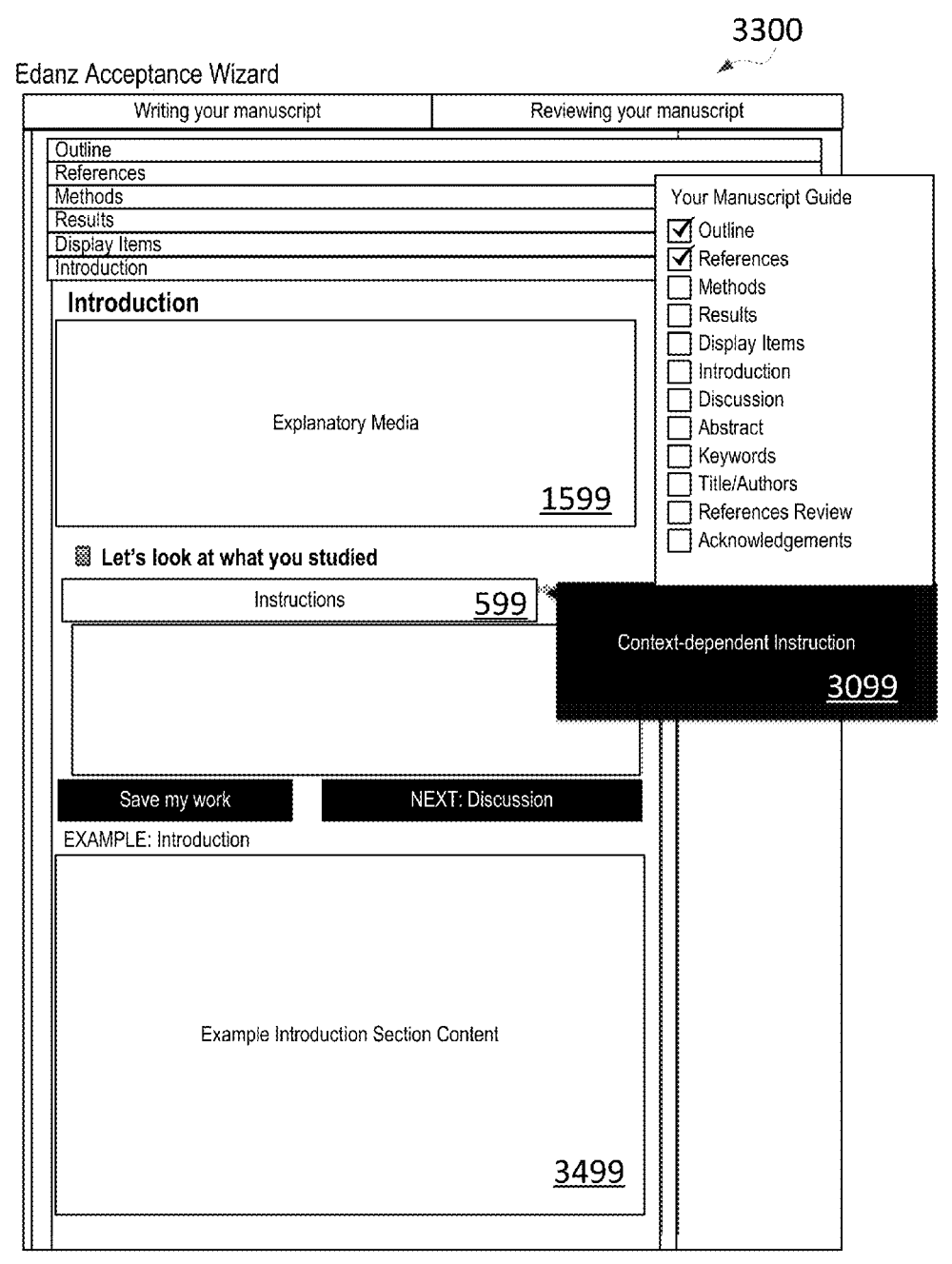

FIG. 34 shows an example user interface for aided introduction section drafting.

FIG. 36 shows an example user interface for aided abstract drafting.

FIG. 37 shows an example user interface for aided keyword selection.

FIG. 38 shows an example user interface for aided title creation and author input.

FIG. 39 shows an example user interface for reference review.

FIG. 40 shows an example user interface for acknowledgements section input.

FIG. 42 shows an example user interface for plagiarism analysis.

FIG. 44 shows an example user interface for viewing peer review comments.

FIG. 48 shows an example user interface for aided cover letter drafting.

FIG. 51 shows an example user interface for final review of a project.

FIG. 52 shows an example user interface for submission of a completed project.

FIG. 53 shows an example user dashboard interface.

DETAILED DESCRIPTION

Figure 2:
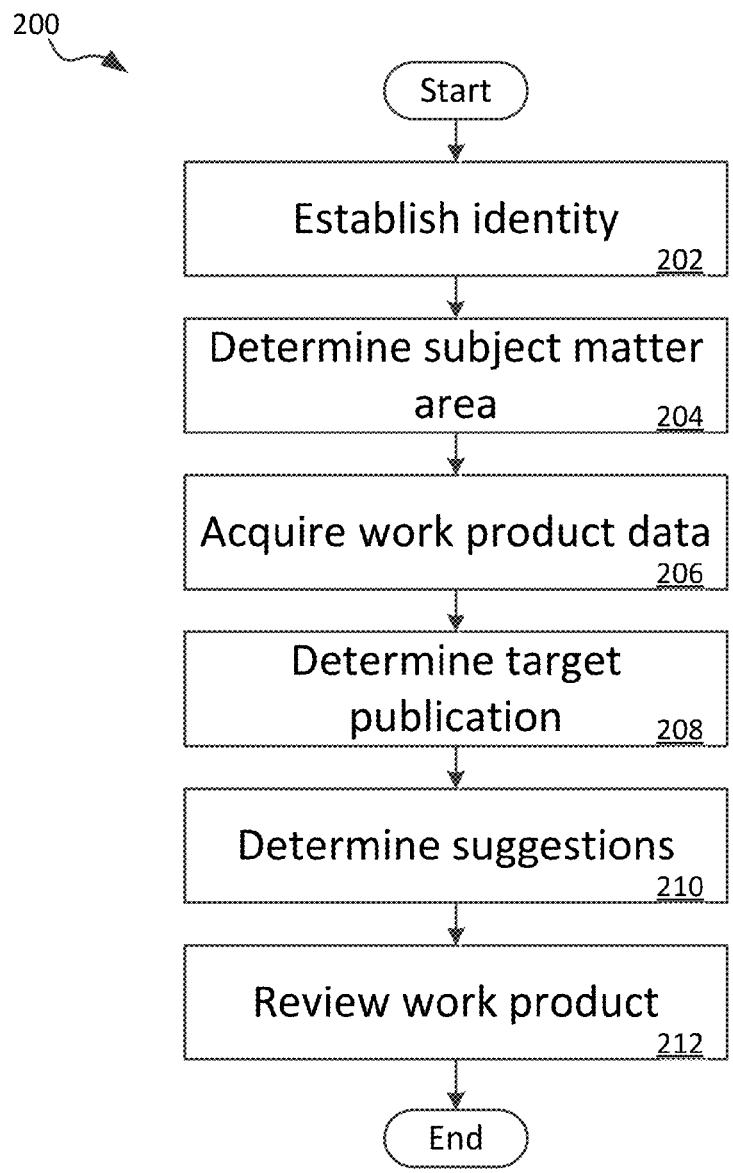
FIG. 2 shows example logic 200 for article publication preparation.

Exemplary implementations of the various exemplary implementations are now described in detail. Reference is now made to the drawings, wherein like numerals refer to like parts throughout. It will be appreciated that while these implementations are described primarily in terms of an Internet-based network used to aid in the drafting and publication of scholarly articles, the principles and architectures described herein are in no way so limited. For example, portions of the disclosure could be practiced using other types of networks (or isolated systems) or in the aid of the drafting of different types of works (including without limitation novels, poetry, serial fiction, technical manuals, legal memos/documents, whitepapers, op-eds, and/or other documents).

FIG. 1 shows an example publication aid system (PAS) 100 and an example network environment 150 for the publication aid system. The PAS 100 may include one or more aid applications 102 interacting with a user interface application 104. The aid applications 102 receive input submissions 106 from the user interface application 104. The aid applications 102 analyze the input submissions 106 to select various aid elements to guide further input submissions 106 from the user. In some implementations, the aid applications 102 may further contact third party services and databases 108 to support provision of the various aid elements to the user via the user interface application 104. The PAS 100 may run on multiple systems over a network (e.g. the Internet and/or a local network, intranet, etc.). For example, referring to the exemplary network configuration 150 of FIG. 1, the aid applications 102 may run on a publication services provider (PSP) 152 owned server, the user interface application 104 may run on a user terminal 154, and the third party services and databases may run on third party servers. However, it will be appreciated that the network configuration of FIG. 1 is merely exemplary and the PAS 100 may be implemented in varied configurations both network-based and single system. For example, the aid applications 102 and user interface application 104 may execute on a single system.

The aid applications 102 accept a user identity, project details, and work product from the user via the user interface application 104. The aid applications 102 perform analyses on the user identity, project details, and work product to determine goals for the project and deficiencies in the work product in the light of these goals. The aid applications 102 signal these one or more deficiencies to the user interface application 104, which prompts the user to correct the deficiencies. In various implementations, these deficiencies may include area for possible improvement. In some cases may not produce a prompt for correction, but rather a prompt or other indicator of how the work product may be improved. In some implementations, the aid applications 102 may provide the user interface application 104 with enrichment materials to support the correction of the deficiencies. The aid applications 102 may provide suggestions, based on the above analyses, of ways to correct the identified deficiencies. In some implementations, the aid application 102 may identify an optimal correction to the deficiency and integrate the correction into the work product, thereby automatically correcting the deficiency. The user may be prompted by the PAS 100 to accept or reject the correction. In some cases, the PAS 100 may detect no deficiencies. Various implementations may include a prompt to indicate that no deficiencies were detected. In some cases, this may alert the user that the work product had been processed even in the absence of a prompt for correction. In some implementations no action may be taken if no detections are made by the PAS 100. A progress bar or other completion indicator may be used during the processing of work product.

In various implementations, the enrichment material may include videos, written guidance, tips, and/or other enrichment material. Further, in some implementations expert guidance may be given. The expert guidance may be contextual. For example, a specific set of enrichment materials may be provided based on one or more suggestions determined by the PAS 100. Additionally or alternatively, expert guidance may be provided in a live setting (e.g. text-based chats, video conferencing, audio calls, etc.). The selection of the expert may be based on subject matter determinations by the PAS 100. Group conferences (e.g. Google Hangouts/Helpouts, Skype calls, etc.) may allow for a "virtual classroom" where experts (or other individuals) may assist multiple users simultaneously. Further the user interface application 104 may include support for telecommunications (webcam inputs, audio inputs, etc.) to facilitate the implementation of such interactions. Expert services may be provided as a paid microservice by the PAS 100 operator or a third party (e.g. publishers, other PAS 100 users, etc.). Such expert services may also be provided as free or volunteer services (e.g. as support service from a company, or via collaborations among users).

In a non-limiting exemplary implementation, an aid application may determine, from analysis of the text and information on general practice in the field, that a draft scholarly article has an insufficient number of references. The aid application may query a second aid application for reference suggestions ranked in order of relevance. The first aid application integrates the reference into the draft and provides the corrected draft to the user interface application 104 and with the changes identified. The user interface application 104 displays the corrected draft to the user and highlights the changes. The user interface application 104 then prompts the user to accept or reject the changes. The user interface application 104 informs the first aid application of the user's decision on the change.

In various implementations, the PAS 100 may be configured to be integrated with and/or accept inputs from a wide variety of third party sources. In some cases, one or more of the functions (e.g. registration, abstract generation, journal selection, plagiarism analysis, etc.) discussed with respect to the PAS 100 may be performed and/or obviated by a third party system or input. For example, a third party server may provide registrations for one or more users. Thus, the provided users may not use a registration system of the PAS 100. Further, the registration system, for example, of the PAS may be entirely handled by an outside entity (third-party service, etc.). Further, in some implementations, choices attributed to a user of the PAS 100 may be instead determined by a third party.

FIG. 2 shows example logic 200 for article publication preparation. The logic includes establishing their identity with a user application of the PAS 100 (202). In various implementations, the identity is used by the PAS 100 to associate the proper attributes and works with the appropriate user. For example, peer review assignments and/or permissions to comment or edit a specific document may be guided by the established identity. This establishment of identity may include a logging on to a pre-existing account, establishing a new account, stating an unverified identity, security-key authentication, third-party tokens from identity servers, author identification number, and/or other identity establishment actions.

In some implementations, user information may be provided to the PAS 100 by the user (e.g. entered manually, uploaded, extracted from a publication/project, etc.). However, such user information may also be provided by a third party source. For example, an organization (university, company, etc.) may provide information associated with a set of users of the PAS 100. The organization may also establish the users on the PAS 100. Additionally or alternatively, the PAS 100 may pre-populate user information prior to user initiated action. For example, the PAS 100 may collect information from public sources (publisher websites, publication by-lines, university websites, etc.) to pre-populate such user profiles. The users may then claim their profiles by logging on to the PAS 100 or otherwise communicating with the PAS 100.

The logic identifies a subject area (204). For example, a subject matter area may include a topic, type of study (e.g. theoretical, experimental, meta-study, survey, etc.), and/or a field of study, etc. The PAS 100 may recover such information form the user via prompts or the PAS 100 may reference stored records. In some implementations, the PAS 100 may also perform a search (and/or sematic interrogation via natural language processing) of one or more databases of publications to attempt to determine a likely subject matter area based on the identification information acquired in (202). The PAS 100 may cause the user to be prompted to confirm the subject matter area when either of stored records or a search is used. The PAS 100 may refine its search parameters using the confirmation from the user as a feedback source. The search/interrogation performed by the PAS 100 may be context specific. In some cases, the PAS 100 may have situational knowledge of the subject matter area independently of the content of a publication. For example, the PAS 100 may be managing projects for a specific funding group associated with research directed to limited subject matter. Thus, in some cases the subject matter area may be fully or partially established situationally.

The PAS acquires initial work product data (206). In some implementations, this data may be acquired via prompts to the user. For example, the user may be prompted to input answers to a series of guided questions about the project (e.g. "What was done?", "What was it done to?", "How was it done?", "What type of publication will this be? (e.g. short letter, review article, op-ed, media presentation)", etc.). It should be noted that the specific text examples provided herein are not meant to be limiting, but rather to be illuminative of the general principle of providing prompts. In some implementations, the user may provide draft work product to the system and answers to such prompts may be extracted from the draft work product. For example, a user may upload an abstract from a current project that the PAS 100 then analyses. The responses to the prompts may be explicitly answered in the draft work product, and/or some systems may glean the desired data from natural language processing of portions of the draft. The natural language process may be guided by the subject matter area determined in (204). For example, certain words may have meanings that are common in a given discipline, but frequently have another meaning in other disciplines. Thus, context specific processing may increase accuracy and ease interpretations of passages by ruling out unlikely possible meanings. The user may be prompted to confirm the answers gleaned from the work product. In some implementations, the PAS 100 may refine its own answer extraction parameters using the confirmations from the user as feedback source.

Alternatively or additionally, information on work product may be acquired from a third party source. For example, a publisher provided service or institutional group may have such information collected from multiple projects initiated via the publisher's or group's system. Such information may be provided as individual projects are initiated on the PAS 100 and/or a batch upload of multiple projects may occur.

In various implementations, based on the initial work product data, the PAS 100 may also narrow the subject matter area determined in (204). For example, the PAS 100 may define an initial subject matter area of "optical science", which the PAS 100 narrows to "nanophotonics" based on the initial work product data. In some cases, a user may create past and future work product across many narrowly defined subject matter areas. Therefore, an initial narrow subject matter determination may not be practical until details on the specific work product are acquired. This process of refining may also be used to improve future accuracy of the PAS 100. As the PAS 100 narrows its subject matter area guess. The system may review previously provided data to determine correlations (both positive and negative correlations) with the narrower subject matter area guess. These correlations may be applied to allow for accurate narrow guesses at earlier stages.

In one or more implementations, the initial work product data may be used to select one or more keywords or important phrases to associate with the work product. These keywords may be optimized for search engines and article databases. Further, multiple sets of keywords may be selected for optimization across multiple disciplines.

In some implementations, the initial work product data may be used to generate a draft abstract for the work product. In a variant, an initial abstract is not provided by the user. The answers to the prompts may be used to generate an abstract. In another variant, an initial abstract is provided. The abstract may include one or more deficiencies requiring revision. The extracted initial data may be used to generate a new abstract absent at least one of the one or more deficiencies. Similarly, an abstract may be generated from data extracted from any provided draft portion of the work product. However, in some cases, further answers to prompts may be required beyond those extracted.

The PAS 100 determines a target publication (208). The target publication may be determined based on user input. The PAS 100 may suggest one or more target publications based on the subject area and the initial work product data. To identify potential target publications, the PAS 100 may consult a database of information on publications and perform a comparison with details of the work product determined via the initial work product data. The PAS 100 may also apprise an expert of the details of the initial work product and elicit target publication suggestions from the expert. Such expert advice may be provided as a contract service. For example, the PAS 100 may contact a third-party publication assistance service such as Edanz Group, Ltd and request paid expert assistance in target publication selection. The PAS 100 may use the initial work product data or any information generated from the data to identify an appropriate expert or experts. In some cases, the selection of the expert may be handled by a third party using a portion of the initial work product data or information derived therefrom. Further, the suggestions provided by the experts may be used as feedback input for the PAS 100 to refine its automated publication selections. For example, an expert may suggest target publications X, Y, and Z to a user. If the PAS 100 only generated suggestions X and Y. The PAS 100 may review why publication Z was omitted. The PAS 100 may then refine its selection criteria. If the user selects publication Z, the PAS 100 may record whether the user was successful in publication. If the user is successful, the PAS 100 may review its active selection to further increase the likelihood of publication Z recommendation in the future. If the user is unsuccessful, the PAS 100 may decrease the likelihood publication Z is recommended in the future. Further, the PAS 100 may, in either case, adjust the weight it gives to suggestions by the expert when used as feedback. Similarly, the PAS 100 may make adjustments to its criteria if the PAS 100 recommends target publications omitted in a corresponding expert recommendation.

In some implementations, the target publication selection may be provided by a third party server. For example, a project may be initiated by a publisher owned server. The publisher owned server may provide details on the project including a publication selection. As discussed above, the PAS 100 may be implemented to support a high degree of inputs and integration with third-party users and systems.

In addition, the PAS 100 may record options (e.g. target publication recommendations, etc.) rejected by users to maintain a historical record of both what was selected and what it was selected over. The PAS 100 may request feedback as to why certain options may have been rejected. Thus, the PAS 100 may improve it suggestions and may improve its ranking of its suggestions. Further, in the case of target publication selection, such data may be provided to publishers to improve their publications' chances of being selected. This data may be valuable to publishers striving to make their publications more attractive to users.

The target publication selection process may occur as a background process. For example, the PAS 100 may determine a target publication without informing the user at the time of determination. The PAS 100 may guide the user using the unconfirmed target publication selection. The PAX may at a later time confirm the target publication selection with a user. Additionally or alternatively, the PAS 100 may use background target publication selection processing to update a target publication selection after further process is made on the project.

In various implementations the PAS 100 may maintain a complete or near complete historical record of a project from initiation forward. This record may be associated with the project and store at the PAS 100 or on a third part database. This record may include without limitation all changes, uploaded documents and/or notes, PAS 100 processing outputs, PAS 100 suggestions made, options offered, options selected, peer review comments/responses, editorial changes, publication proofs, readership history, etc. The final output of the project in addition to such a record may transform the project into both a final output and a history of the project's creation and use. The record may be available to the PAS 100 for refining suggestions for projects and/or reading. Further, the record may be made available to third party services for data mining applications. For example, an author training group may use the data from one or more projects to develop educational materials related to the production of published works. In some implementations, users (or third parties) may have control of the type of information recorded or the length of time which it is stored. A user interface providing privacy options may be provided to users and/or third parties to facilitate this control.

The PAS determines a set of suggestions based on the target publication and the initial work product data (208). For example, a target publication may have requirements such as a structured abstract, word count maximums, formatting structure, specific sections, etc. Further, certain subject matter may lead to suggestions. For example, an article describing a clinical trial may require a methods section detailing administration of treatment, control, etc. In some implementations, the PAS 100 may identify these suggestions by consulting a database and pruning inapplicable suggestions as data related to the work product is acquired. In some implementations, suggestions are added (from a database or decision tree) as the nature of the user's work product is resolved through the addition of data. In one or more implementations, the suggestions may be identified throughout the real-time generation of an outline for the work product. In addition, the PAS 100 may consult an expert to assist in the identification of suggestions for the work product.

In some implementations, the PAS 100 may use translation systems. A user of the PAS 100 may provide input in the language of their choice. The PAS 100 may implement two-way translation of the interactions. For example, the user may provide input in Chinese and have their input translated into English. Comments, suggestions, and editing may occur in English. The comments, suggestions, and editing may be translated into Chinese for review by the user. In some cases, one-way translation may also be implemented. For example, initial input may be translated from Chinese into English and then further work is conducted in English. For collaborative works, a user may use two-way (or one way) translation to facilitate interaction with another collaborative user with who may not implement translation. Similarly, two users may provide input in two different languages and produce a final output in a third language. Translation settings may be specific to the user (even in collaborative environments).

In some implementations, the PAS 100 may be configured to provide machine translations. Further, the PAS 100 may use a third party service (e.g. Google translate, online translation APIs, self-contained translation packages, etc.) to obtain machine translations of documents and or other materials. Additionally or alternatively, translations may be provided by human translators. Such translation service s may be provided by the PAS 100 operator or a third party service. Further, such translation services may be provided as free or paid microservices.

PAS 100 initiates a review of the work product (212) and it is determined if the work product meets the suggestions identified in (210). If not, the PAS 100 causes the user to be prompted to alter the work product to comply with the suggestions. In some implementations, content-type deficiencies may be addressed through specific questions generated based on previous data. For example, if the user indicates a laser was used in an experiment, the PAS 100 may prompt the user to provide a supplier name and location for the laser. In addition, the PAS 100 may request the operational parameters of the laser and request a detailed account of how the laser output was used. The PAS 100 may refine such prompts based on content inclusions in similar previously published papers. The PAS 100 may also provide a potential resolution to the content deficiencies based on information from available databases. For example, if the user supplies some data on the laser (e.g. specifications, model name, etc.) the PAS 100 may provide a likely supplier and location. Such potential resolutions may also be obtained from other previous or currently active projects in the PAS 100.

In various implementations, a user may be prompted with an option to ignore one or more suggestions in a current or future review. Thus, a user may control which suggestions are addressed. Additionally or alternatively, a third party entity may provide input to the PAS 100 customizing suggestions for projects associated with the third party. In some implementations, the third party may remove particular suggestions (or suggestion types), render certain suggestions optional, and/or identify one or more suggestions as compulsory (e.g. a suggestion that may lead to automatic rejection of the publication if not followed). For example, a publisher may provide custom suggestion profiles for journals that it publishes.

In some implementations, the PAS 100 may attempt to provide a suggested answer to such content prompts. For example, if a user provides a draft methods section, the PAS 100 may extract the details of a described experimental setup. The PAS 100 then provides the user with the prompt and suggested reply. The user may then confirm the suggested reply. The confirmation may be used as feedback by the system to refine the content parsing capabilities of the PAS 100. In some implementations, an expert may be consulted to assist in replying to such content deficiency prompts.

In some implementations, the provision of suggestions and deficiency prompts may be implemented as a microservice. Suggestions or groups of suggestions may be provided by the PAS 100 in return for revenues or other consideration. For example, the PAS 100 may determine a publication is missing an abstract or keywords. The PAS 100 may then present the user with an offer to generate the abstract or keywords in return for some form of consideration. Alternatively or additionally, the PAS 100 may present the user with an offer for expert services to complete such a task. The expert services may be those of the operator of the PAS 100, third party, or a volunteer. The PAS 100 may be configured to initiate a financial transaction to obtain monetary consideration. For example, the PAS 100 may contact a billing server, debit a credit account, or generate an invoice.

The PAS 100 may also accept inputs of various files to correct deficiencies. For example, a manuscript with insufficient references may be corrected by uploading reference manager files (e.g. Endnote, Mendeley, Zotero, Citeulike, etc.). These uploaded files are parsed by the system and may be integrated into the work product.

In various implementations, the PAS may act as a document repository for an organization (e.g. university, company, publisher, etc.). For example, the PAS 100 may act as an internal repository of pre-publication drafts of articles for a university. The PAS 100 may process the stored articles for content classification etc. Further, the PAS 100 may make recommendations of processed stored articles that may be relevant to users of the PAS 100, who are internal to the university. However, it will be appreciated that, in some cases such a repository may be configured to be accessible to users of the PAS 100 outside of the associated organization.

In some implementations, multiple users may be associated with a single project in a collaborative environment. Therefore, a user may identify their self with the PAS 100 and then associate with a project initiated by another user. These collaborative users may be, without limitation, multiple authors, project advisors, university management and administration, funding administrators, journal editors or other staff, peer reviewers, readers and/or other collaborative users.

A collaborative user may identify himself or herself with the PAS 100 in a fashion similar to that discussed above with respect to (202) of the logic 200 above. The collaborative user may be associated with a specific project by different means. If the collaborative user is not the creator/initiator of the project, an association process may have to be implemented. In some implementations, the association process may include the collaborative user providing identifying information for the project which he wishes to join. In various implementations, security measures are implemented. For example, the initiating user may create (or cause the creation of) a password or unique network address for the project, which may be shared with collaborators. An invitation system may also be utilized, wherein users that are properly associated with the project are sent an invitation to contribute to it. These invitations may be sent by the initiating user or collaborative users. In some cases, an invitation may be initiated by the PAS 100 itself or a third-party group. For example, a peer reviewer may be invited to a project without an explicit invitation (or sharing of authentication information) from a user already associated with the project.

The collaborative user environment may be supported by various sharing features. For example, a document may be hosted by the PAS 100 or a third-party server in a cloud-type editing interface. Thus, multiple associated users may be able comment and edit the document from disparate terminals and see their respective updates in real-time.

In various implementations, the collaborative user environment may be integrated with target publication selection and submission. For example, the suggestions and suggestion order for a project may be determined by the target publication. Further, selection of collaborative users may be affected by target publication. For example, an editor associated with the target publication may be included on the project at the time a target publication is determined. In some implementations, the editor may provide suggestion selections and/or customization for the specific project. In addition, the collaborative user environment may be integrated with the peer-review infrastructure/process of the target publication of the project. For example, the peer-reviewers may be selected using work product data associate with the project. Then the peer reviewer may be given access to the project through the collaborative interface. In some implementations, the peer-reviewers may be given different levels of access than other users. For example, peer-reviewers may not be able to see certain comments made by collaborating users. Further, peer-reviewers may not be able to edit portions of the document. To support a blind-reviewing process, peer-reviewers may be able to provide comments and information only viewable by certain users (e.g. editors). Similarly, users such as readers may be able to send comments to authors or post public comments, but may not be able to read internal review comments or comment from the drafting process. However, it will be readily appreciated that such commenting may be voluntarily available to readers.

Additionally or alternatively, third parties may be able to participate in the publication selection process. For example, a publication editor may be able to join and/or review projects in pre-submission stages via the PAS 100 (e.g. publication editor may "browse" current projects for projects of interest, etc.) In this case, the publication editor may then be able to recruit the project for eventual publication in his or her associated publication. This may provide such individuals with the opportunity to actively recruit existing projects that may align with the publication's content goals. Similarly, funding administrators, project heads, university administrators, or other individuals not directly involved in the project may steer or lead decision making.

In some implementations, the PAS 100 may use the collaborative environment as a basis for a market place for publishing services (language editing, target publication selection, abstract development, cover letter drafting, etc.). The PAS 100 may implement a credit and/or token type system by which users may pay for publishing services. In some cases, the PAS 100 may extract a fee for some transactions (e.g. purchase of credits/tokens, exchange of services, etc.). The user may purchase such tokens or credits in a local currency and exchange services with users purchasing tokens/credits in their respective local currencies. Through the exchanges of credits/tokens (or cash transfers), user may purchase services from the PAS 100, other users, and/or third parties offering services. Further, in some cases, certain services may be free to users, but the provider of the service may earn tokens/credits for use on the PAS 100 (e.g. peer reviewing, certain volunteer tasks, or promotions). However, it will be readily appreciated that services may be provided without a token/credit exchange between the involved parties (e.g. volunteer services, free services, etc.). In some cases, the PAS 100 may collect a fee (credit/token, cash payment) for connecting a user to a service offered by another user or third party, but no payment may be made to the offering user or third party. The collaborative environment of the PAS 100 may connect users with experts able to provide desired services whether on a contract or voluntary basis.

In various implementations, the PAS 100 may be configured to manage access to services and/or data maintained on the PAS 100 or a third party system. In some cases, the PAS 100 may implement this functionality through license management. Individual users may obtain licenses through transactions (e.g. purchase, registration, etc.) managed by the PAS 100. The PAS may also support group licensing transactions for organizations. Further, in some implementations, third parties may purchase bulk licenses through the PAS 100 for resale or presentation to individuals/groups of the third party's own choosing.

The PAS 100 may be configured to parse portions of documents provided to it by users. This parsing process allows the PAS 100 to generate logical outputs (e.g. XML documents) that are highly machine comprehensible. These PAS-parsed documents may be utilized in real-time reorganization of documents without significant human intervention. For example, a document specifically organized for a first publication may be automatically re-organized for a second publication. Further, highly machine comprehensible documents are more amenable to search engine optimization. For example, given search terms are more likely to provide highly relevant results when a search engine has more data by which to rank hits.

The parsing process may organize a given portion of text into blocks. The blocks may be preset or may be context specific. For example, a system may use general blocks such as summary, main idea, primary object, main text, etc. In another example, context specific blocks may include, abstract, experimental setup description, equipment details, physical principles, theoretical principles, etc. In some implementations, appropriate context specific blocks may be selected based on suggestions such as those discussed above with respect to (210) and (212) of the logic 200.

The PAS 100 may be configured to parse documents using one or more natural language processing packages (e.g. Stanford CoreNLP, openNLP, SharpNLP, Alvey Natural Language Tools, Natural Language Toolkit (NLTK)). These packages may be extended for optimal performance in the context specific environments. For example, once a specific discipline is identified specific word meanings may become very common or very rare. For example, the noun form of "affect" is uncommon outside of psychology and medicine. Further, context specific phrase parsing may lead to a high degree of optimization. For example in physics "second harmonic generation" may be parsed as the generation of the second harmonic. Attempting to parse the phrase a second instance of generation of a harmonic may be immediately ruled out.

The natural language processing packages (NLP) may be refined and/or trained. In some implementations, a feedback process may be established for training a NLP. For example, a database of publications may be processed by the NLP to generate an output. This output may include data on subject area, structure, content, and/or other data. Further, the output may include summaries and/or other digests of the publication. The output may then be compared to known values for the given database for verification. For example, using a database with existing abstracts for its publications, an NLP may be trained by comparing summary outputs to the existing abstracts and weighting deviations. Alternatively or additionally, experts may review outputs during training and provide feedback to the NLP.

In some implementations, an NLP may be trained through explicit creation of characterization tools or ontologies. For example, a trainer may provide code and/or scripting to establish that specific words and/or phrases are associated with certain subject areas, publication types, etc. Further, the NLP may be made aware of subject fields in general. In some implementations, the PAS 100 may operate in a field diverse analysis environment. However, by making the NLP aware of the existence of fields within the analysis environment, the NLP may, in some cases, optimize its analysis process by first identifying a field and then applying the field context to the subsequent processing of the publication.

In some cases an iterative approach may be applied with the NLP. For example, initial determinations of subject area or publication type may be performed using trained and/or explicitly applied characterizations. Once an initial determination is made more specific characterization tools may be applied. For example, the term "chirp" may generally be associated with biosciences because it may be associated with avian vocalizations. However, if an initial determination performed on a publication identifies it as a non-biological physics publication, and context specific analysis of the term "chirp" may lead to a refined identification of the article as an optical sciences publication, a field in which the term "chirp" is commonly used. Such iterative approaches may be trained into an NLP by, for example, providing positive feedback when the system reviews previously ignored or searched (or semantically analyzed) terms after establishing an initial context. In some cases, negative feedback may be given when certain terms are ignored by the NLP in successive iterations in which the term should have analyzed based on the altered context. Alternatively or additionally, explicit scripting and/or coding of such analysis structures may be applied.

Further, contextual approaches may be applied in non-iterative analyses. For example, a user of the PAS 100 (or a third-party) may provide an initial determination of context to the NLP. The NLP may then make context based analyses without first making an initial determination. Further, situational context may be available to the NLP. For example, the NLP may be tasked with analyzing a database of publications that are similar in one or more respects (e.g. a database of review articles, a database of medical journal letters, etc.). The situational context may either be provided to the NLP, or the NLP may be provided with heuristics that allow short cuts in certain situations. For example, if during an analysis of a given database the NLP makes a statistically anomalous number of similar initial determinations (e.g. a number above a predetermined threshold, percentage, etc.), the NLP may assume certain characteristics of the initial determination apply to all publications in the database.

Sources of bulk data for training may include for example, databases storage on the PAS 100, third party databases, publisher websites, organizational archives (e.g. arcXive, PubMed, etc.), and/or other publication sources.

The collaborative environment also provides a basis for parsing assistance through the placement and content of the multi-user comments. Users tend to comment on important portions of a document. This may aid the PAS 100 in identifying the most important portions of a document. For example, the most controversial portions of a document or the most important results at likely to garner an increased level of commenting by collaborating authors, reviewer, and readers. Further, the content of the comments may assist in parsing. For example, if a user highlights a specific section of text and the content of the user's comment are directed at the main point of the article, it may be likely that the user has highlighted what they believe to be the main point. The PAS 100 may compare the user's selection to what the PAS 100 has determined to be the main point. This process may be used as a feedback mechanism for the PAS 100. If multiple users identify the same section as the main point, the PAS 100 may refine its associated selection parameters.

The content of comments may also have bearing on other documents. For example, if a user comments on a reference document for one of the user's works. The content of the comment may indicate the relationship between the user's work and the reference. For example, a positive comment may indicate a point of similarity between the works. A negative comment may be indicative of a point of differentiation.

In various implementations, the PAS 100 may prompt a user to provide content from which to construct blocks that the PAS 100 may use to build a document (e.g. (206) and/or (212) of the logic 200). This provision may include uploading content, cutting and pasting content into the user interface 104, and/or manual entry via the user interface 104. Thus, rather than parsing a user complied document to extract such blocks, the PAS 100 may construct the block and then assembles them into a pre-parsed document (e.g. an XML document). The parsed document may then be compiled into a natural language form on-demand.

In various implementations, the necessary blocks are determined the by the PAS 100 in a context specific manner. The PAS 100 provides the user with initial prompts to determine general information about the document (e.g. discipline, type of study, target publication, keyword, etc.). The general information is then used to determine the suggestions for the document, which are then used to determine the necessary blocks. In some implementations the blocks may be determined in an additive or subtractive manner. Various implementations may use a decision tree to determine such block suggestions.

The blocks, for purposes including editing and reviewing, may be presented to the user in different viewing formats. For example, the user may view the blocks in an individual format in which a block and/or accompanying suggestions for editing, reviewing, and/or other activities associate with the block may be presented.

Additionally or alternatively, the blocks may be presented in an outline form. In the outline form, the user may view, content, suggestions and/or other information for multiple blocks. In some implementations, the user may be able to perform editing tasks in the outline view. For example, the user may be able to alter in further input content using the outline view. In some cases, a user or group of collaborators may be able to generate an outline for a project using the outline form.

In some implementation, the multiple views (e.g. the outline form, the individual block view, and/or other views) may be presented via a zooming function. The zooming function may allow the user to select the blocks or portion of the project presented in editing view (e.g. viewable space, window, webpage, scrolling area, or other view). The user may select a level of detail to be shown. In some cases, a user may select to view a portion of the content from ones of multiple blocks. For example, a user may select to view topic sentences, short bullet-point topic sentences, first sentences, headers, or other portions from the blocks.

In some cases, the same content may be presented at all viewing levels. The size of the content may be adjusted to allow for viewing an increased amount of content simultaneously. Additionally or alternatively, relative sizes of different content may be altered. For example, topic sentences or other key content may be kept at a display size to facilitate editing and/or viewing. Other content, determined to have a lower viewing priority may be reduced in size to accommodate the multiple block viewing of the outline mode. Content analysis functions, such as those used in automated summary and/or abstract generation, may be used by the PAS 100 to determine the viewing priority of various content within a project.

In various implementations, the viewing priority may facilitate selection of content to present at editing/reading sizes, content not to include at different viewing modes, and/or other content display determinations. Additionally or alternatively, the PAS 100 may accept user input to identify high viewing priority content. For example, a user may identify particular sentences as topic sentences. Additionally or alternatively, the PAS 100 may make determinations of high and low priority content, and the user may provide feedback on the selections. For example, the user may request the PAS to change the portion of the content shown in an outline viewing mode.

Further, block suggestions may be based on known interrelations of blocks. In some implementations, inclusion of a specific block by a user may cause an associated suggestion to be provided by the PAS 100. For example, if a user includes text or a prompt response leading to the creation of a block related to a clinical trial, the system may develop a suggestion for inclusion of statistical methods. Further, in this non-limiting example, the PAS 100 may perform an analysis on the statistical methods (once provided) and clinical trial to ensure that the methods are appropriate for the type/size of clinical trial. In some implementations, the suggestion process may be iterative. For example, inclusion of clinical trial details initiate a suggestion for statistical methods, and then a specific statistical method initiates a suggestion for further clinical trial details. In this example, a certain statistical analysis may require a control group. The PAS 100 may then generate a suggestion for inclusion of control group details in the clinical trial description.

Figure 3:
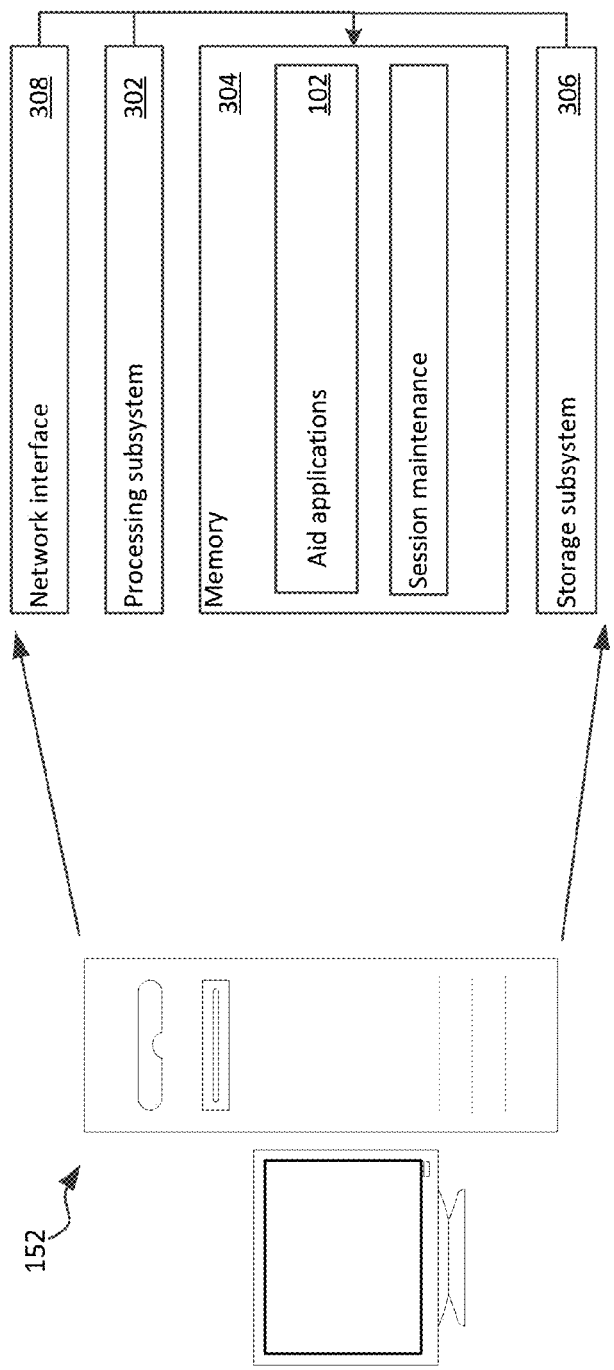
FIG. 3 shows an example publication aid server architecture.

In various implementations, the PAS 100 may be implemented on a computer network 150 such as that shown in FIG. 1. FIG. 3 shows an exemplary PSP server system 152. The PSP server includes a processing subsystem 302, memory 304, a storage subsystem 306, and a network interface 308.

The processing subsystem includes one or more processors (or processing cores). Processors may include, without limitation, reduced instruction set (RISC) processors (e.g. PowerPC, Xenon, Cell, ARM, etc.), complex instruction set (CISC) processors (e.g. x86, x64, etc.), graphics processing units (GPU), application specific integrated circuits (ASIC), field programmable gating arrays (FPGA), and/or other processing units. It will be readily appreciated by those of skill in the art that virtually any logical processing unit or units may be used as the basis of such a server system. The processing subsystem is configured to execute one or more of the aid applications 102 discussed above.

The memory 304 is configured to provide read/write memory access to the processing subsystem to support execution of the aid applications 102. Further, the memory is configured to support one or more active terminal sessions initiated by user interface applications 104 on user terminals 154. The memory may include, without limitation, random access memory (RAM), dynamic RAM (DRAM), read only memory (ROM), non-volatile RAM, flash memory, electrically-programmable ROM (EPROM), and/or other memory types.

The storage subsystem 306 is configured to store the aid applications 102 and user data 310. The storage subsystem may be accessed by the aid applications 102 to reference data stored from multiple user sessions to provide terminal users with workspace continuity across disparate work periods. The storage subsystem may utilize similar memory types to those which may form the basis for the memory modules. Further, the storage subsystem may include magnetic storage (e.g. hard drives, tape drives, etc.), optical storage, (CDROM, DVD, HD-DVD, Blu-Ray, etc.), magneto-optical storage, and/or other mass storage systems. The storage subsystem may also support the storage of the databases 108 if included on the PSP server 152.

The network interface 308 is configured to support a network link between the server 152 and a user terminal 154. In various implementations, the network link may be supplied by the Internet. The network interface is configured to support one or more active connections between the aid applications 102 and one or more user interface applications 104. The network interface may include, without limitation, wired networking hardware (e.g. ethernet 10/100/1000, T1, T3, cable, DSL, hybrid fiber-coax, fiber-optic connections, etc.) and/or wireless networking interfaces (e.g. Wi-Fi 802.11a/b/g/n/s/v/ac, Wi-Max, 3G, 4G, LTE/LTE-A).

It will be appreciated by those of skill in the art that the functions server 152 may be distributed across one or more servers interconnected via a network such as the internet. Further, the various functions of the aid applications 102 may be split among these distributed servers. In some case the distributed servers may be managed by separate entities. For example, as discussed above, the functions of the database 108 may be provided by a third-party entity. Further, the PSP server 152 may serve as back-end to a third-party provided front-end service. For example, a publisher providing publication drafting aid services through their own website (or other user interface application) may utilize the aid applications 102 running on the PSP server 152 for support.

In addition, in some implementations, the aid applications 102 may be instantiated on any of a number of servers allowing for a cloud-type architecture which is non-server specific.

Figure 4:
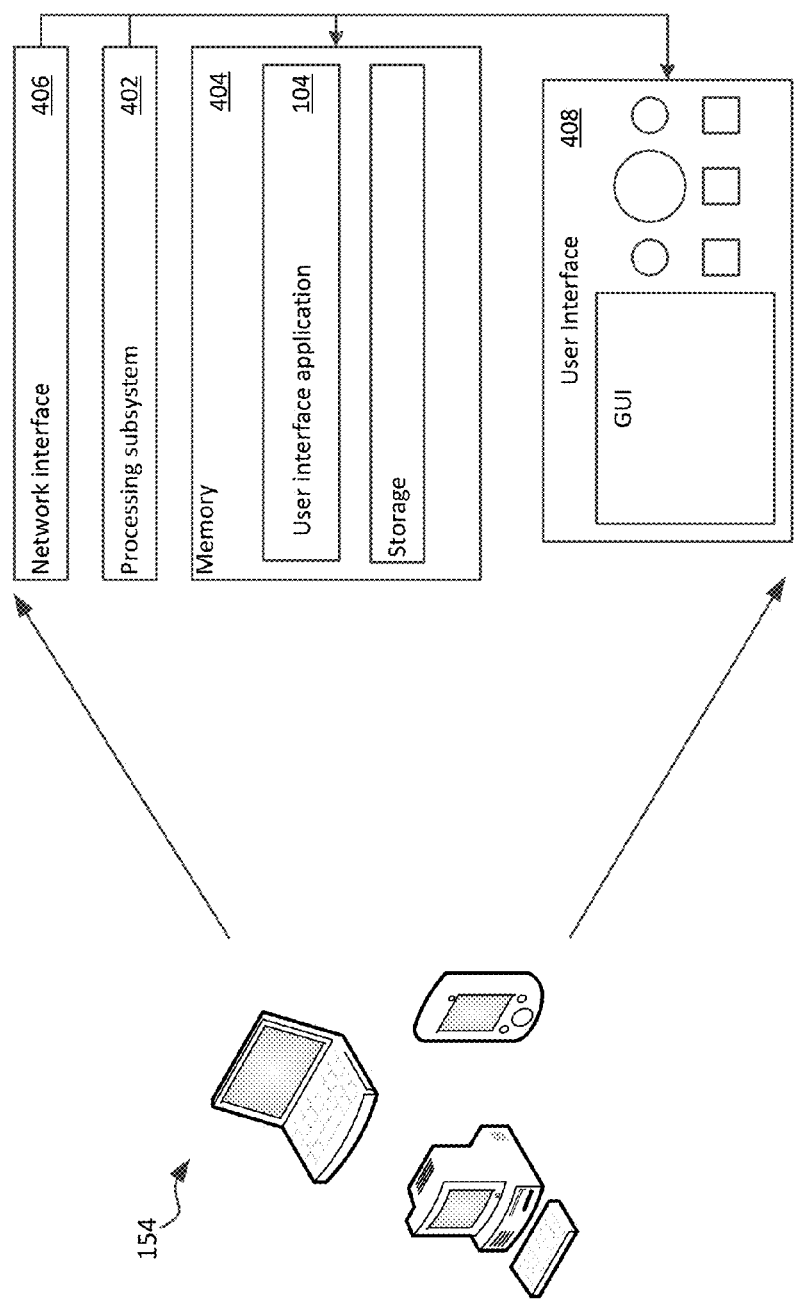
FIG. 4 shows an example user terminal architecture.

Referring now to FIG. 4, an exemplary implementation of the user terminal 154 is shown. The user terminal includes a processing subsystem 402, memory 404, a network interface 406, and a user interface 408.

The processing subsystem 402 is configured to execute one or more instances of the user interface application 104. The processing subsystem includes one or more processors such as those discussed above with respect to the server 152.

The memory 404 includes memory and paging support for the execution of the user interface application 104 and storage to support such execution. The memory 404 may include memory as discussed above with respect to 304 and mass storage as discussed above with respect to 306.

The network interface 406 is configured to support one or more connections to aid applications 102 running on the server 152. Similarly, this network functionality may be provided by wired networking hardware and/or wireless networking interfaces.

The user interface 408 includes a display (e.g. LCD, OLED, CRT etc.) and at least one human input device (mouse, keyboard, touchscreen, etc.) to support input by the user and feedback to the user from the aid applications 102.

It will be readily appreciated that the functions of the user terminal 154 and server 152 may be provided by a single computer. In such an implementation, the network interfaces 308 and 406 may be obviated. However, such a network interface may still be used to establish connectively to third-party services and applications.

In addition, either of the server 152 or the user terminal 154 may be implemented on a mobile device such as a smartphone, phablet, tablet, laptop, and/or other portable computing device.

In various implementations, users of the PAS 100 may be provided with specific frontend views. These frontend views may allow viewing of multiple projects under the user's purview. For example, the projects may be projects for which user is an author, collaborator, reviewer, reader, project administrator, funding administrator, etc. These frontend views may be provided via a graphical user interface of software application running locally on the user terminal 152. Alternatively or additionally, the frontend views may be provided in part by a network application running on a remote server (e.g. a website, web application, network application, etc.).

The user may be provided with management options for the multiple projects and receive updates related to the projects. For example, a user may receive an alert when a project is published and/or when another published work makes reference to a project. The user may also receive statistical analyses based on the projects. For example, the comparative productivity of different publishing groups under a given user's supervision may be visible to the user. In some cases, the user may be able to make decisions on whether to further a project or take another action such as cancelling a project from the user dashboard. The options available to the user may depend on user permissions and the intend applications of a given frontend.

In various implementations, the frontend may provide the user with tools for promotion of projects on social networks (e.g. Facebook, Google+, Twitter, LinkedIn, ResearchGate, etc.). For example, the frontend may support automated generation of short summaries of projects for social media posts (e.g. 144 character summaries, short paragraph summaries, representative media selections, etc.).

Figure 5:
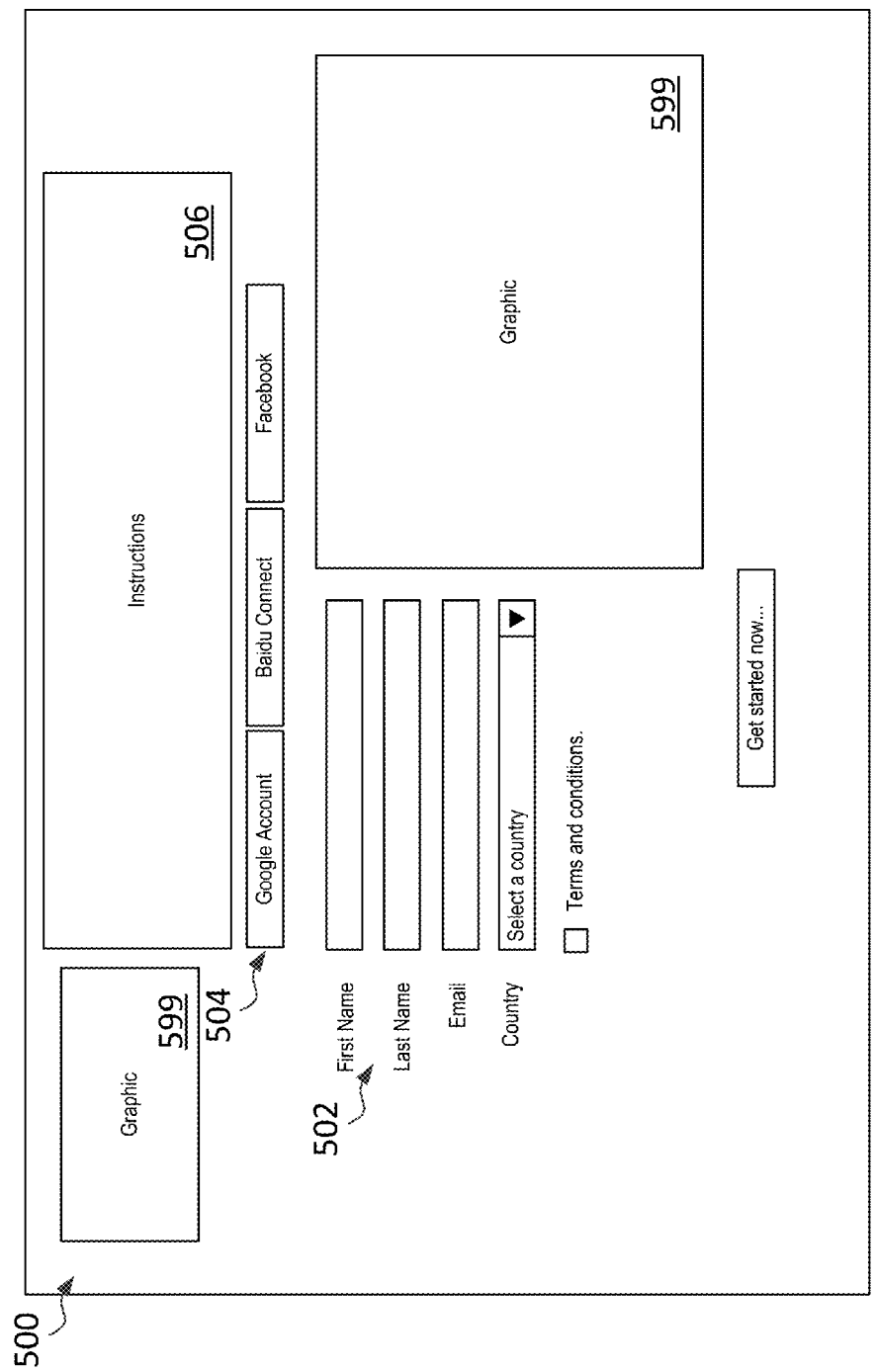
FIG. 5 shows an example user interface for registration.
Figure 58:
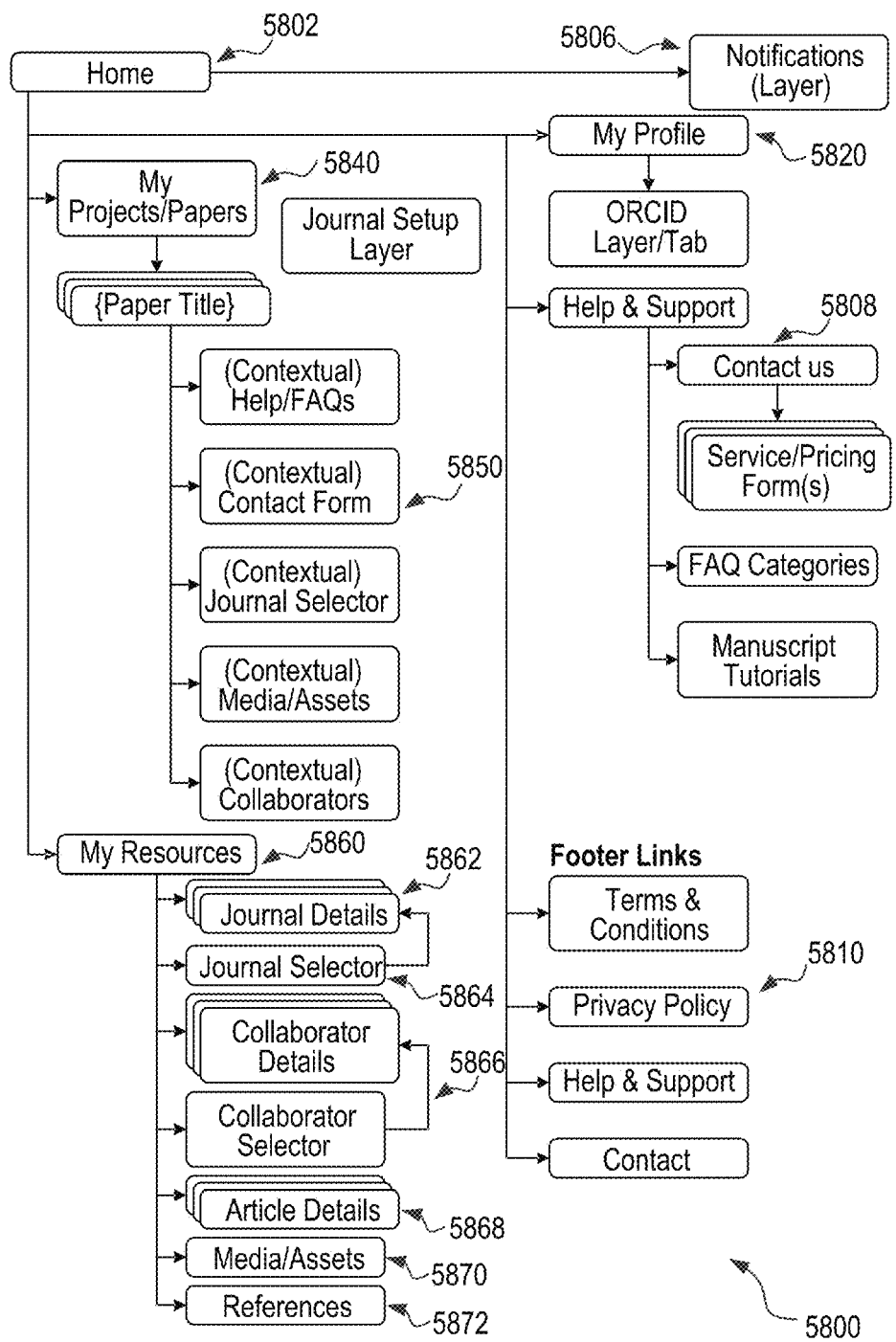
FIG. 58 show an example interface layout 5800 for the AP tool.

In one or more possible implementations, the PAS 100 may be implemented as the Edanz Author Path (AP) tool. FIGS. 5-58 show example interfaces for using Edanz AP tool.

Figure 6:
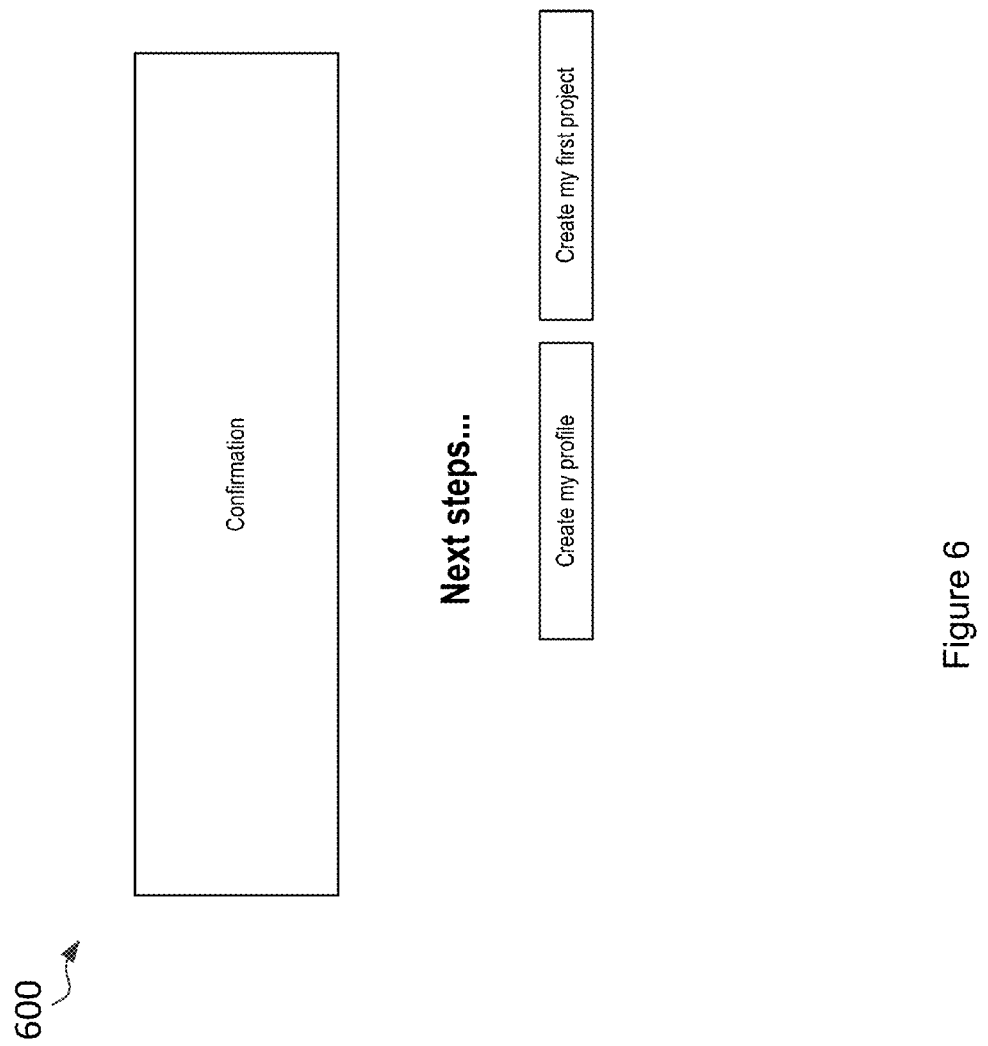
FIG. 6 shows an example user interface for registration confirmation.
Figure 7:
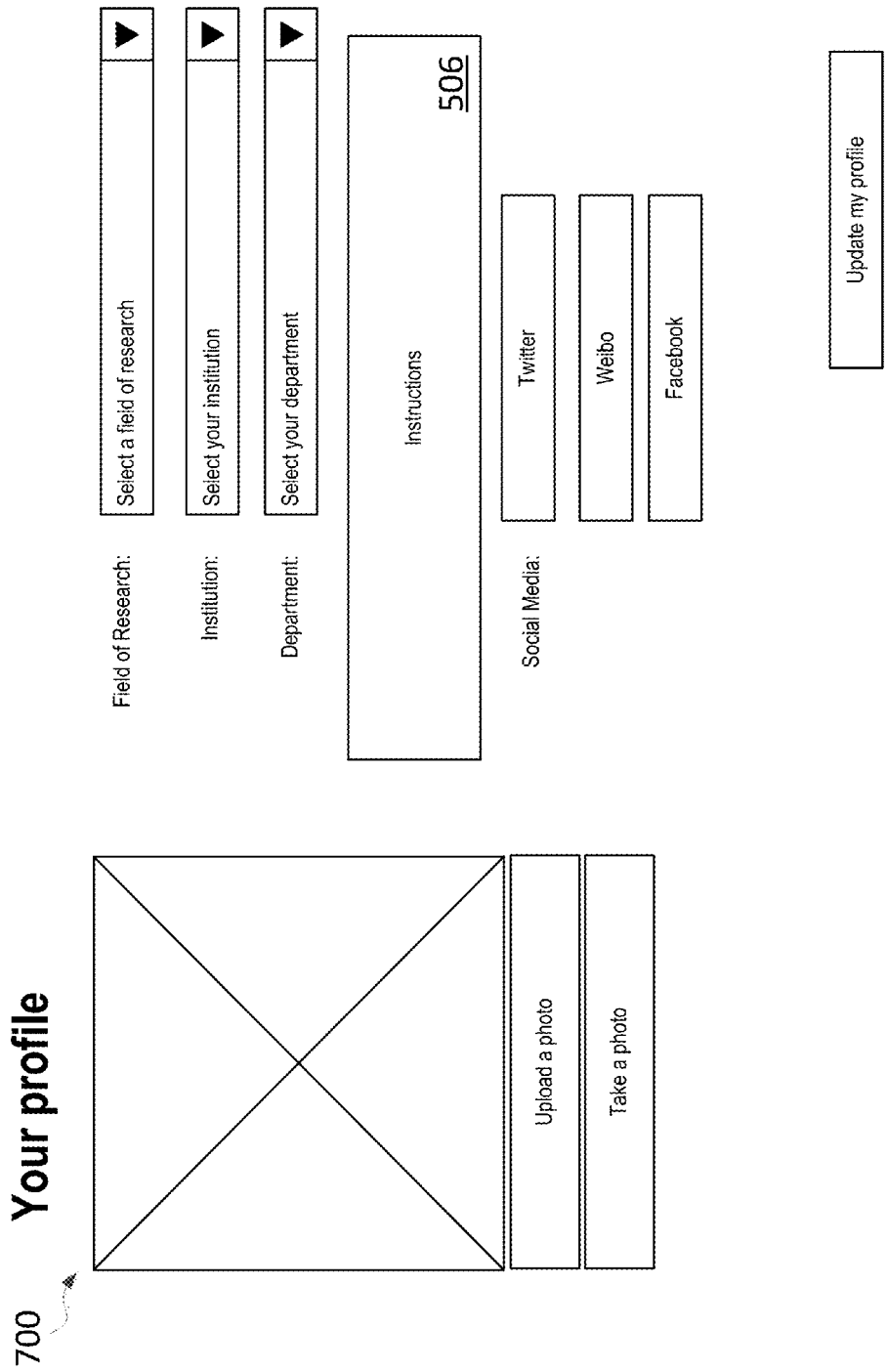
FIG. 7 shows an example user interface for profile management.
Figure 8:
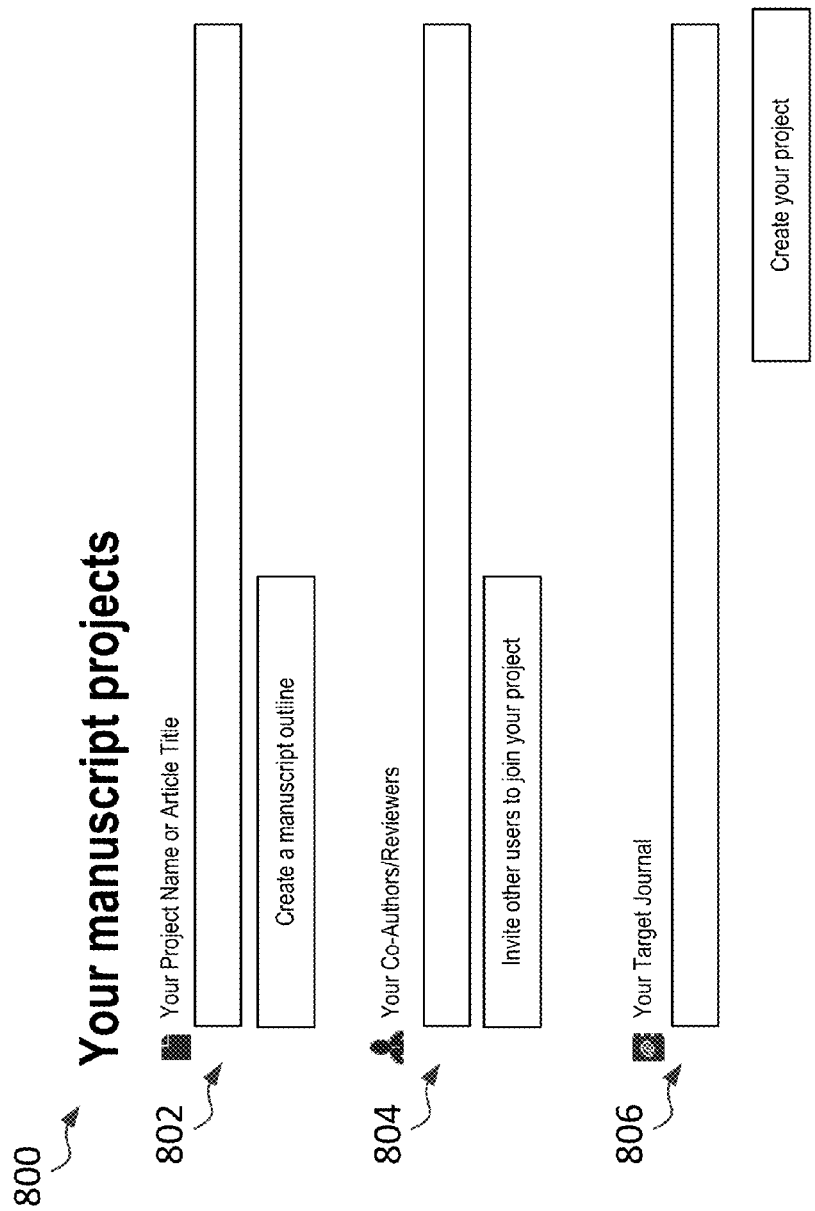
FIG. 8 shows an example user interface for project setup.

The user registers for the AP tool service by providing information about himself or herself (FIGS. 5-14), institution, identifying their field of research, and indicating if decided already their target journal (which may have been supported by using the existing Edanz Journal Selector tool (FIG. 14), and which will be available and used at different stages of the AP tool). These latter two pieces of information, field of research (FIG. 13) and target journal, are used to adapt the user experience and the output of the AP tool. This changes the information requested from the user and is used to guide the writing and structure of the manuscript. FIG. 5 shows an example registration interface 500 for the AP tool. A user may enter their personal information in fields 502. A user may link to third-party social networking services via link 504. In some implementations, information may be automatically ported from such third-party services. Instructions 506 may include various media to guide the user through the current interface. Instructions 506 may adapt to the current interface environment presented to the user. Graphics 599 may be used to display various materials of potential interest to the user, for example, branding or promotions. FIG. 6 shows an example user interface for registration confirmation. FIG. 7 shows an example user interface 700 for profile management. FIG. 8 shows an example user interface 800 for project setup. The user may input initial information into the project setup page fields 802, 804, 806 if known at project initiation. Unknown or missing elements may be input or generated at later phases in the project. FIG. 9 shows an example user interface 900 for a project outline creation. The user may begin editing any of the various sections of the manuscript by selecting the section on the outline interface 900. The outline interface 900 is shown using a scientific journal template outline. Additionally or alternatively other outline templates may be used, for example social science templates, op-ed templates, or other article outline templates.

Figure 10:
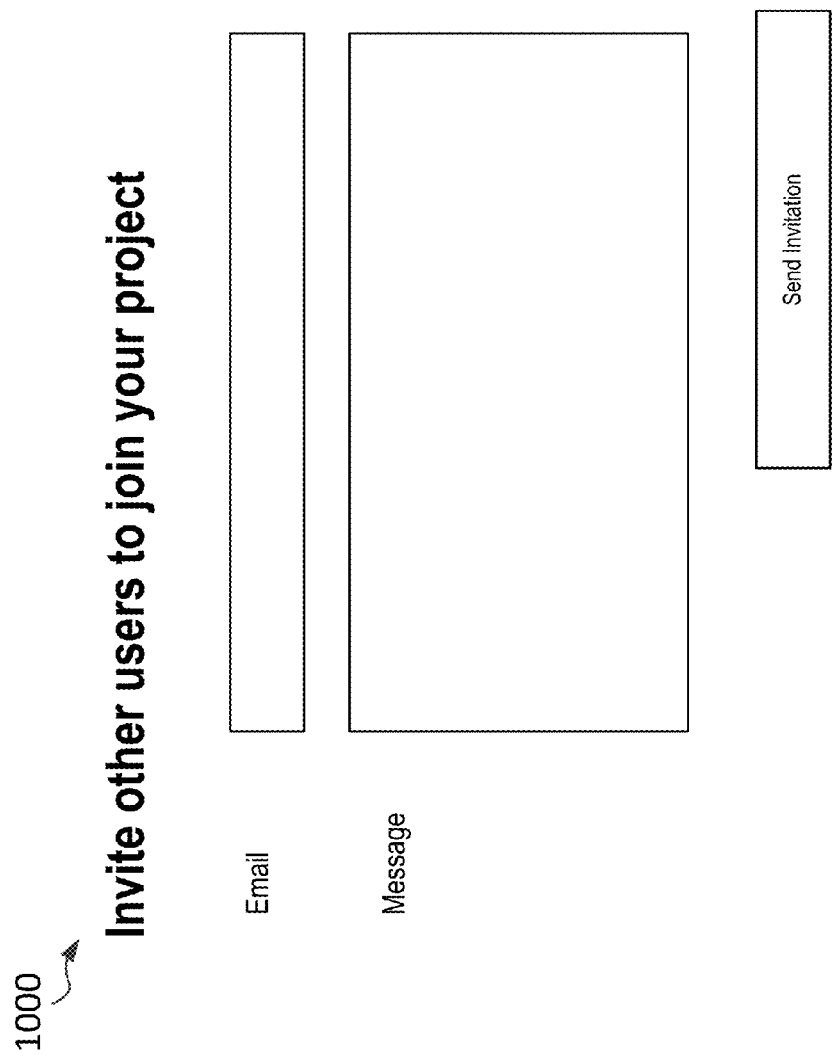
FIG. 10 shows an example user interface for inviting collaborators.

FIG. 10 shows an example user interface 1000 for inviting collaborators. Once the profile is set up a user may create a manuscript product and invite other users to collaborate with them on the product (FIG. 10). Co-authors can be set up with varying levels of access to the manuscript or portions of it. These users might be lab colleagues involved in the labwork, or a specialist needed to complete the manuscript, such as a statistician. Users may join at various stages. For example, a primary author may join first, then a secondary author, and at a later time a reviewer.

FIG. 11 shows an example user interface 1100 for multi-project management. From the multi-project interface 1100, a user may view title 1102, data 1104, and/or status information 1106 for projection on which the user is involved. For example, the user may be able to view projects for which the user is a co-author and projects for which the user is a reviewer.

Figure 12:
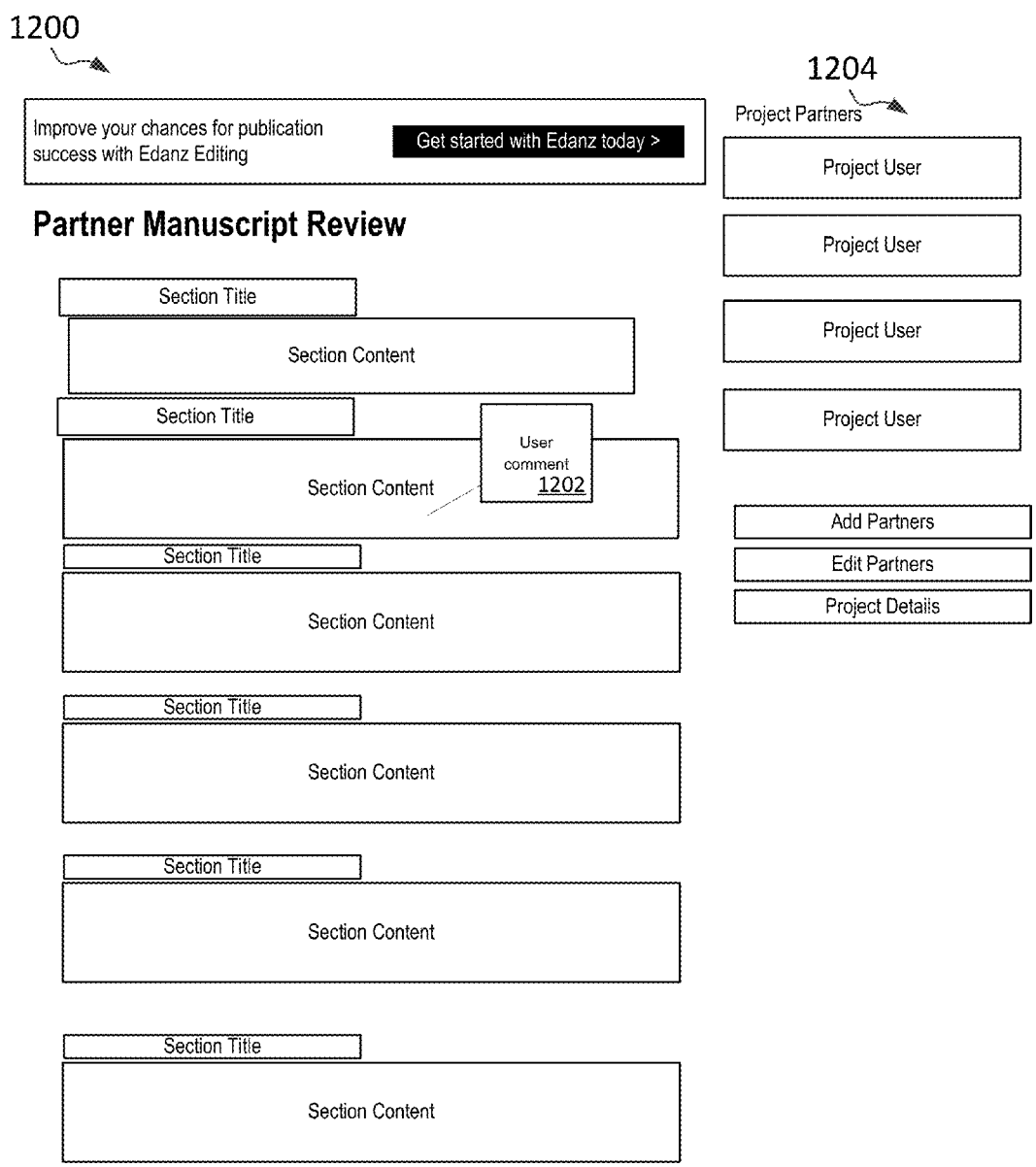
FIG. 12 shows an example user interface for multi-user editing of a project.

FIG. 12 shows an example user interface 1200 for multi-user editing of a project. A user may generate comments 1202 viewable by other users in the project. The project user field 1204 may list users involved in the project. A user may user the project user field to manage the users in the project. For example, a user may add or remove another user. Additionally or alternatively, the project user field may be used to direct messages to other users involved with the project.

FIG. 13 shows an example user interface 1300 for project field selection.

Figure 14:
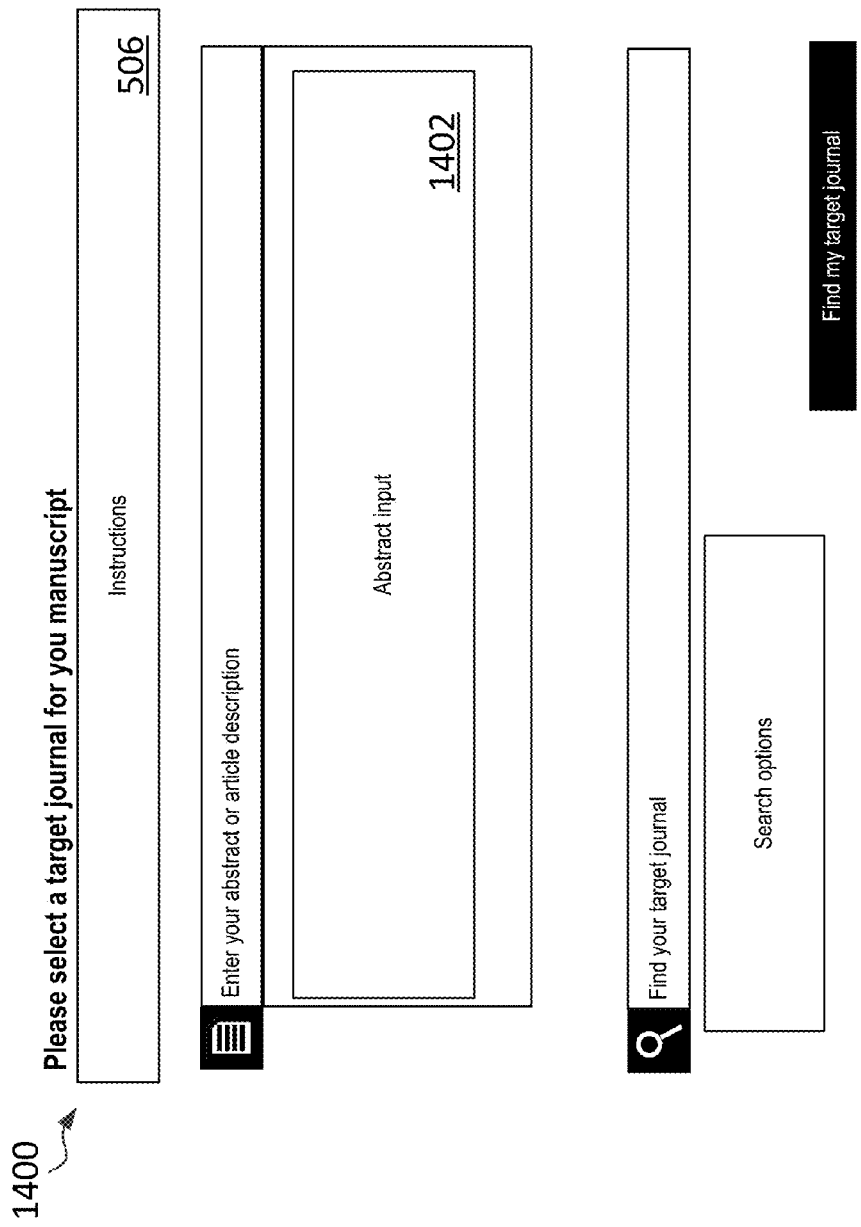
FIG. 14 shows an example user interface for guided journal selection.

FIG. 14 shows an example user interface 1400 for guided journal selection. The user may input their abstract into field 1402 and the AP tool search for journals with appropriate subject matter matches. The user may delay selection of the target journal and begin drafting without providing this information. A user that has delayed this decision may be prompted periodically to make a selection during the drafting process. Additionally or alternatively, the AP tool may determine a target journal through a background process without a specific user target journal selection. In some case, the AP tool may select a class of publications with similar formatting guideline. For example, the AP tool may select journals that publish medical review articles as a class. Thus, the user may be directed by the AP tool using general guidelines rather than specific guidelines.

The AP journal selector tool may include various prompts to aid users in selecting a target journal. FIGS. 15-21 show example user interfaces for journal selection. As discussed above, a user may input their manuscript details to assist in the selection of a target journal. At the search by manuscript prompt of the AP journal selector tool (FIG. 15), the user may input their manuscript title or keywords in field 1502 associated with their manuscript. Additionally or alternatively, the user may enter a section of text from their manuscript in field 1504.

The example user interface 1500 for journal selection may include explanatory media 1599, which may include various media elements to assist the user in completion of tasks being addressed by the current interface environment. For example, for this journal selection-related interface 1500, explanatory media 1599 may include a video clip of an expert explaining the why selecting a proper journal may resulting be better publication outcome. The explanatory media may be adapted to the user's previous inputs. For example, an experienced user may without aid select a journal well suited to the user's project. The AP tool may then select explanatory media 1599 showing similar journals to consider a backup publications if submission to the first selection does not succeed. A novice user may be presented with media about the basic ideas to consider when selecting a journal. Similarly, explanatory media 1599 may be context specific. For an outline related interface, media related to outlines may be shown. In other interface environments, for example a results section related interface, media related to the drafting of a results section may be shown.

Figure 16:
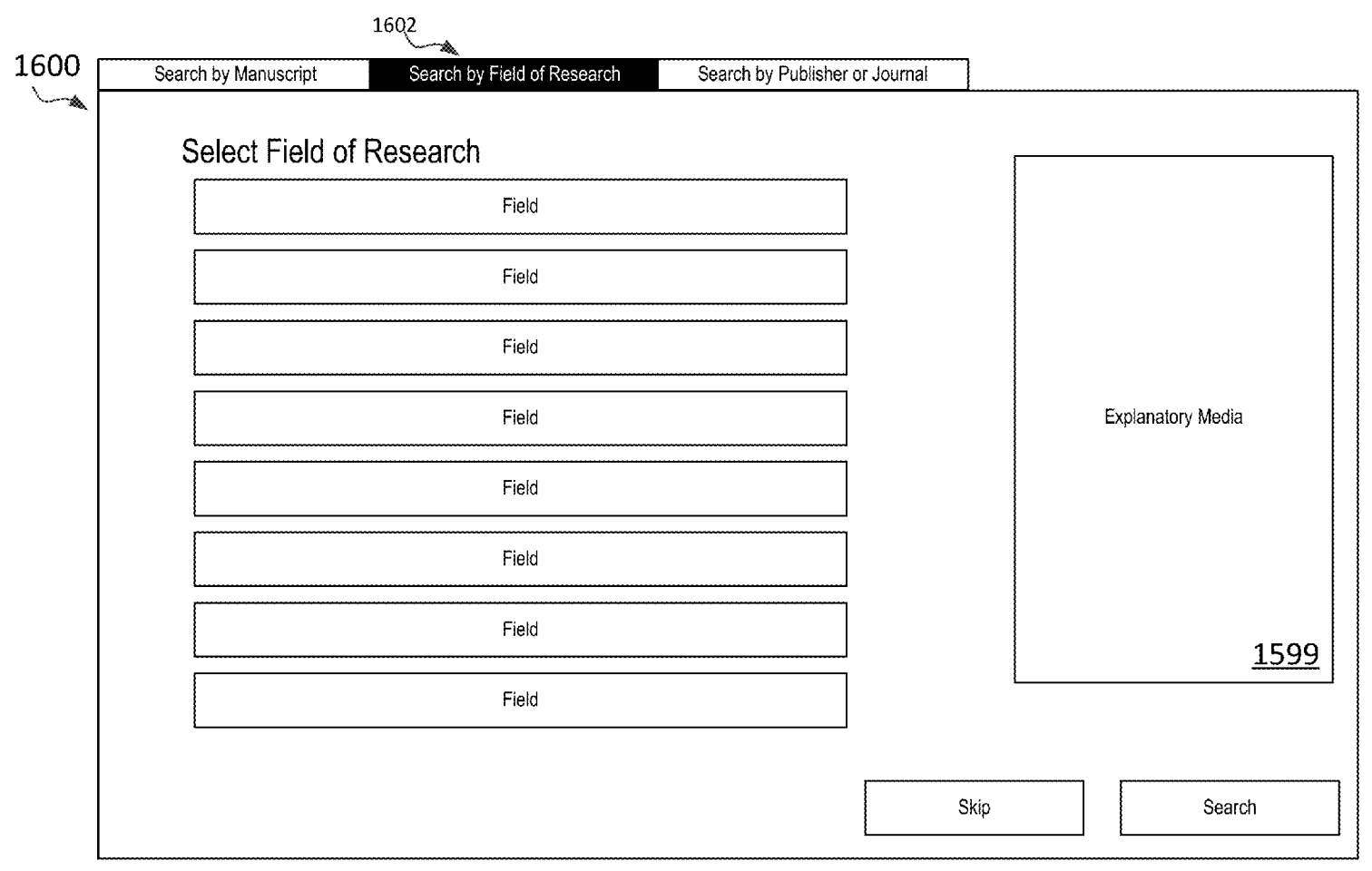

In various implementations, users may select (for example, by selecting a tab 1602 on the AP journal selector prompt) to access an interface 1600 allow the user to search by the field of research of their manuscript (FIG. 16). The user may select a broad field area, such as biology, and may be give sub-field options to further refine their search terms. Once the sub-fields are selected, the user may have the AP journal selector tool execute the search. Additionally or alternatively, the journal selector tool may list search results based in the initial field of research input. Subsequent sub-field selections may cause the AP journal selector tool to dynamically refine the listed results.

Figure 17:
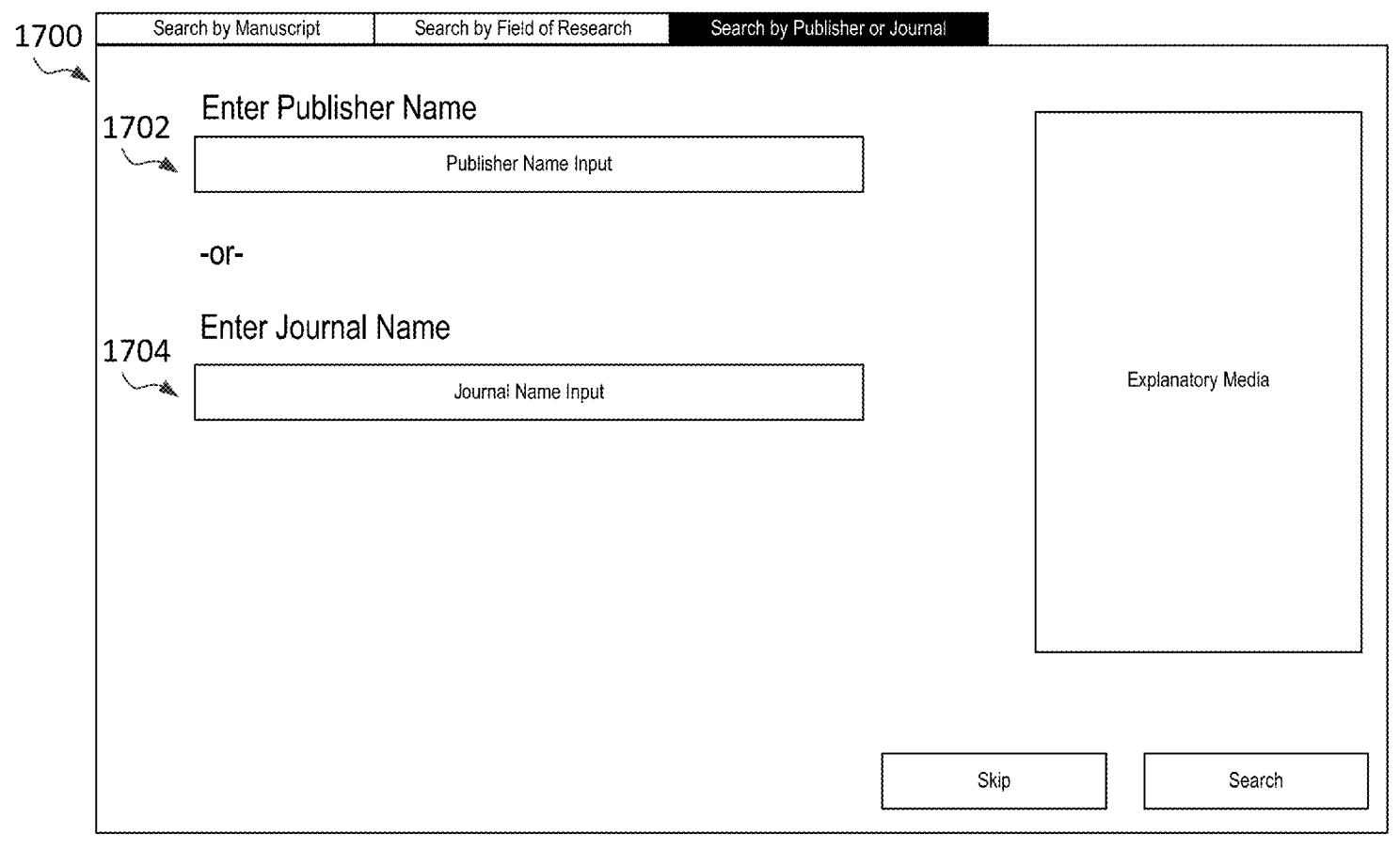

In some implementations, the AP journal selector tool may allow for a search based on other journal information (FIG. 17). The example search interface 1700 may be used to search by publisher name or journal name using the fields 1702, 1704. For example, the user may search by publisher or search for a journal by name (or partial name).

Figure 18:
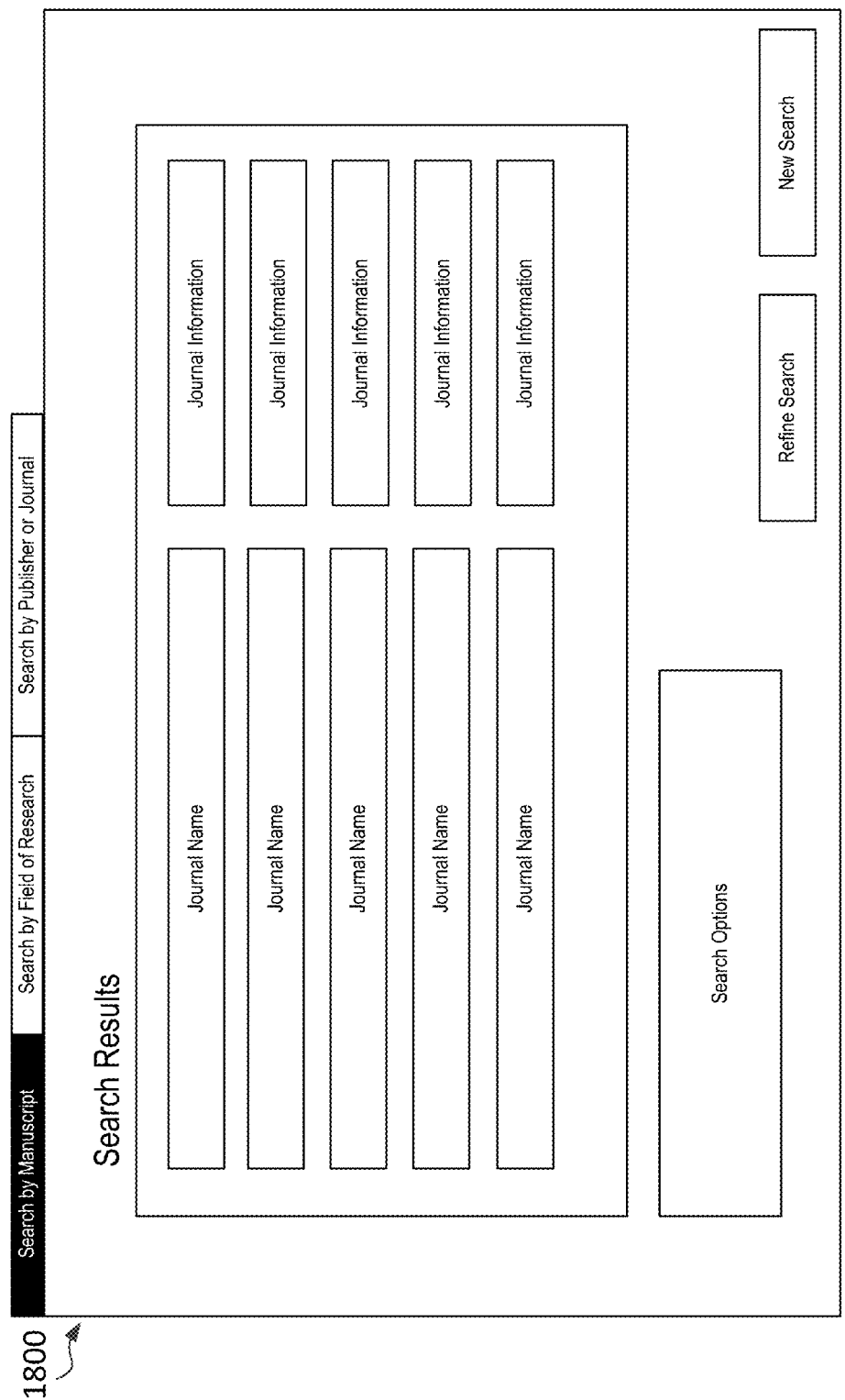
FIG. 18 shows an example user interface for journal selection.
Figure 19:
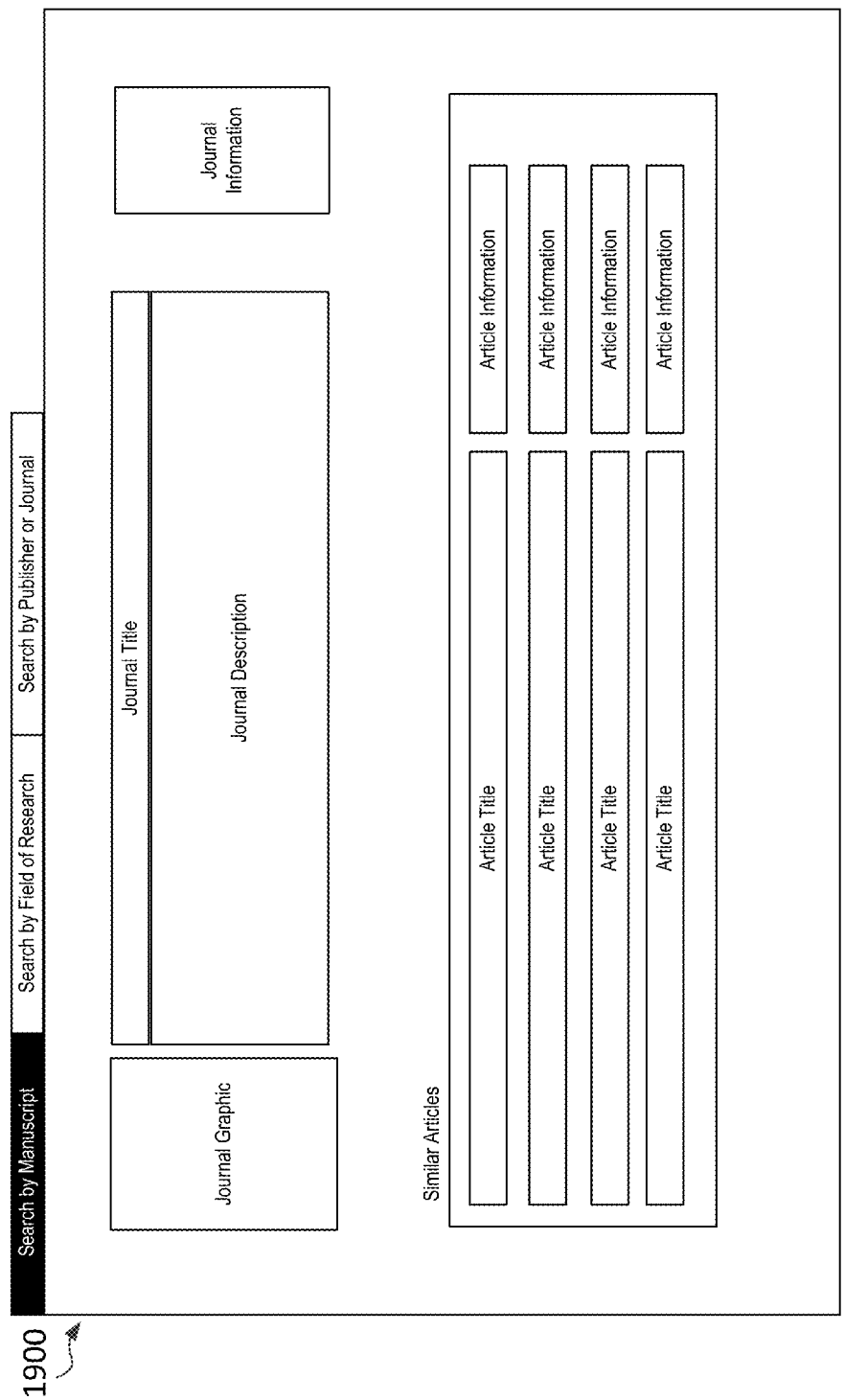
FIG. 19 shows an example user interface for journal selection.
Figure 20:
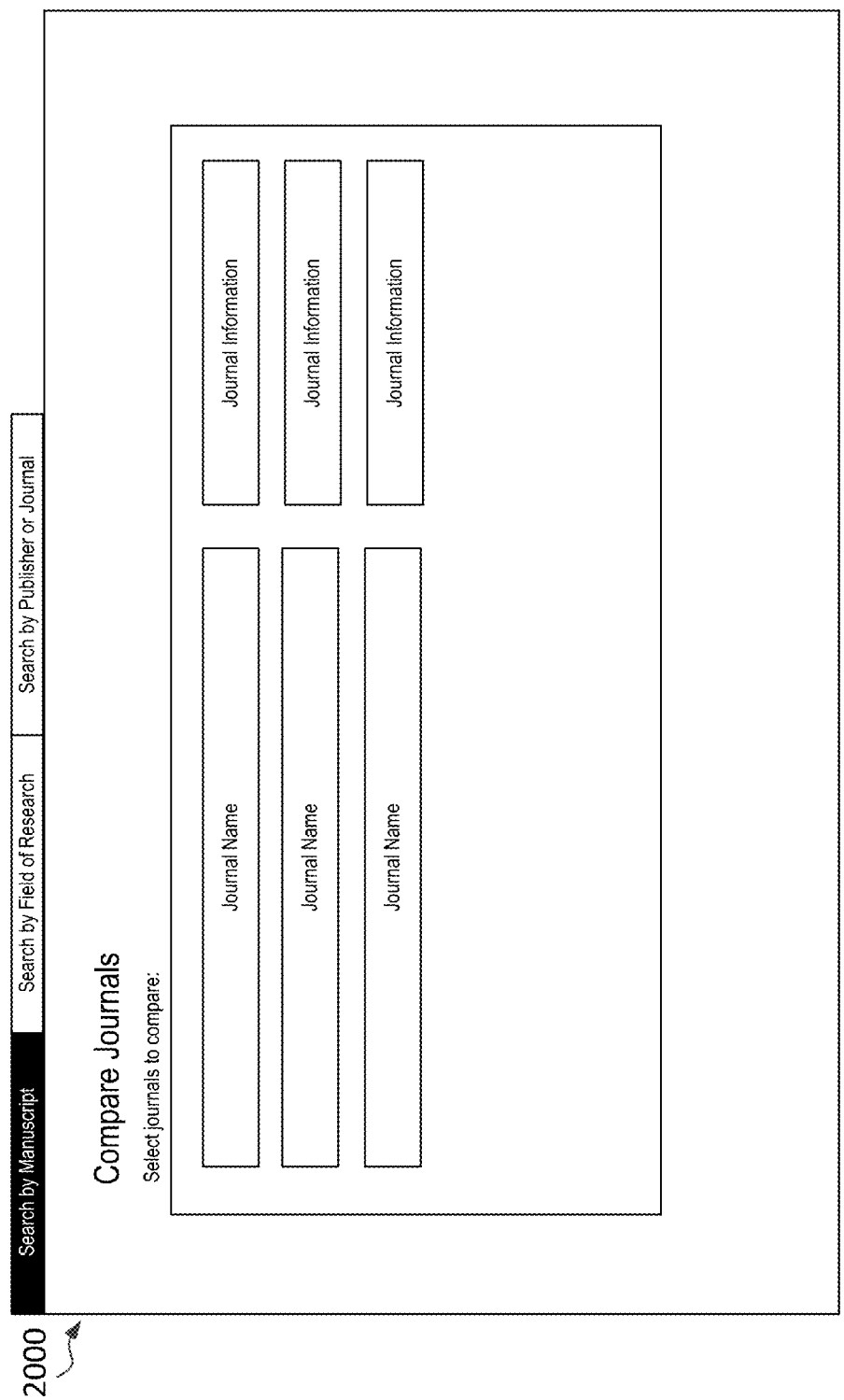
FIG. 20 shows an example user interface for journal selection.
Figure 21:
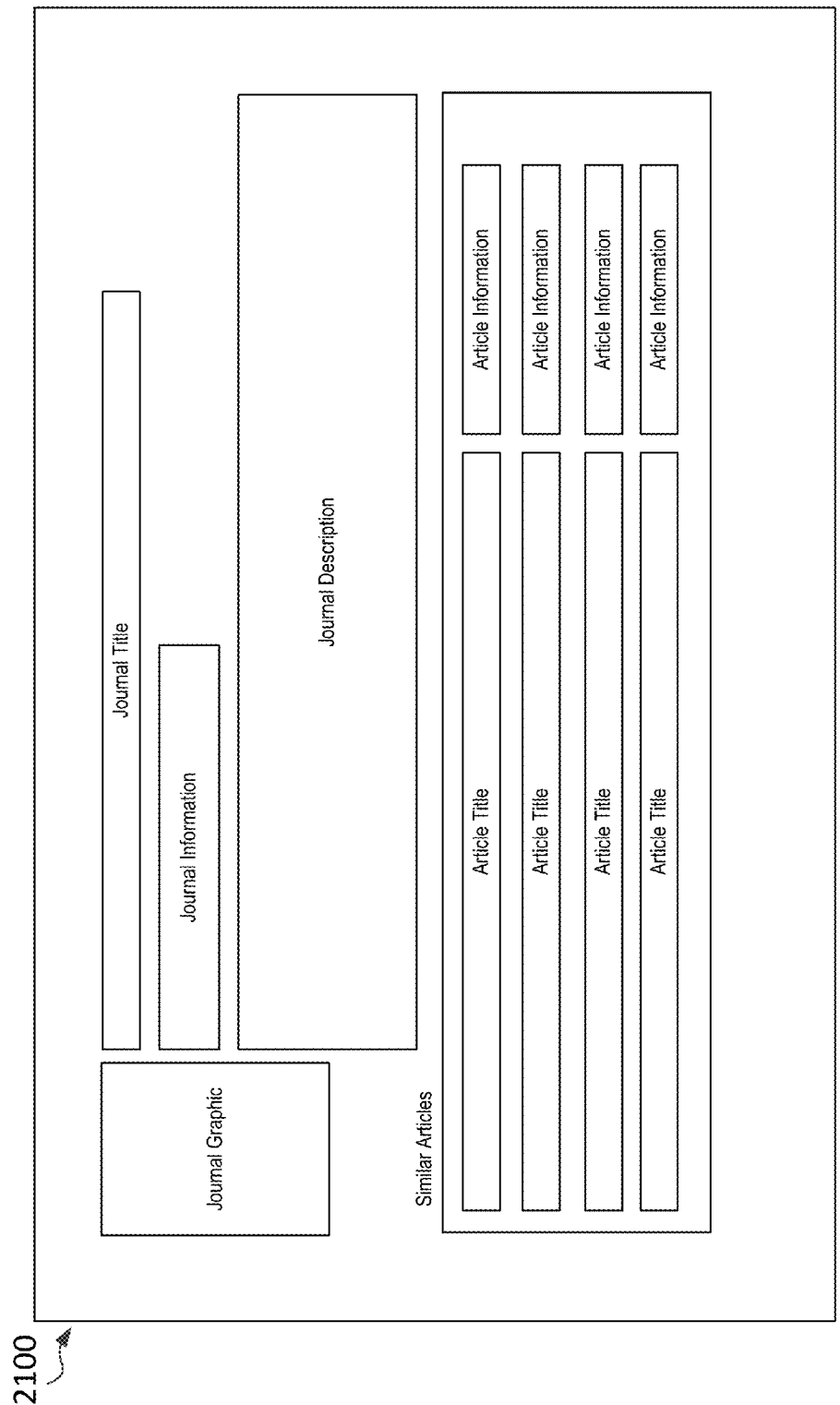
FIG. 21 shows an example user interface for journal selection.

The AP journal selector tool may display multiple search results via the example search result interface 1800, shown in FIG. 18. In some cases, a summary of the journal details, such as impart factor, publisher, access model, or other details, may be included in the search results view. The search results view may allow the user to further refine or organize the search based on the journal details. For example, the search results may be refined using the impact factor range tool and/or the access model selection options (FIG. 18). Additionally or alternatively, the user may view journal matches individually, using the journal detail view interface 1900. The user may view the individual results to view more details such as aims and scope, statistics on subject matter publishing, submission rejection rate, publisher information, editorial staff contact information, relevant articles published in the journal based on search terms, or other journal details (FIG. 19). The AP journal selector tool may also allow the user to compare multiple journals using the comparison interface 2000, shown in FIG. 20. Details from the individual ones of the compared journals may be listed side-by-side for quick comparison. The journal selector tool may also include individual journal information pages that may include various ones of the details described above and/or other details. In some implementations a user may view individual journal information pages in the journal viewer interface 2100, show in FIG. 21.

Figure 22:
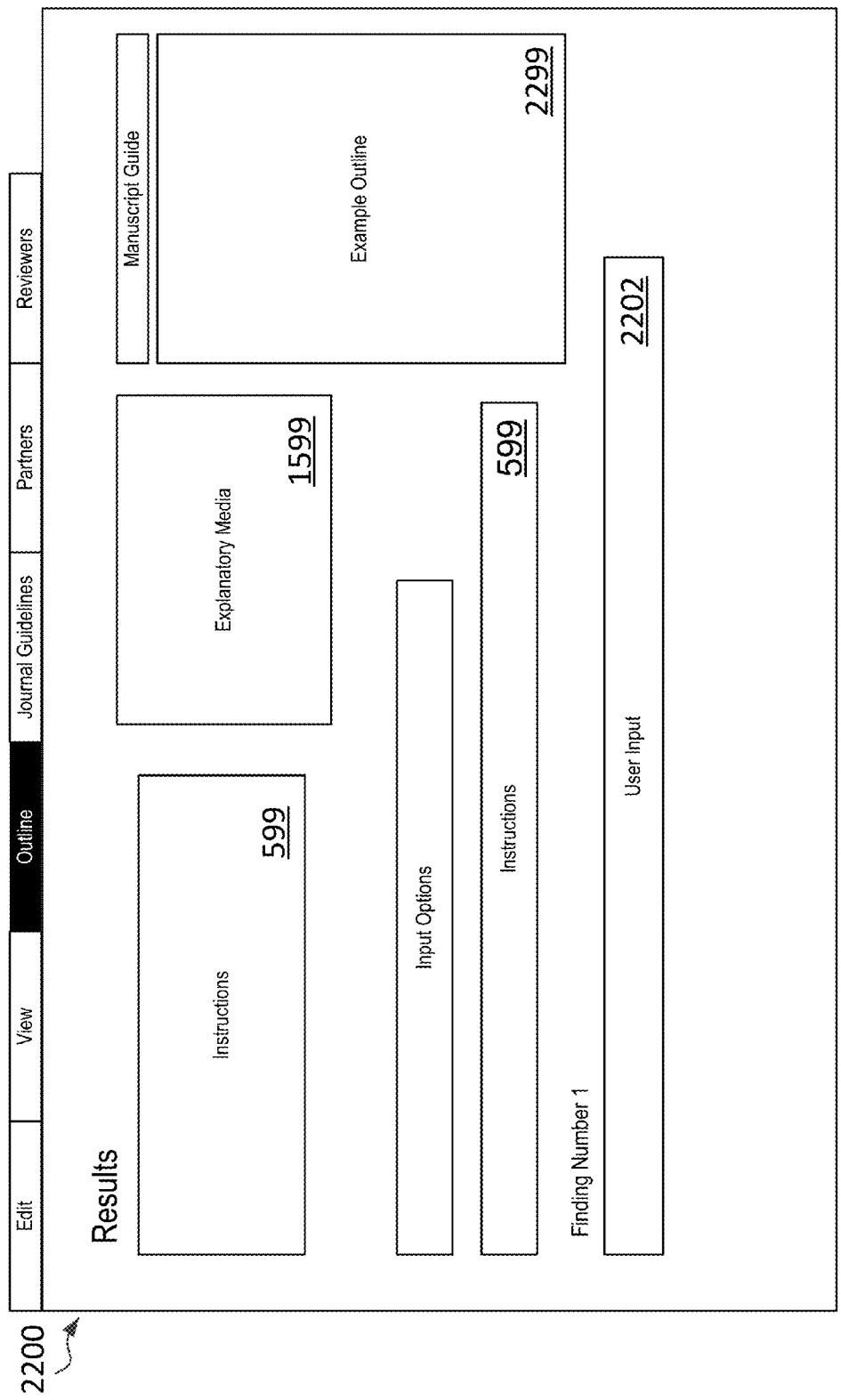
FIG. 22 shows an example user interface for editing a results section in an outline mode.
Figure 23:
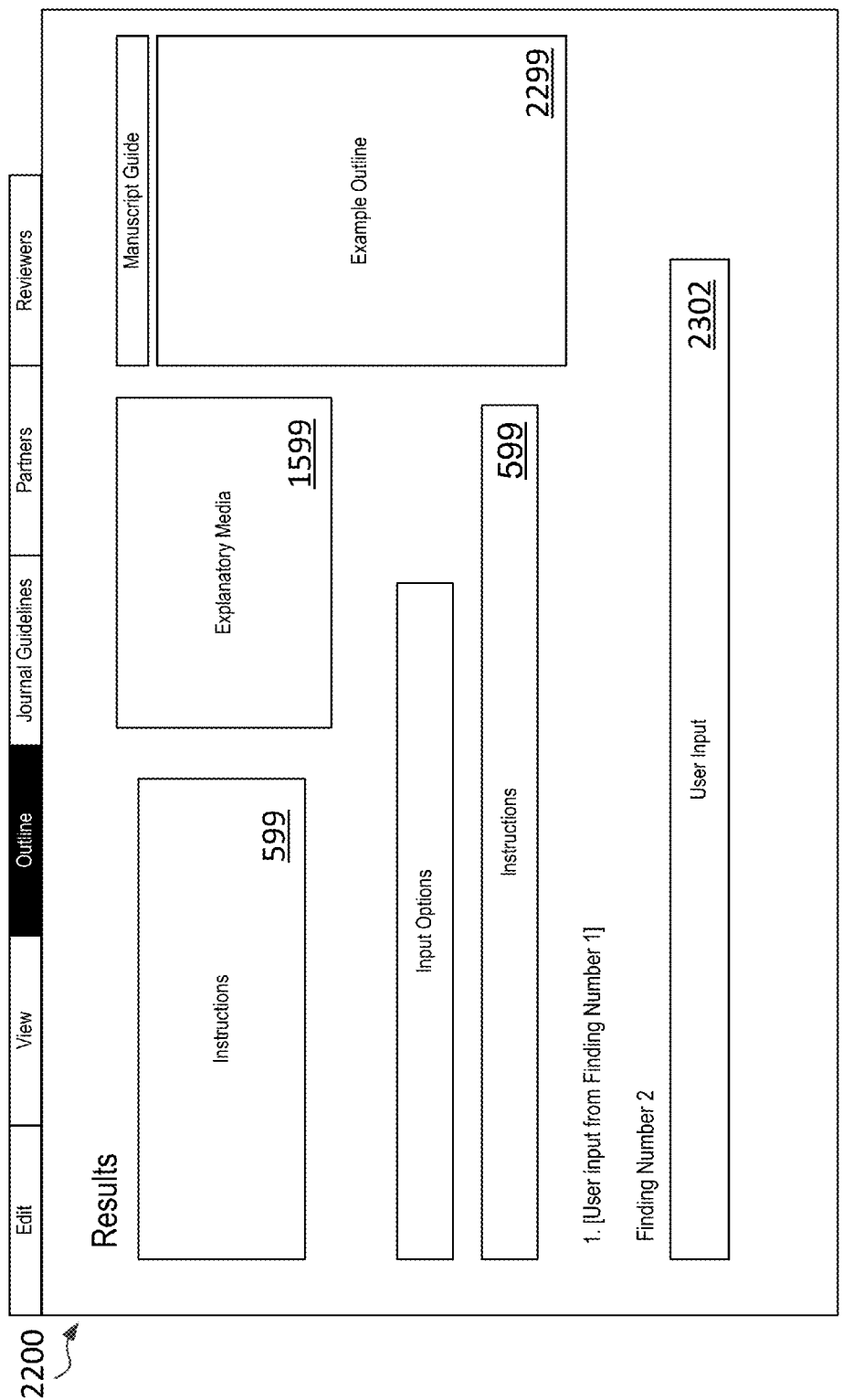
FIG. 23 shows an example user interface for editing a results section in an outline mode.
Figure 24:
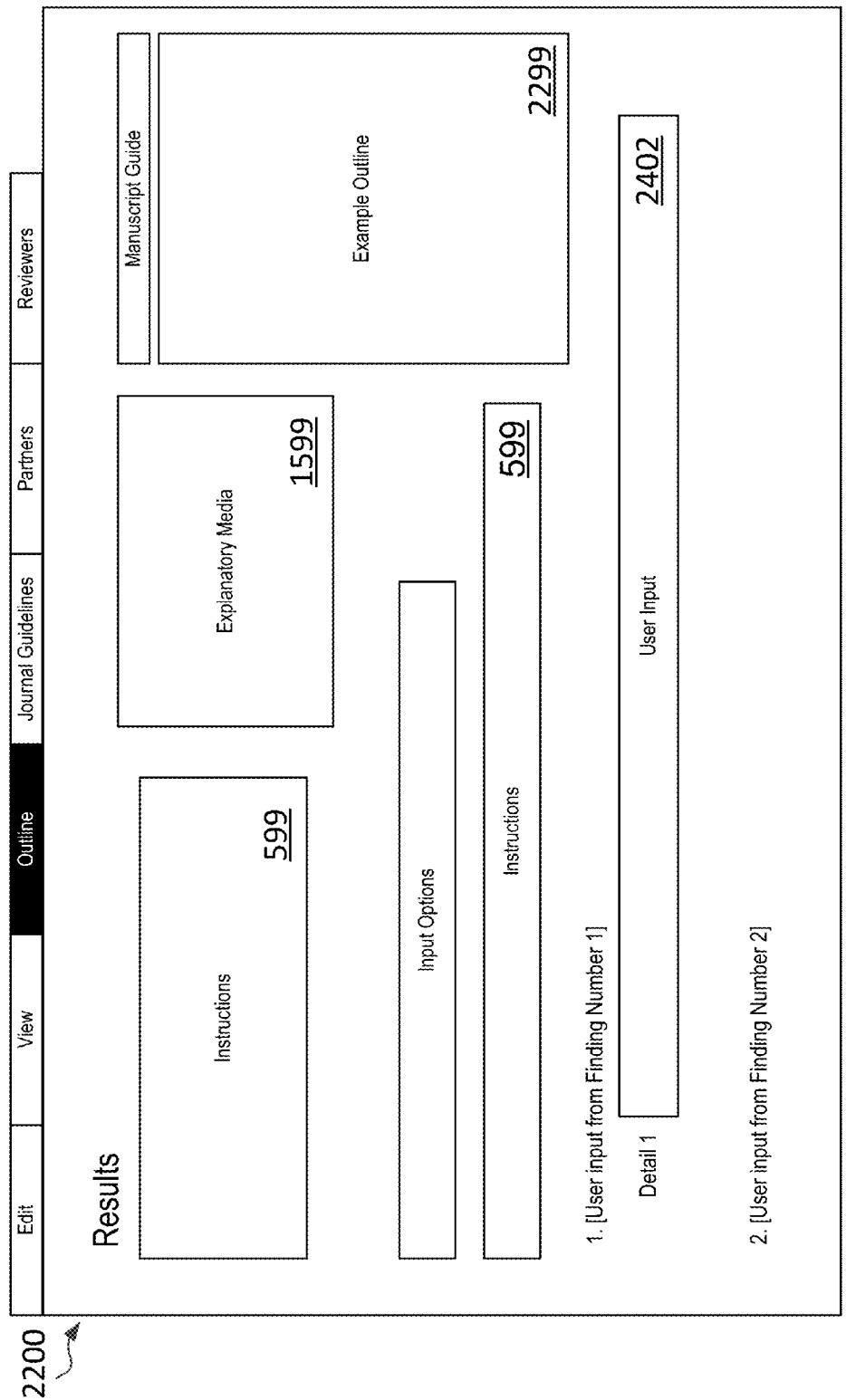
FIG. 24 shows an example user interface for editing a results section in an outline mode.
Figure 25:
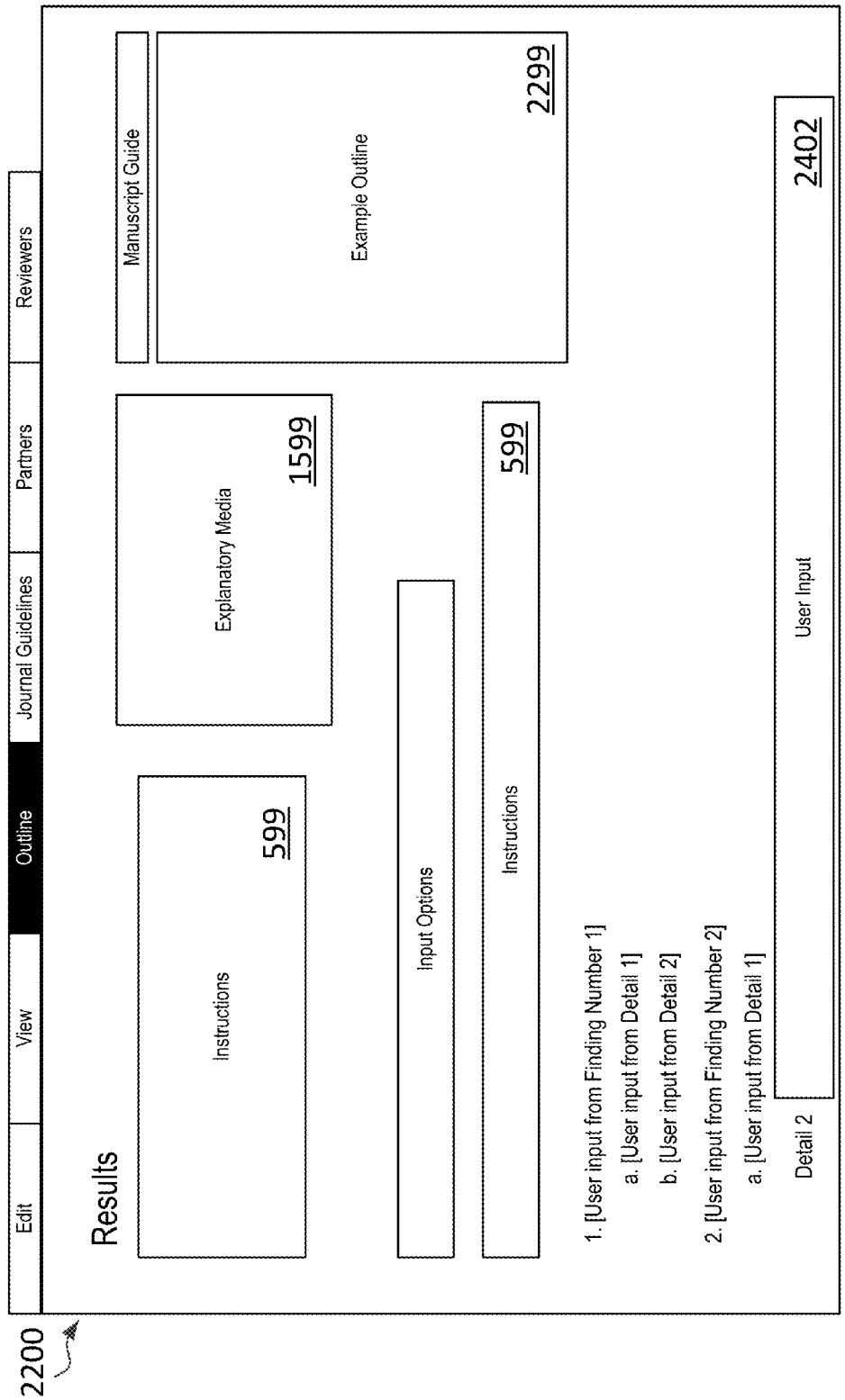
FIG. 25 shows an example user interface for editing a results section in an outline mode.

The manuscript section editing functions of the AP tool may be presented in an alternative parallel outline viewing mode. The outline viewing mode may present the sections in a bullet point summary form. FIGS. 22-25 show example user interfaces for editing a results section in an outline mode. The interfaces may include instructions 599, explanatory media 1599, and an example outline 2299. Referring to FIG. 22, the example interface 2200 may provide a prompt 2202 in which the user may input a bullet point listing a finding. If the results section is subsequently viewed using a non-outline mode prompt, the bullet point entries with be included in the text content of the results section prompt. The outline viewing mode of the results section may provide the user with subsequent prompts 2302 for further bullet points detailing more findings for the result section (FIG. 23). The numbering system may also use multiple tiers. An example multi-tiered outline shown in FIGS. 24 and 25. A sub-level prompt 2402 may be used to get input at lower tiers. For example, the multiple tiers may be indicated by indenting and/or changes in numbering or bullet style. The user may add, remove, and move bullet points.

In various implementations, the outline formatting may be removed from the entry when the section is viewed in a non-outline mode. For example, in some cases, the user may input preferences such that top-tier entries are formatted into sub-section headers, and lower tier entries for topic sentences for paragraphs or other portions of the text. The preferences may be applied in reverse to generate a bullet point based outline view when viewing sections drafted using non-outline view prompts. In various implementations, formatting may be consistent across views.

The inclusion of the results section outline view mode prompt is exemplary. Other sections may be presented in an outline view mode. For example, methods, conclusion, or others of the sections discussed below may be presented in an outline viewing mode.

Figure 15:
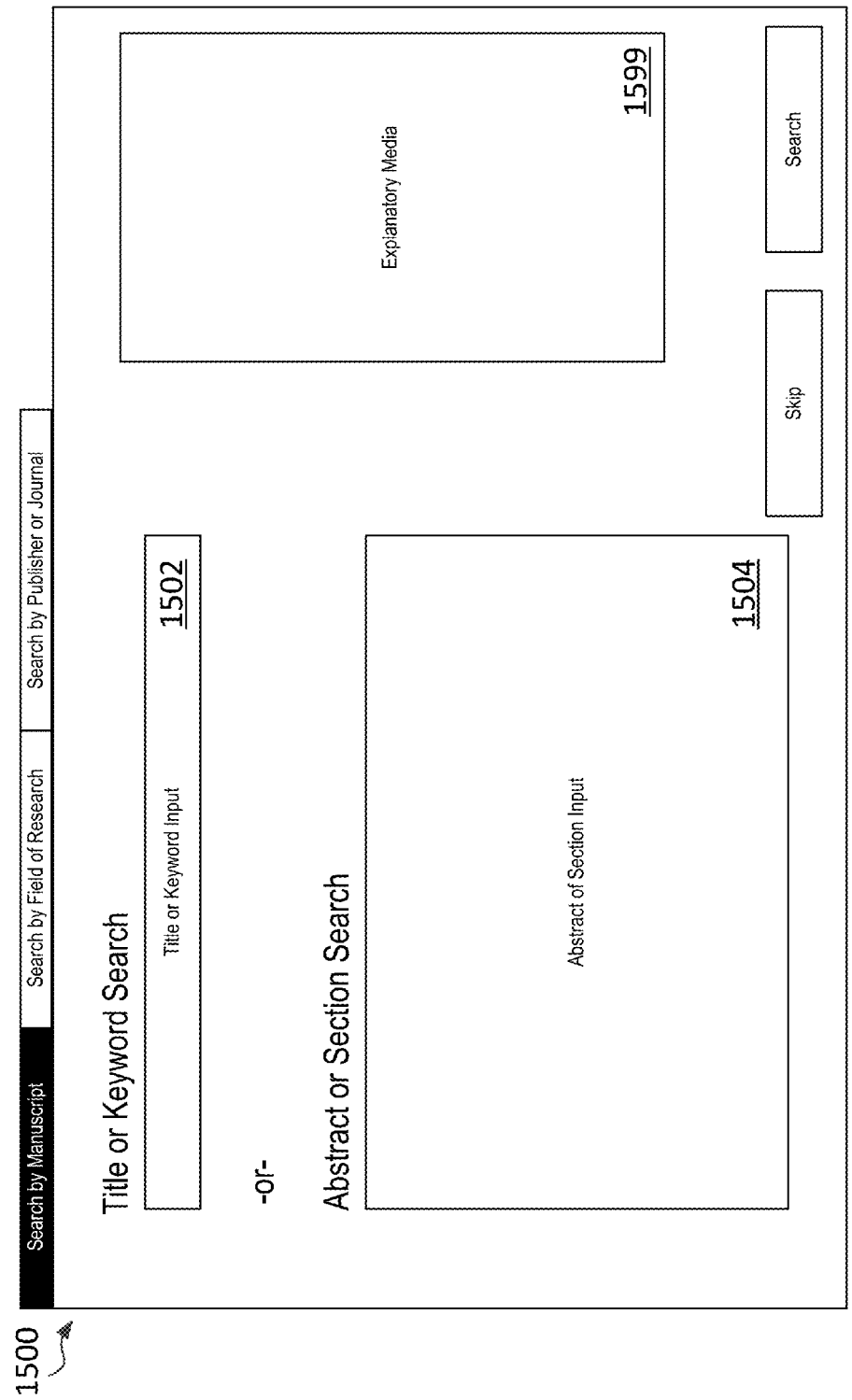
FIG. 15 shows an example user interface for journal selection.

FIG. 26 shows an example user interface 2600 for generation of a project outline. The example user interface 2600 may show the user a section level outline of their project and allow navigation to various sections to add content. The manuscript creation process begins with a series of prompts to assist in the creation of an outline (FIG. 15). This outline may differ based on their field of research or the target journal they have selected. This is because different journals have different requirements for different sections. Thus, this series of prompts differ based on the earlier questions related to target journal and field of research.

Once the outline has been created, manuscript drafting may begin, or in many cases, continue with other parts of their manuscript the users may have already begun drafting. At this time, the users may be prompted to upload their references from any management software they use or they can also manually enter the references (FIGS. 27-).

For the various stages, explanatory media 1599 instructions 599, and/or example references 2799 related to that stage are provided by the AP tool. This helps provide contextual instructions and guidance to the user about how to approach each section. Example interface 2700 (FIG. 27) may provide the user with option of an interface 2800 (FIG. 28) for uploading their references or an interface 2900 (FIG. 29) for manual entry of their references. For uploading, the user may be given the option of uploading their references in one or more common reference manager formats.

Figure 30:
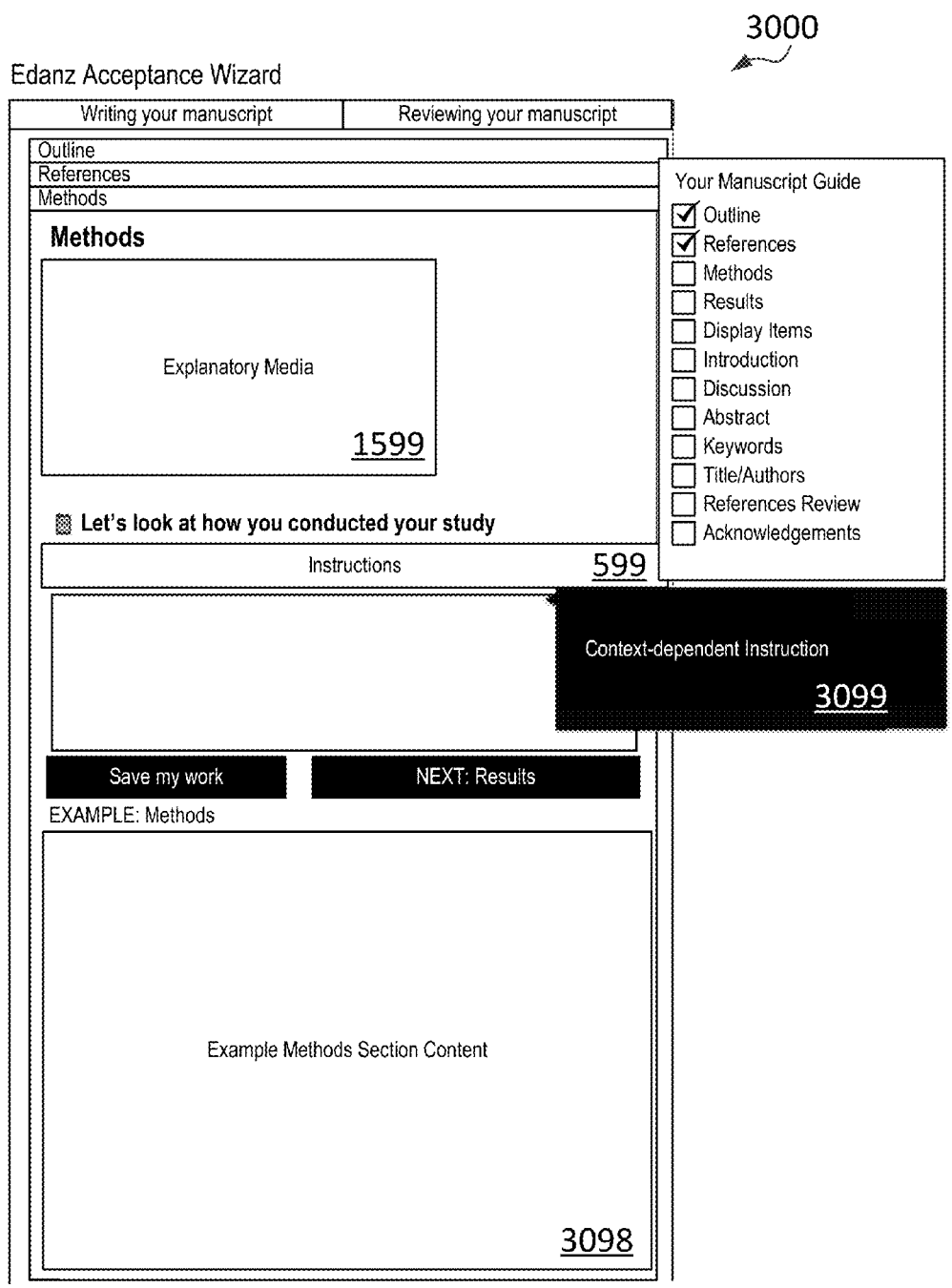
FIG. 30 shows an example user interface for aided methods section drafting.

The user is then prompted to begin drafting the methods section. FIG. 30 shows an example interface 3000 for methods section drafting. However, the user may at any time skip to other sections they might find easier to draft. This section is suggested as the first for drafting, because often it has been found to be the easiest to write given its factual nature. The AP tool may make suggestions during drafting. These suggestions may be provided in the form of context-dependent instructions 3099. For example, if the AP tool determines that article is an Immunohistochemistry manuscript, the user may be prompted to enter which antibodies were used. For immunohistochemistry this is a standard detail and should be included in the manuscript. Additionally, the AP tool may prompt a user to provide missing details on equipment (e.g. manufacturer (brands and models), speed, temperature and time, etc.). These are the type of details that editors and peer reviewers often find are omitted after submission. The example interface 3000 may also include example methods section content 3098 to help guide the user in their drafting.

The results section is the second suggested section. FIG. 31 shows an example interface 3100 for results section drafting. Similarly, instructions 599, explanatory media 1599, and context dependent instructions 3099 may be provided by the example interface 3100. The interface may further provide example results section content 3199.

Figure 32:
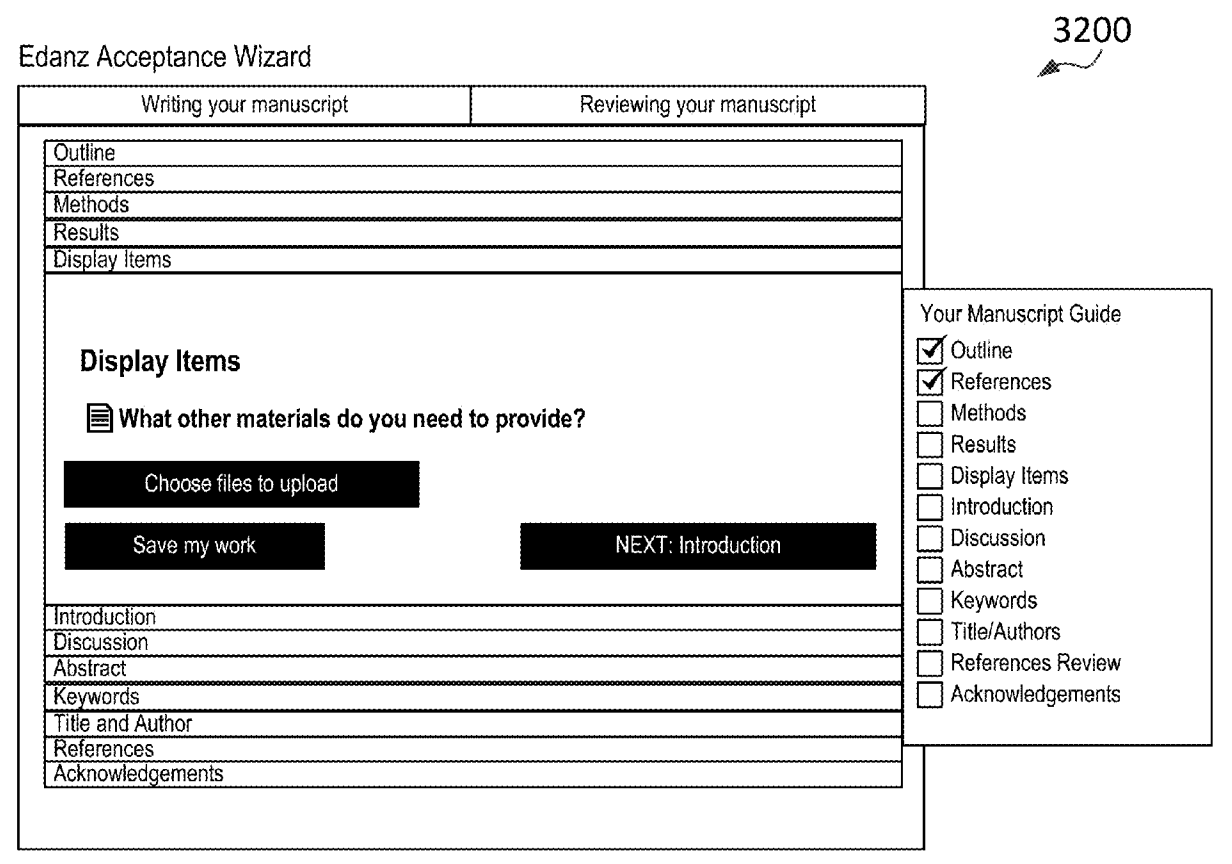

Following the drafting of the methods and results the user is prompted to upload images, figures videos or any supplementary content that their manuscript may require. FIG. 32 shows an example interface 3200 for display item uploading.

Figure 33:
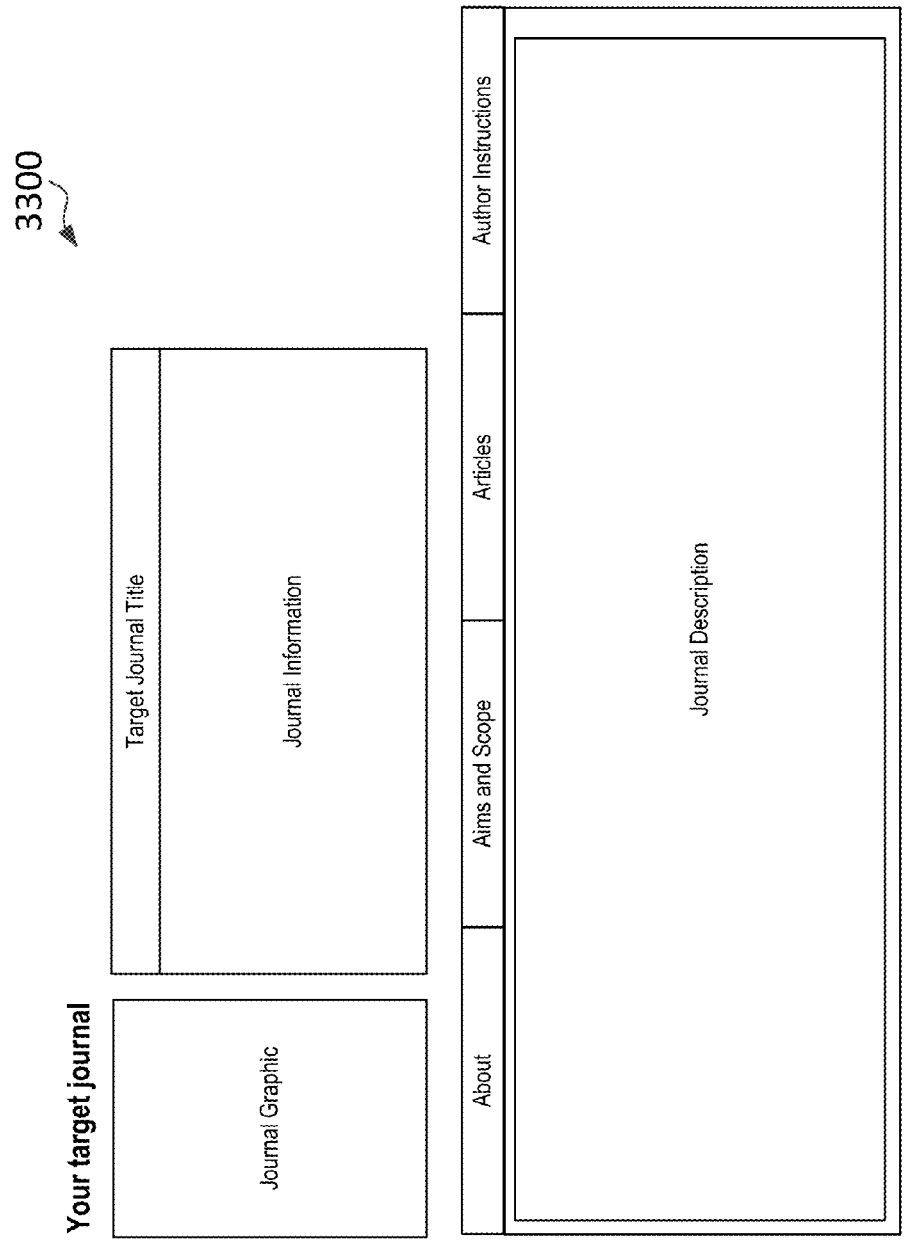
FIG. 33 shows an example user interface for target journal review.

The user may receive prompts to consider target journals at various times during the drafting process. The AP tool may use the prompts to alert a user of alternate target journals that may be more appropriate as more content is input by the user. FIG. 33 shows an example interface 3300 for target journal review.

The introduction section is the next suggested section. FIG. 33 shows an example interface 3300 for results section drafting. Similarly, instructions 599, explanatory media 1599, and context dependent instructions 3099 may be provided by the example interface 3300. For example, a context dependent instruction may include suggested further reading for the user. Further reading may include, for example, articles related to the subject matter of the manuscript, but not included in the references input for the project. The interface 3300 may further provide example introduction section content 3399.

Figure 35:
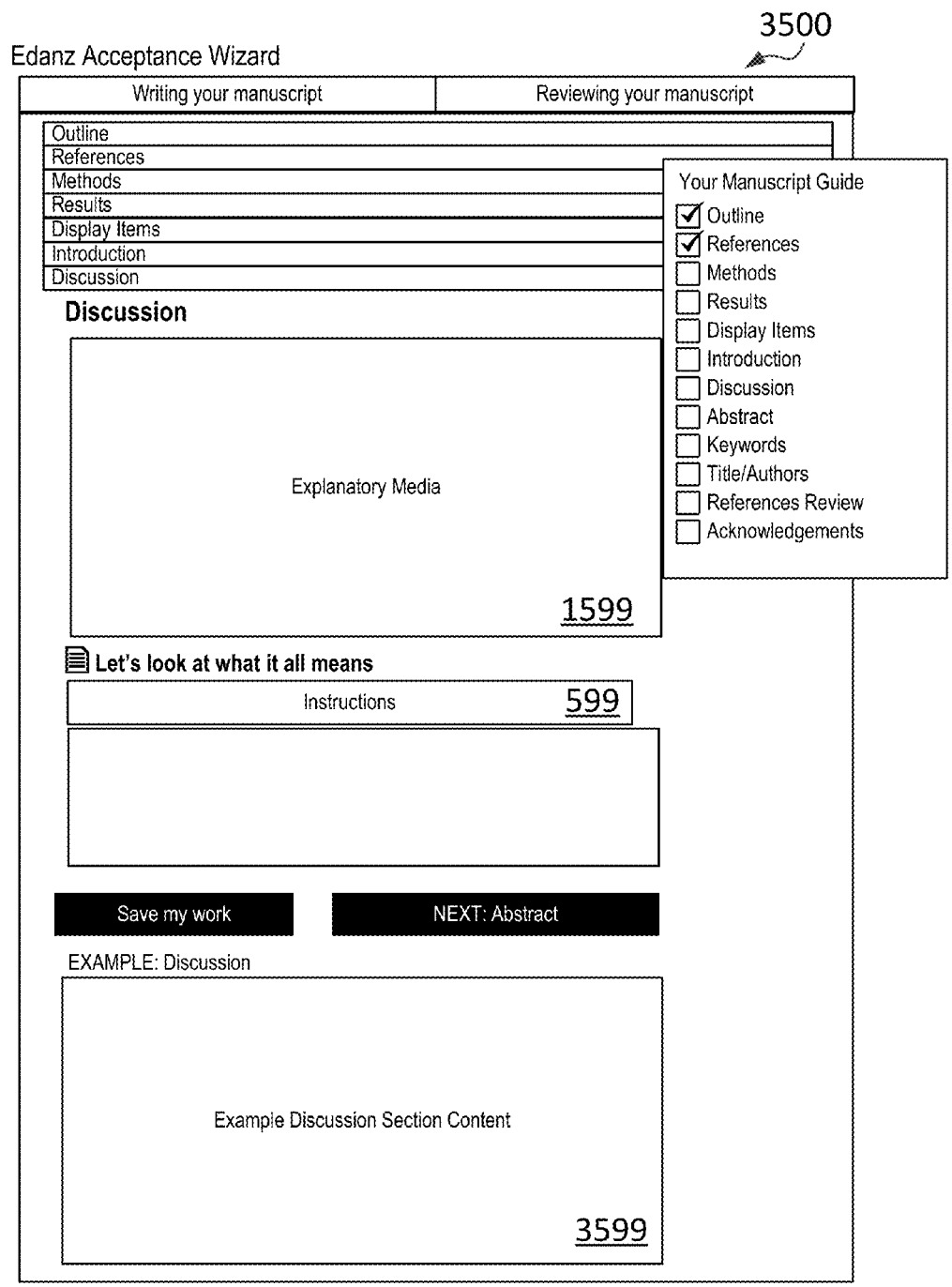
FIG. 35 shows an example user interface for aided discussion section drafting.

The discussion section is suggested for drafting following the introduction section. FIG. 35 shows an example interface 3500 for discussion section drafting. The example interface may include example discussion section content 3599. Although not shown, content-dependent instructions 3099 may also be provided by the AP tool.

FIG. 36 shows an example interface 3600 for abstract drafting. Following the drafting of the discussion section, the AP tool provides the user with a draft version of a possible abstract (or abstract outline) based on suggested inputs 3602, 3604, 3606, 3608 derived from the information already entered for the other sections. However, users may edit this provided abstract or write their own if appropriate.

Following the abstract, the AP tool suggests one or more keywords 3702 based on previously entered information using the example keyword interface 3700 show in FIG. 3700. In some cases, the system may use a keyword database. (e.g. Medical Subject Heading (MeSH)). However, keywords may also be based on the target journal selection or on keyword selections from related articles. In some cases, the journal has a set list of keywords, in such a case the recommendations are selected from that list. However, the user may select to use their own keywords. Further, upon submission to a journal, the AP tool may provide the original recommendations to a journal editor along with the user's selections. Thus, the journal editor may revise the choices made by the user if appropriate. The AP tool may act as a historical recorder by logging both the choices made by users and the options rejected by users. The interface 3700 may also provide example keyword title pairs from previously published related articles to help guide the user in keyword selection.

Similarly, the AP tool may provide title recommendations for a user through example interface 3800 shown in FIG. 38. The title suggestions may be presented as a context-dependent instruction 3099.

Example interface 3800 may also allow the user to review author information 3802 for the project. The author information may be included and properly formatted based on the registration information provided to the system. However, the users may edit this information.

FIG. 39 shows an example interface 3900 for reference review. Using a semantic analysis, the AP tool identifies sections of the manuscript which may need further support from a citation. For example, this may include a factual assertion made without a citation for support. The AP tool also cross-references the references provided by the user with a database to determine if more up-to-date references are available. The more up-to-date references are provided as suggestions 3902. The AP tool may also suggest further related reading (e.g. manuscripts, reports, articles) to ensure the user is aware of the latest work in the field. The AP tool may also provide example references 3999 to help guide the user.

The user may be prompted by the AP tool to enter acknowledgements for the project via example interface 4000 shown in FIG. 40. Example acknowledgements 4099 may be provided to help guide the user in properly acknowledging funding sources and collaborators.

Figure 41:
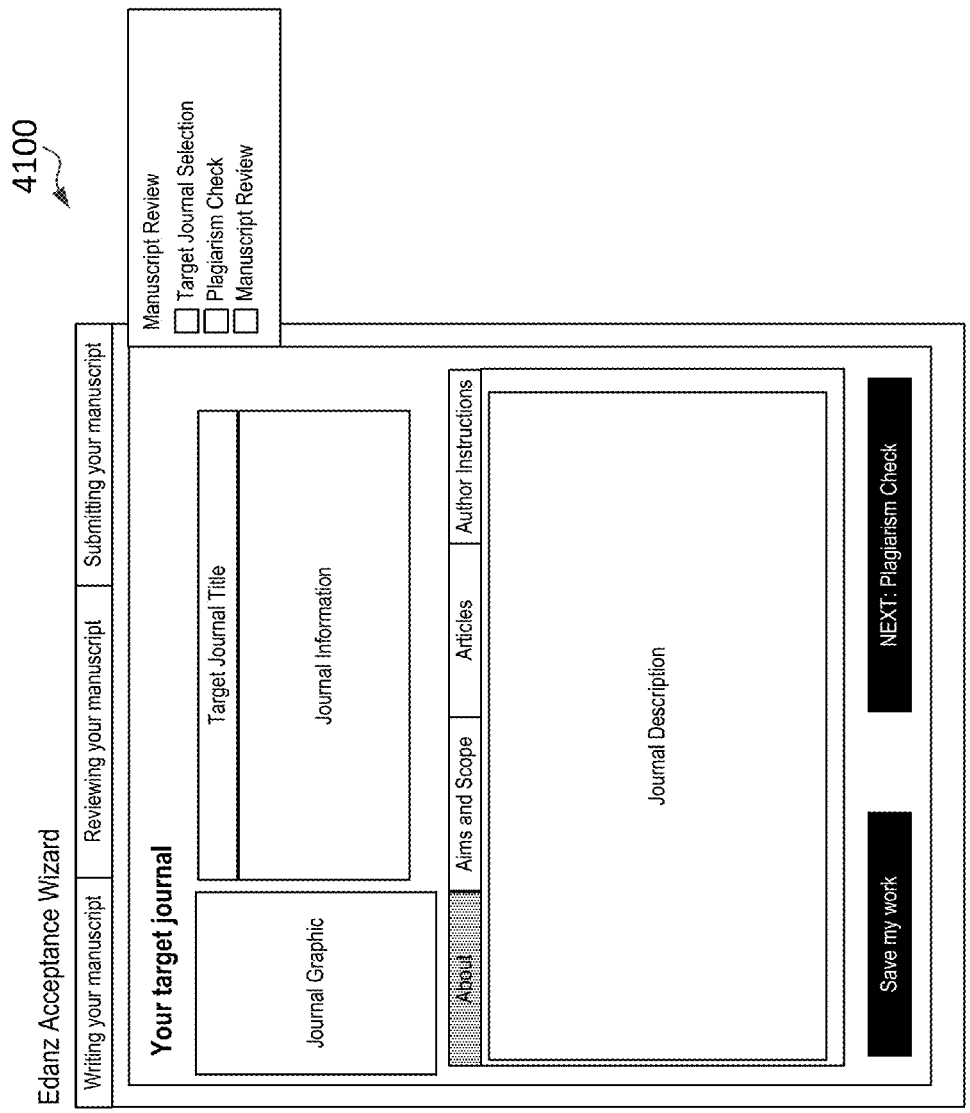
FIG. 41 shows an example user interface for target journal review.

FIG. 41 shows another example interface 4100 for target journal review.

Figure 42:
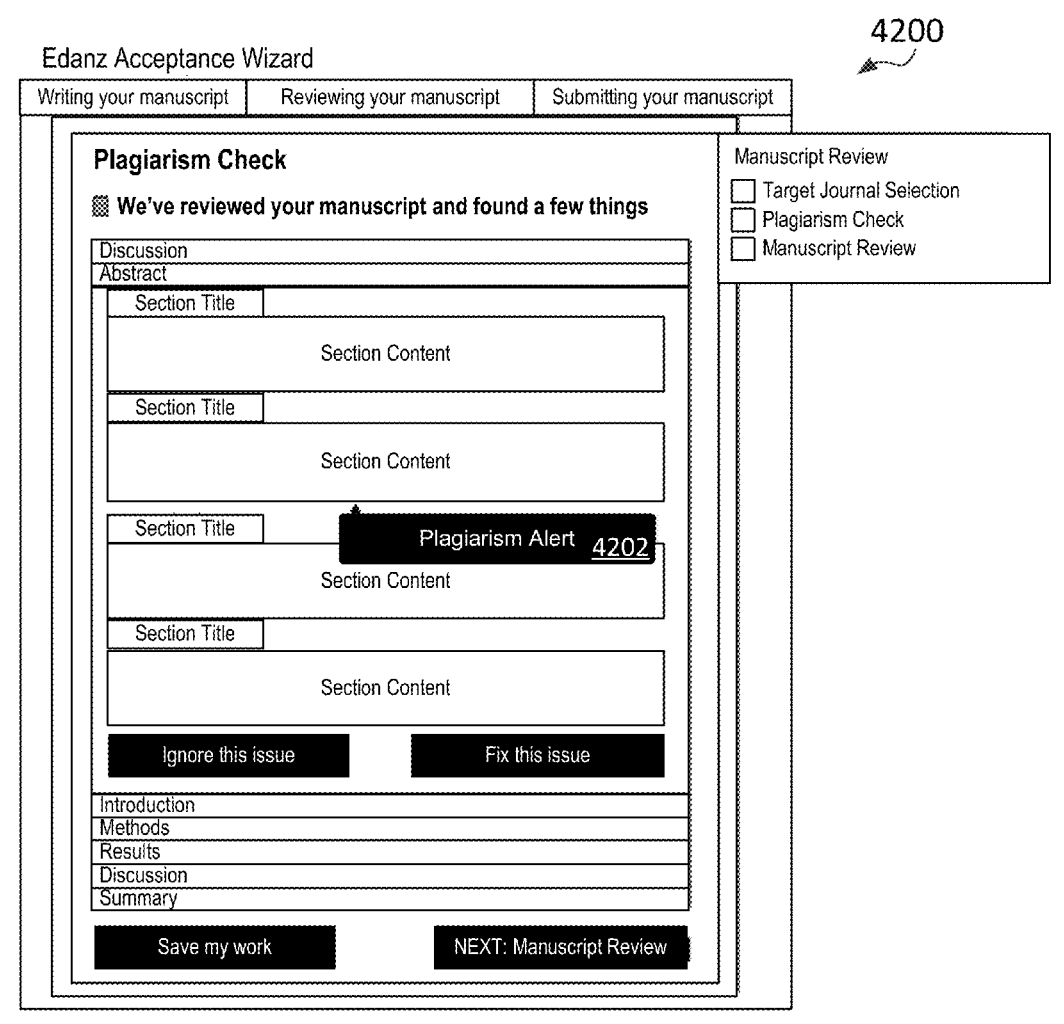

The AP tool may execute a review of manuscript including a plagiarism check (FIG. 42). The manuscript is scanned for portions that do not seem original (e.g. passages are similar to what has been published before) and do not have a citation entered. The AP tool flags 4202 these portions as questionable, possibly plagiarized, text. The user is presented with the flagged portions 4202 via interface 4200. This gives the user a chance to reconsider and edit these portions as necessary.

In some cases, the AP tool may integrate such functionality from a third party service. For example, the Cross-Check service based on the iThenticate tool (a service provided by CrossRef) provides a plagiarism analysis system which may be integrated into the AP tool.

This also is gives the author an initial evaluation of the originality of the manuscript as compared to what is already published in the relevant literature. Thus, if the user has written something that is not plagiarized, but is already published in other journals they have the opportunity to take a new direction with what they are writing. This increases their chances of publication success.

Figure 43:
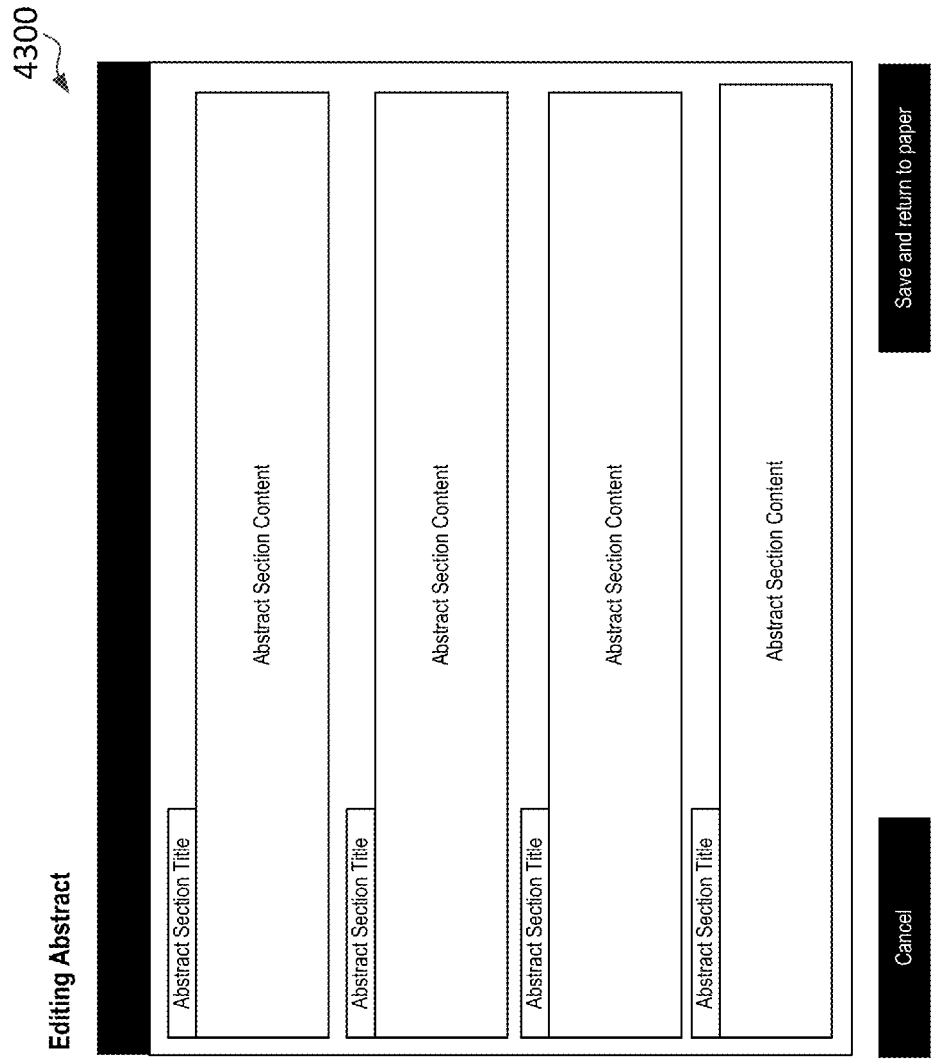
FIG. 43 shows an example user interface for project review.

For the review of the manuscript, the user may be given the opportunity of review various portions of the project. FIG. 43 shows an example interface for abstract section review 4300.

Figure 45:
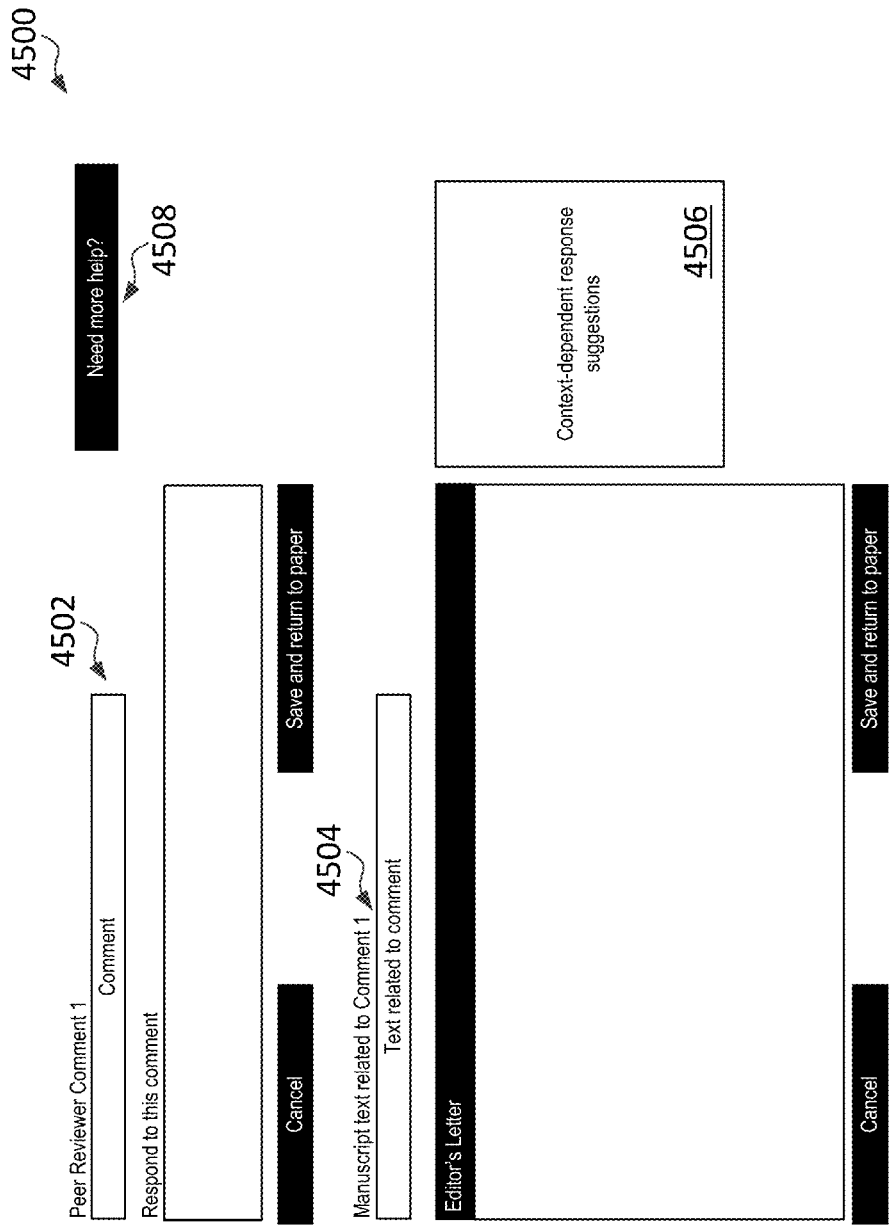
FIG. 45 shows an example user interface for aided peer review comment response.
Figure 46:
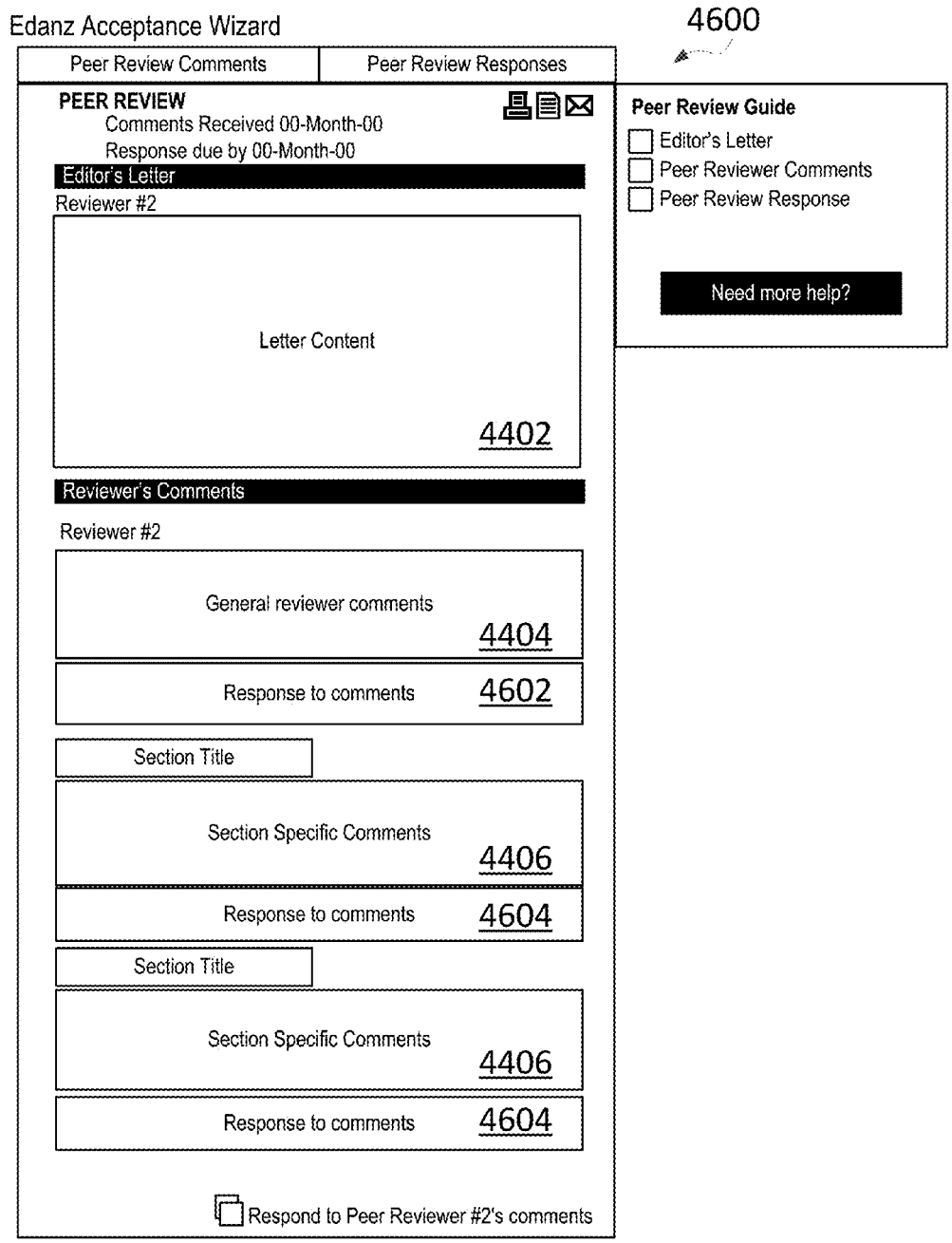
FIG. 46 shows an example user interface for viewing peer review comments and user responses.

The AP tool also supports integrated peer review within the same user environment in which the project is drafted. FIG. 44 shows and example interface 4400 for user viewing peer review comments. The interface may provide a user with letter content 4402 from journal staff and general 4404 and section-specific 4406 comments from the peer reviewer. FIG. 45 shows an example interface 4500 for peer review comment response. The through interface 4500 the user may view individual peer review comments 4502 paired with the manuscript text 4504 associated with the comment 4502 Further, the AP tool may aid user by presenting related material and references that may help in responding to the reviewer comment. In addition, the AP tool may use language processing to identify central points of a peer reviewer comment and make suggestions for response 4506. This aids the user in identifying the peer reviewer's primary concerns. Peer review comments may be pulled directly from publisher sources. FIG. 46 shows an example interface 4600 for reviewing peer review comments. Through example interface 4600 user may review peer review comments 4404, 4406 and responses 4602, 4604.

Alternatively or additionally, peer reviewers may log on the AP tool environment and comment on documents using the interface of the AP tool system.

Figure 47:
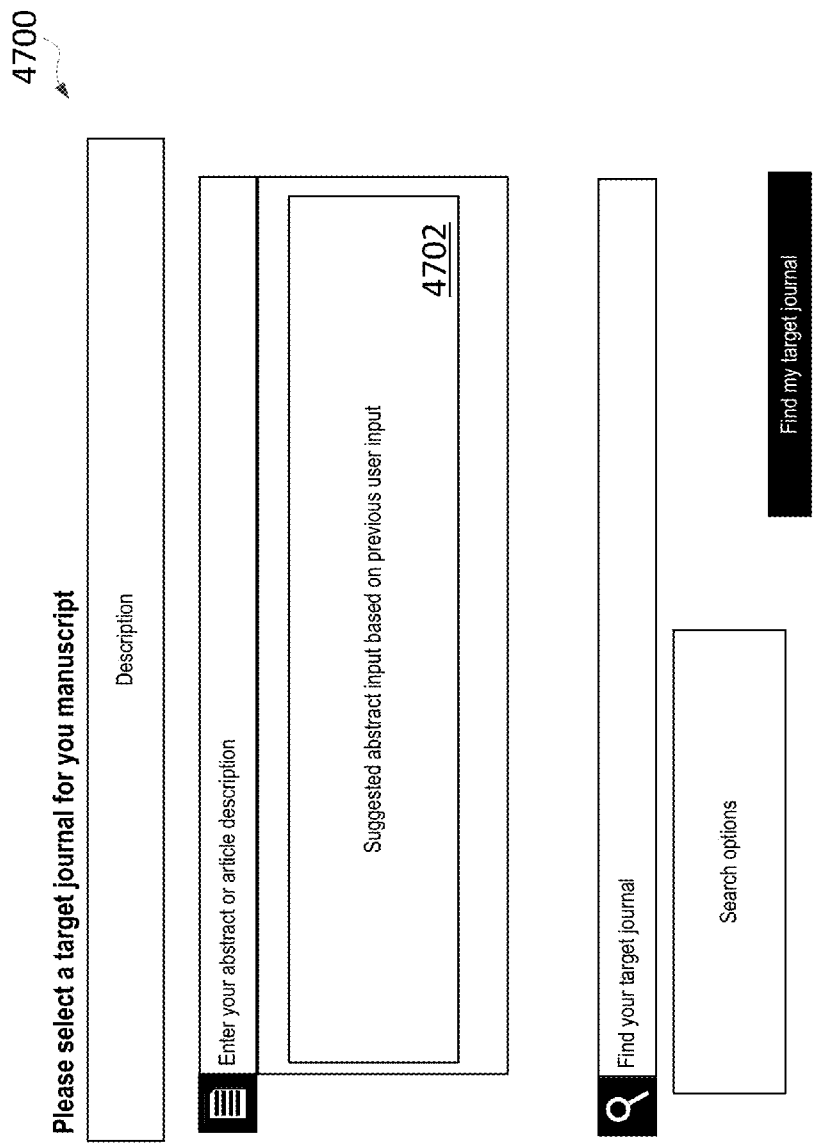
FIG. 47 shows an example user interface for aided journal selection.

FIG. 47 show an example interface 4700 for aided target journal selection. Suggested abstract text 4702, based on previous user input, may be automatically entered into the search field. However, the user may edit this test prior to searching. Additionally or alternatively, a target journal search, including a confirmatory search such as one described here, may be performed as a background process by the AP tool.

Figure 48:
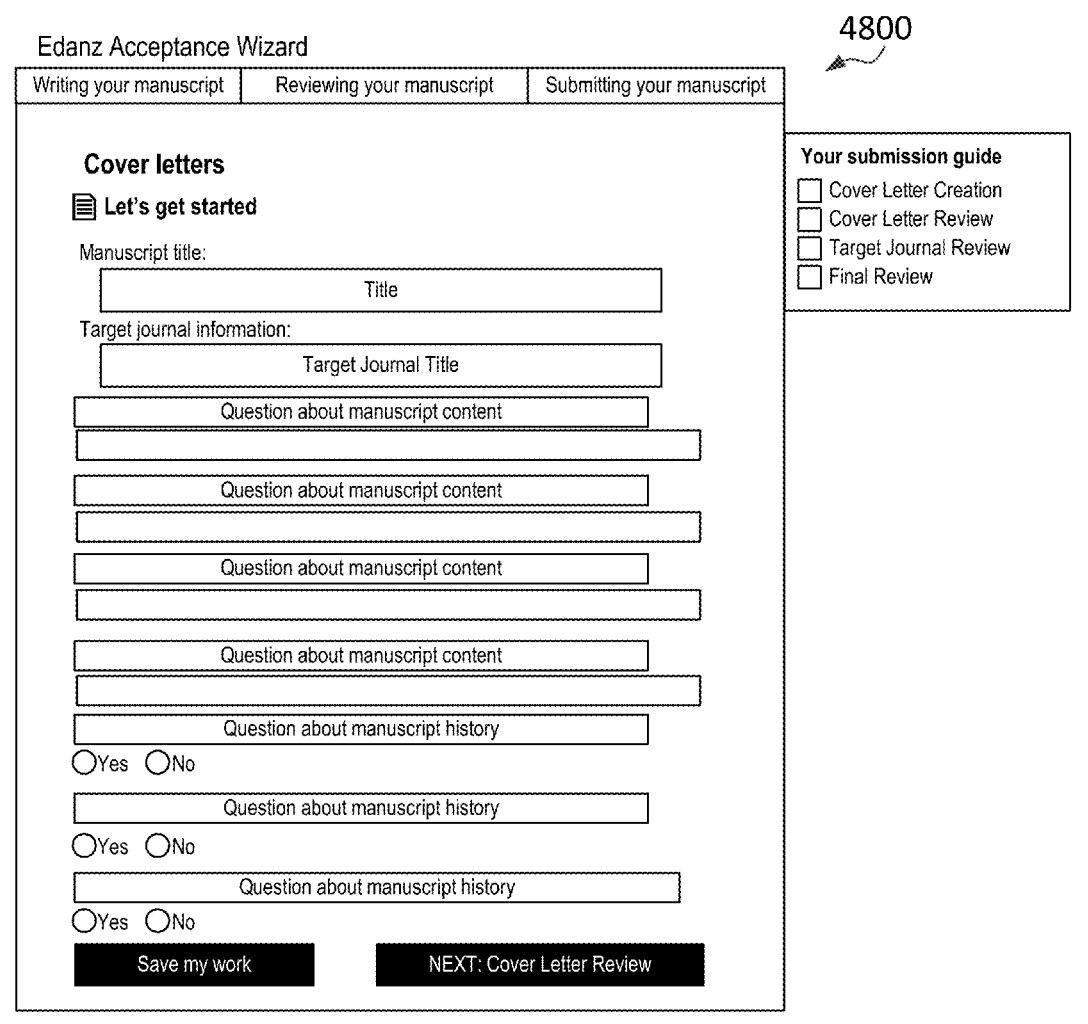
Figure 49:
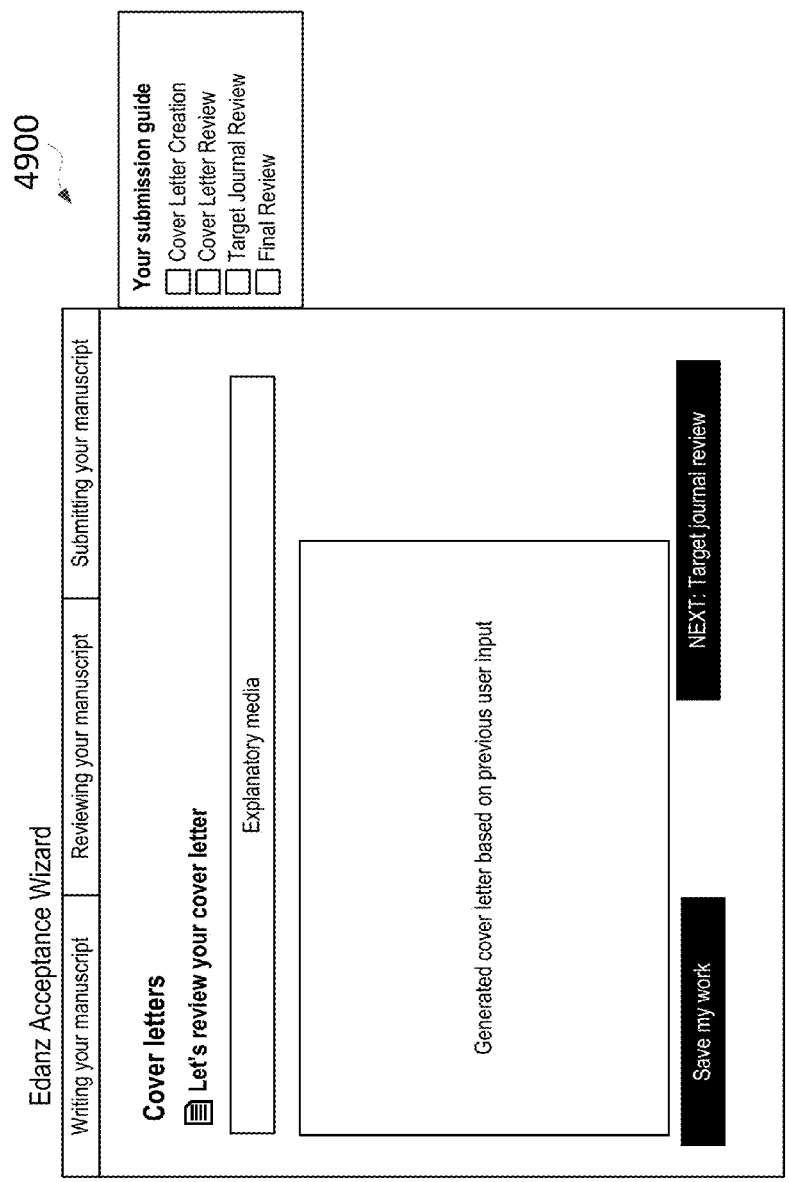
FIG. 49 shows an example user interface for cover letter review.

The AP tool may aid in cover letter generation for a publication submission. FIG. 48 shows an example interface 4800 for aided cover letter drafting. The interface may present the user with short questions 4802 to guide the automated creation of the letter. Further historical questions 4804 about the project may be presented to ensure eligibility for submission to the target journal. The AP tool may create a suggested cover letter based on the content the user has entered and the short questions 4802. FIG. 49 shows an example interface 4900 for cover letter review. From the example interface 4900, the user may review this suggested letter and make edits or create their own cover letter.

Figure 50:
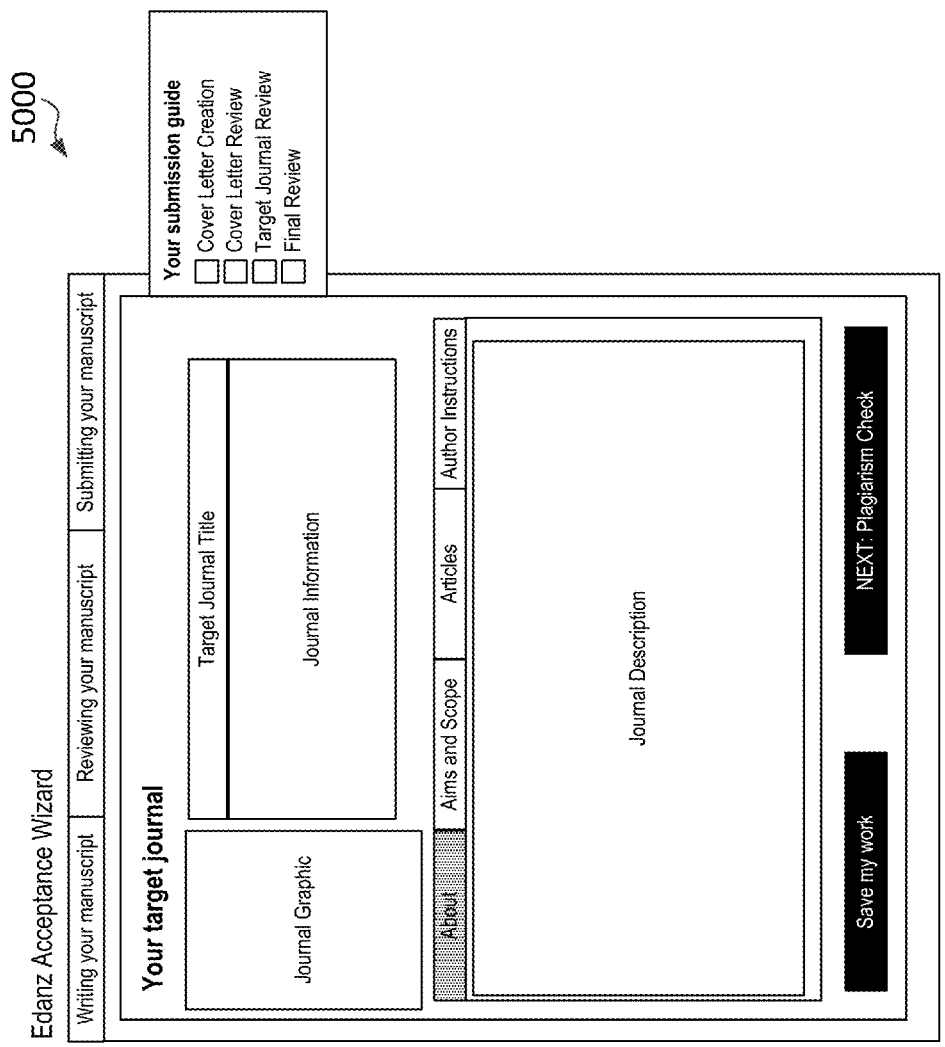
FIG. 50 shows an example user interface for target journal review.

FIG. 50 shows another example interface 5000 for target journal review.

FIG. 51 show an example interface 5100 for final summary review. The summary 5102 is provided to the user showing how each section is assessed. The user is also apprised of any outstanding issues that may need resolution. In some implementations, the final summary review prompt may include outline-viewing-mode content to facilitate review of the subject matter of the various sections within the manuscript.

Figure 52:
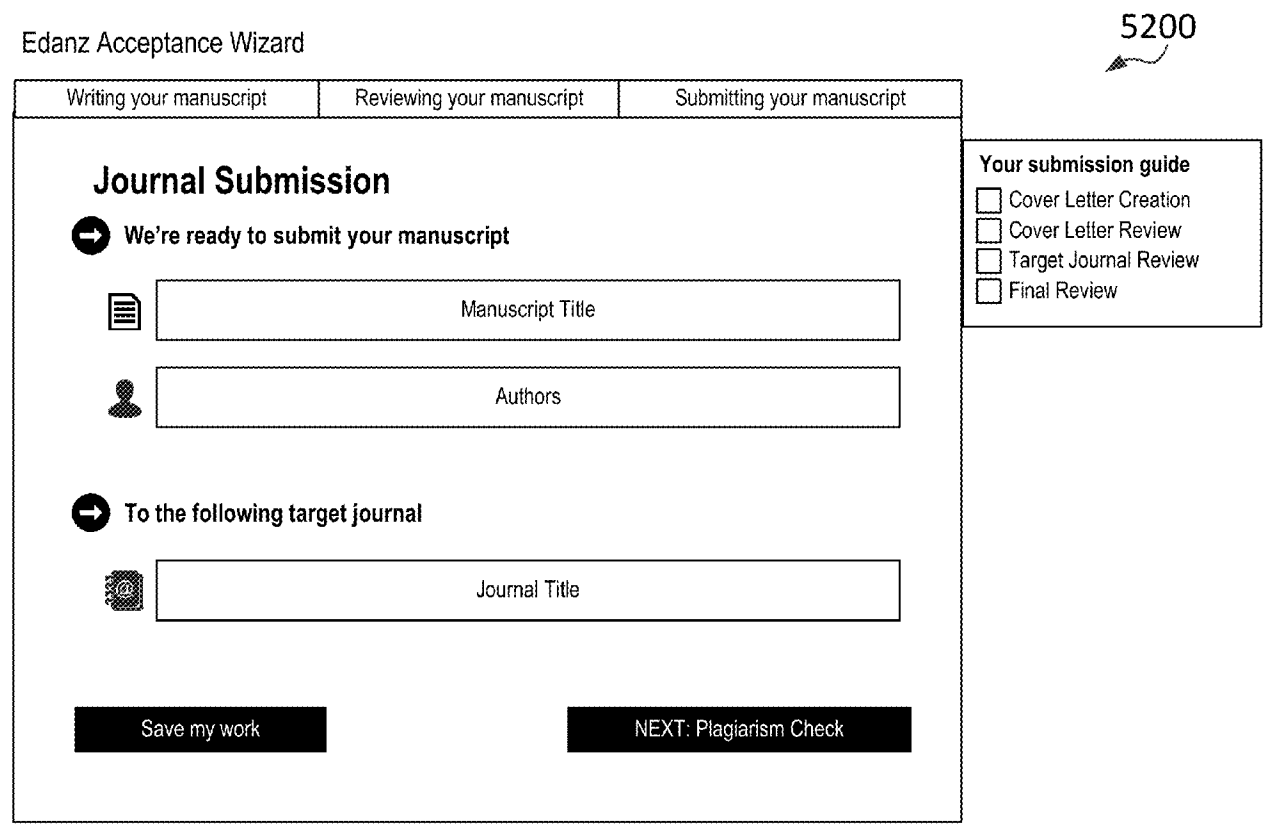

Once readied for submission, the manuscript and cover letter (and any other relevant materials) are packaged for submission to the target journal. In some implementations, the submission may be submitted to the journal directly through the AP tool. FIG. 52 shows an example interface for submission of a completed project. However, the user may have the AP tool output the materials and prepare their own submission.

In various implementations, the basis of the AP tool is an adaptive workflow, which provides context dependent prompts to the user to aid in the drafting of a manuscript. Further the AP tool auto-generates portions of the manuscript to save the user time in drafting, and ensure compliance with journal guidelines.

In medicine, such an adaptive workflow may include a stage related to ethics because it is required for clinical papers (e.g. a check to ensure that the author specifies informed patient consent was implemented). With respect to target journal requirements, items such as abstract style or length limits may need specific stages to be added to the workflow to be properly addressed. The AP tool also may adapt depending on a user's current position along their path to a successful publication. For instance, if a user's manuscript was rejected by the first journal, the AP tool adapts and offers the user a different scenario via a different target journal. The AP tool then adapts the manuscript to that new target. Further, the AP tool may use feedback from the previous rejection to improve the current publication scenario via adaptive responses. If the rejection and/or peer review process identified problem areas, the AP tool may then offer suggestions to remedy the problem area. The AP tool may extract such reasons directly from an uploaded or integrated pre-review report. Further, the user, journal editor, and/or peer reviewer may manually enter such reasons for rejection. Examples of such problem area may include language problems, poor/inappropriate journal selection, lack of support for conclusions, etc. Accordingly, the AP tool may suggest editing services to improve language quality, journal selection tools or services, and/or further experimentation prior to re-submission. In addition, the AP tool may adapt its presentation according to the stage at which the user is in in their career. For younger users at the start of their publication career may be shown more educative resources; whereas, more senior users may only be presented with brief review resources as a reminder (or information on where requirements for a particular publication may have changed recently). The AP tool also adapts depending on paper type. For example, each of a case study, original study or review has different associated suggestions and a different path is presented for each.

Further, the AP tool may identify problem areas related to the rejection and maintain a record of the response to each area by the user. In some cases, upon resubmission of an article to a journal the AP tool may be configured to generate a response report (or other output) showing how the issues underlying a rejection have (or have not) been remedied.

The AP tool may also use the underlying issues to guide subsequent target journal section. For example, if a user's article is rejected from journal A for reasons X, Y, and Z, but journal B does not require X to be fixed, the AP tool may recommend journal B for future submission. Thus, the workload of the user may be reduced. Further, the AP tool may make a record of instances in which a journal is avoided for submission requirements. The AP tool may then provide the journal with report detailing reasons why users failed to resubmit or to make a first submission. This may aid journal administrators to avoid overly onerous/unpopular requirements.

User Dashboards

Figure 54:
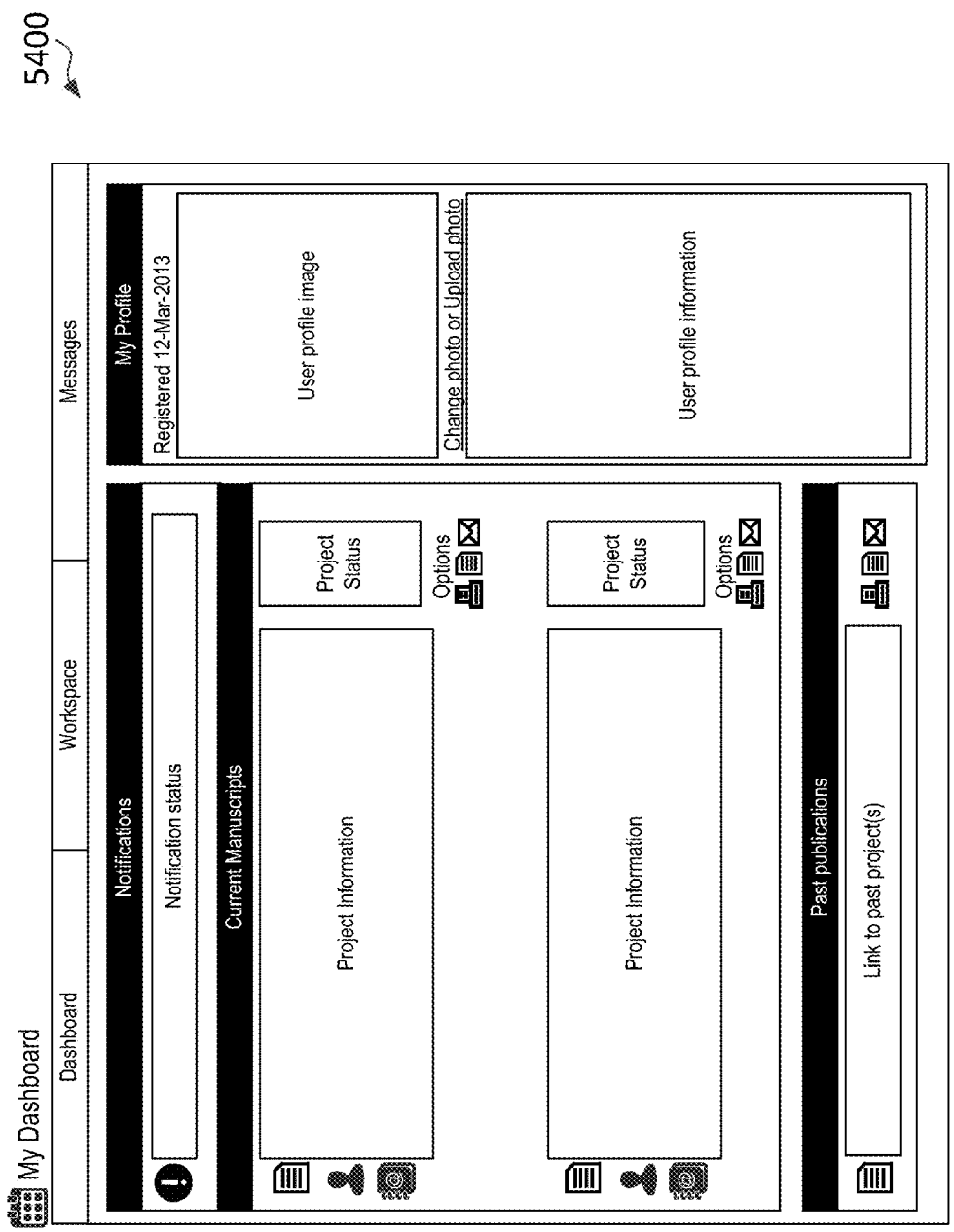
FIG. 54 shows a second user dashboard interface.
Figure 55:
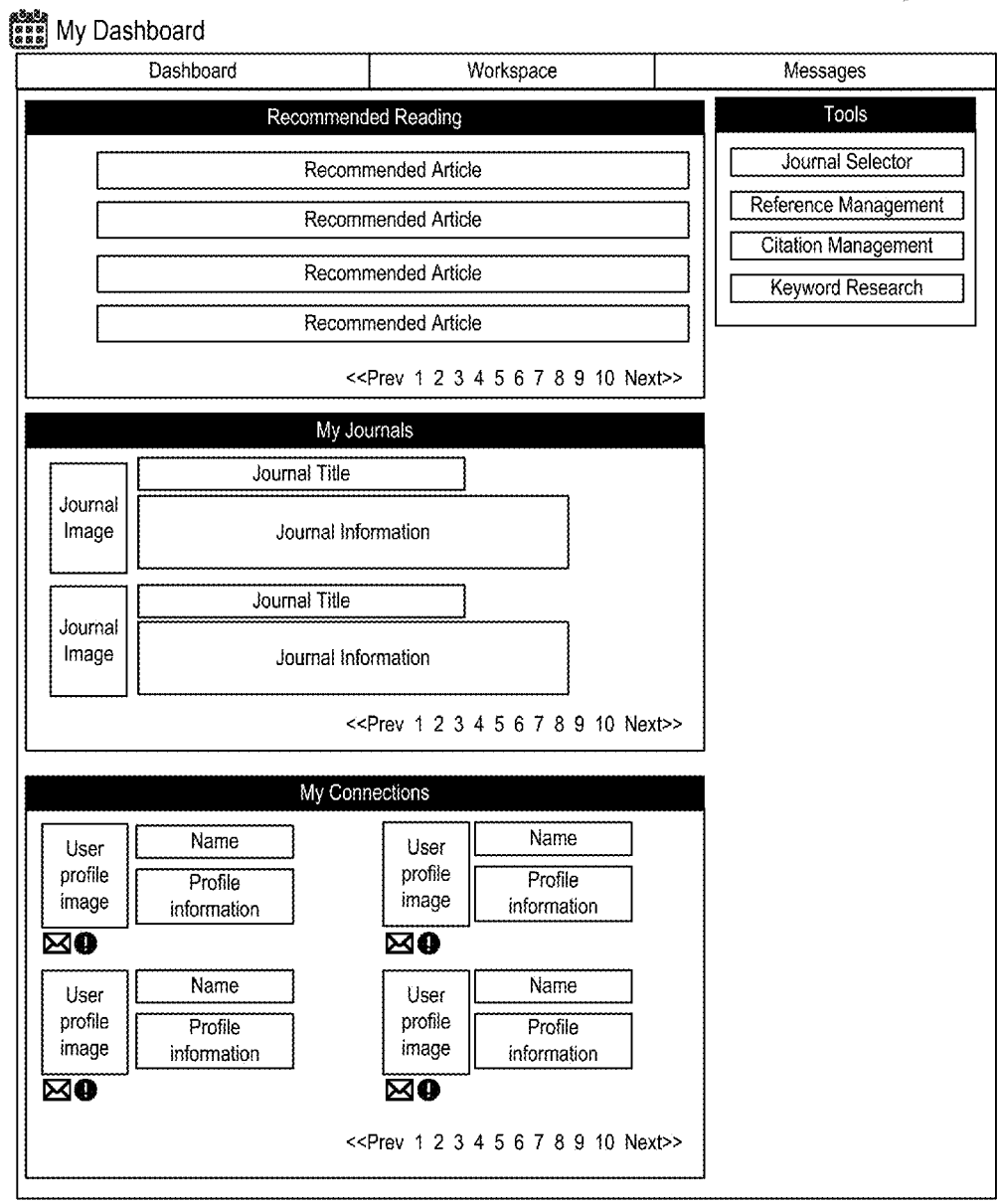
FIG. 55 shows an example user workspace in a dashboard interface.

The dashboard at the user level is the starting point and the communication hub for the user to track progress of any manuscript they are developing, regardless of publisher, they have sent out, or have had returned after peer review. FIG. 53 shows a user dashboard interface 5300. FIG. 54 shows a second user dashboard interface 5400. The user dashboard may facilitate such monitoring by providing notifications of due dates (e.g. for peer review comments, or author responses, etc.). It is also a space for users to organize some of the information for their manuscript. The AP tool may also recommend reading and articles for the user based on their field of research, target journal or institution. FIG. 55 shows an example user workspace 5500 within a user dashboard interface. The user workspace 5500 may be used by the AP tool to present the recommended reading and articles to the user. The dashboard acts in some respects as a home page for the user and allows them to manage their manuscripts and their interaction with the AP tool itself. The user dashboard also provides information about how the user's articles have been referenced and cited. In addition, if a user has access to a dashboard through an organization (university, publisher, company, etc.) the user may be able to port their data to another organization. For example, if a user switches universities the user may not have to rebuild their AP tool user dashboard.

The dashboard may also include tools allowing a user to produce public relations (and/or reputation management) materials. For example, the dashboard may include a tool to generate a press release with summaries of projects for users and/or a resume/CV based on user information and publication history.

Figure 56:
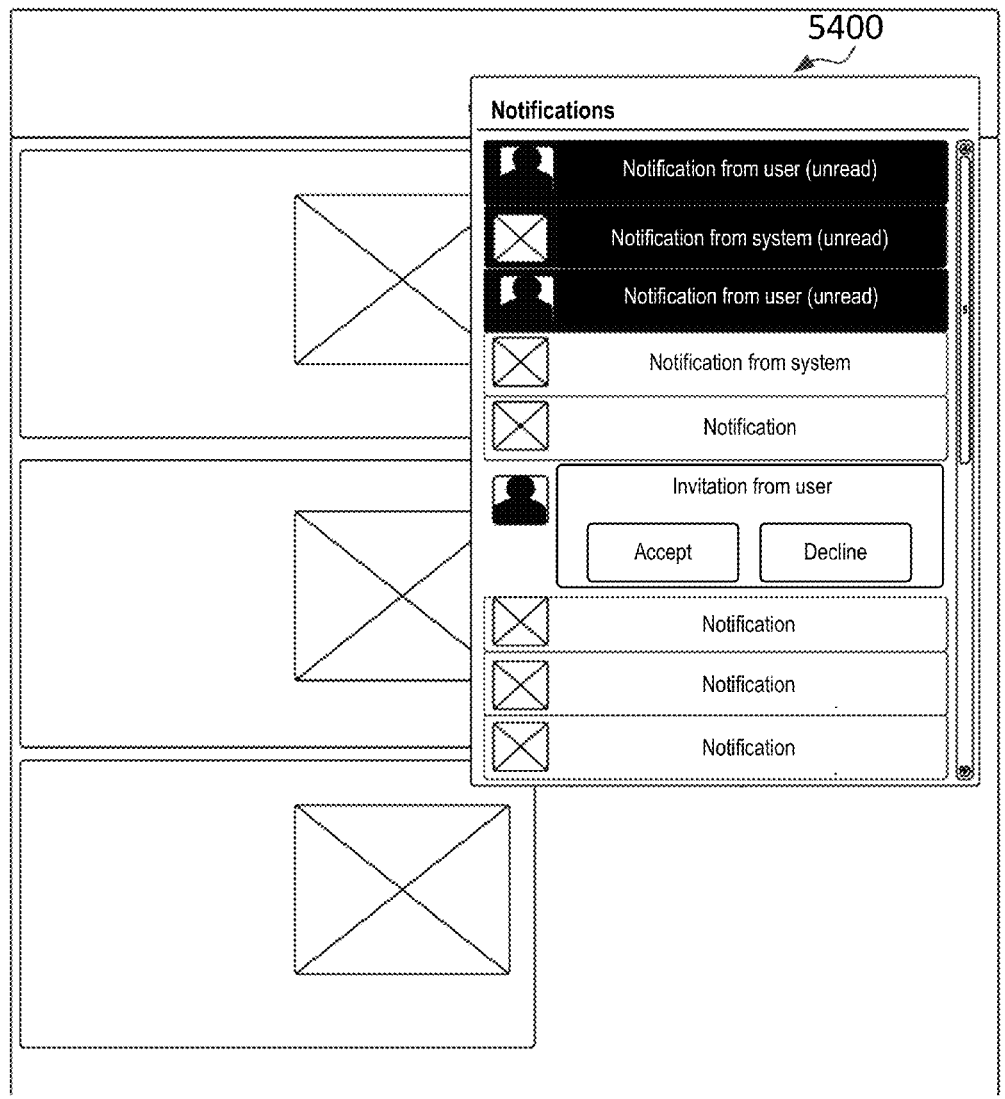
FIG. 56 shows an example interface for notification handling.

FIG. 56 shows an example notification handling interface 5600. The user dashboard or other interfaces may support a pop-out notification interface allowing the user to view notifications within the AP tool system. The notification interface 5600 may include system notifications, messages from other users, notifications of project deadlines, changes, status changes, and/or other project related notifications. Further, the notification interface may allow the user to view invitations to join projects from other users.

Administrative Dashboard

Figure 57:
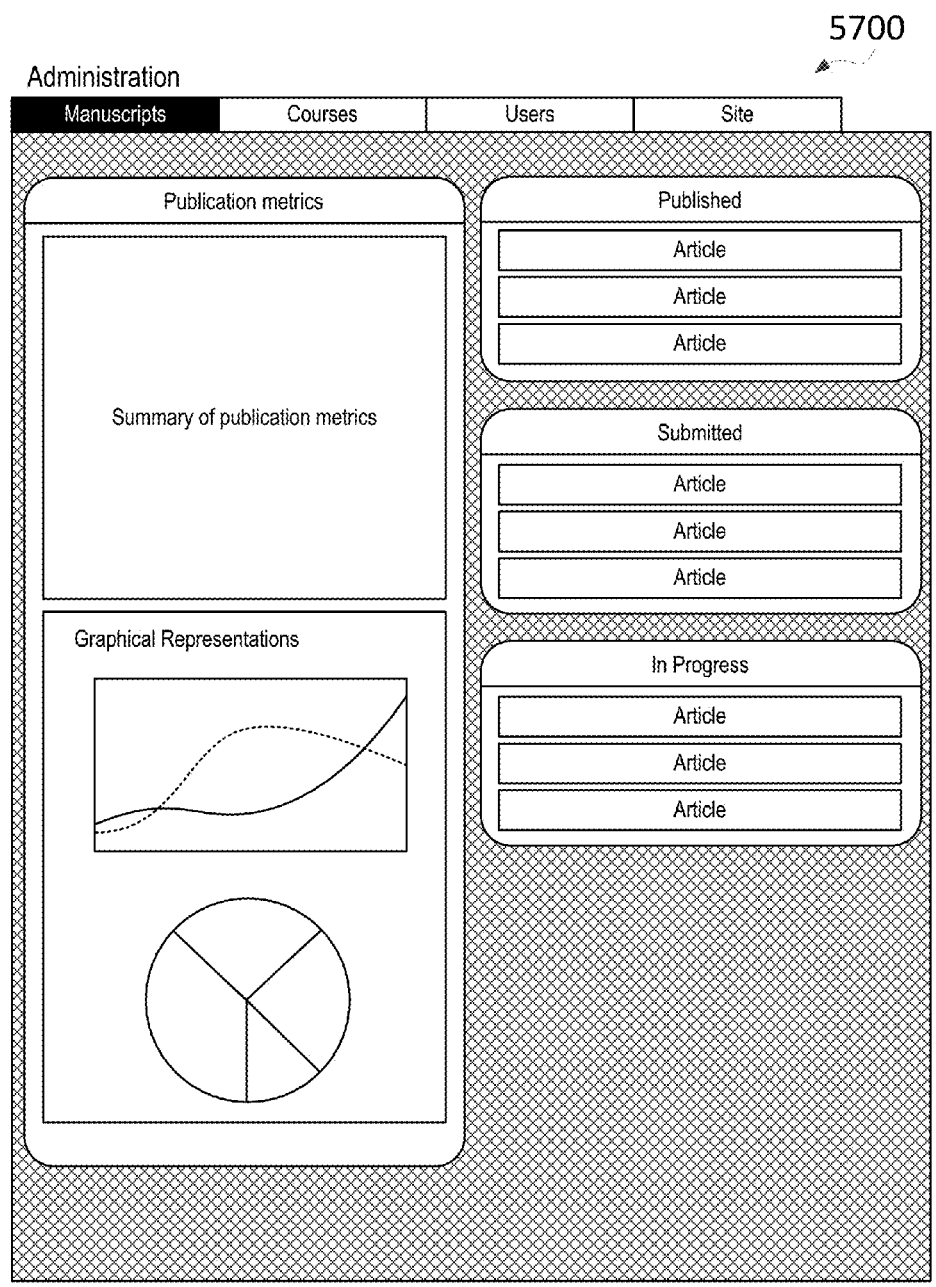
FIG. 57 shows an example administrative dashboard.

The administrative dashboard is designed to assist lab administrators, heads of departments, librarians, various faculty and funding organizations. FIG. 57 shows an example administrative dashboard 5700. It allows these users to track publication output from all their researchers. Departments can use this dashboard in decisions on future funding. For example, one researcher or group may have a large output which is shown via the dashboard. The funding administrators may identify this group and push more funds into that area during their funding timeframe. It can also be used to track the productivity of researchers and can help boards within institutions make decisions about academic promotion based on the level of output the results. For example, notifications may be setup to provide alerts when individuals/groups meet predetermined goals, when major events occur, or after periods of inactivity for certain individuals/groups. In addition, monitoring may be further assisted through the generation of reports or snapshots of output levels associated with the monitored individuals/groups. For example, such snapshots may include information on productivity for a specific time period, and/or stage of completion for current (and past) projects.

Social Media

The AP tool provides post-publication opportunities for an author to promote their manuscript through social media.

At its initial setup, the AP tool asks users for their social media links. However, this may be added or updated at any time. The manuscript be automatically promoted by the AP tool or the user may be provided with the links and tools to control the promotion of their articles through their dashboard.

AP Tool Layout

FIG. 58 show an example interface layout 5800 for the AP tool. The user may login to the site via the AP home interface 5802. At first login, the user may be prompted to create a profile 5820. Once a profile is created, or on subsequent logins the user may be given access to their notification interface 5806 and their profile interface 5820. The user may also be taken to their project/papers interface 5840 of resources interface 5860. The notification interface 5806 may be accessed from various interfaces after login. Users may also access support 5808 and AP tool information 5810.

From the project/papers interface 5840, a user may access papers on which the user is collaborating. Various contextual interfaces 5850 may be presented to the user depending on the status of the project viewed by the user.

From the resources interface 5860, users may access informational and interactive tools for project and/or research support. The resources interface may allow users to browse journal information pages 5862 or perform searches on a journal selector tool 5864. Users may also browse other user profiles and select collaborators for projects at the collaborator interface 5866. The user may also view suggested articles 58 and references 5872. The user may review media from different AP tool drafting interfaces 5870.

In various implementations, the AP tool may draw from the assets available through the interface 5820, 5840, 5860 to support various other interfaces implemented by the AP tool. For example, media assets available through resources interface 5860 may be used in various ones of the section drafting interfaces discussed above.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (for example, subroutines) of a single program, separate programs, distributed across several memories and processors, or implemented in many different ways, such as in a library, such as a shared library (for example, a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed:

1. A product comprising:
   a computer readable medium other than a transitory signal; and
   instructions stored on the computer readable medium, the instructions, when executed by a processor, configured to cause the processor to:
   determine a target publication responsive to first subject matter of a project;
   based on the target publication and the first subject matter, determine a guideline prompt for the project, the guideline prompt configured to aid a user to address a guideline for the target publication;
   receive a response to the guideline prompt; and
   responsive to second subject matter within the response to the guideline prompt:
   determine natural language text that incorporates the second subject matter for inclusion into the project; and
   determine whether to change the guideline prompt to the user.

2. The product of claim 1, wherein the instructions are further configured to cause the processor to semantically analyze the response to the guideline prompt determine the second subject matter.

3. The product of claim 2, wherein the instructions are further configured to cause the processor to perform a text match search to semantically analyze the response to the guideline prompt.

4. The product of claim 1, wherein the instructions are further configured to cause the processor to determine another target publication for the project responsive to the second subject matter.

5. The product of claim 1, wherein the guideline comprises an identification of a compulsory section for the target publication.

6. The product of claim 5, wherein the instructions are further configured to cause the processor to:
   store at least of portion of the project as a text block associated with the compulsory section; and
   format the text block according to a formatting guideline for the target publication.

7. The product of claim 1, wherein the guideline comprises a formatting rule for the target publication.

8. The product of claim 1, wherein the instructions are further configured to cause deployment of a virtual server, the virtual server configured to establish a browser session with a client device, the client device associated with the user.

9. The product of claim 1, wherein the instructions are further configured to cause the processor to:
   determine that the first subject matter comprises unsupported subject matter;
   responsive to the unsupported subject matter determine a reference; and
   generate a prompt configured to suggest the reference to the user.

10. A method comprising:
    at host server circuitry in data communication with a client device via a network interface:
      determining a target publication for a project;
      responsive to the target publication, determining a guideline prompt for the project, the guideline prompt configured to aid a user in addressing a guideline for the target publication;
      causing a display, at the client device, of the guideline prompt;
      receiving, via the network interface, a response to at least the individual one of the prompts from the client device;
      semantically analyzing the response to determine subject matter; and
      responsive to the subject matter:
        determining a natural language text block that incorporates the subject matter for inclusion into the project; and
        determining whether to change to the guideline prompt for the user.

11. The method of claim 10, determining a change to the set of prompts comprises:
    determining the subject matter comprises unsupported subject matter; and
    responsive to the unsupported subject matter, generating a reference prompt configured to suggest provision of a supporting reference.

12. The method of claim 11, wherein generating a reference prompt comprises:
    determining a matching reference to support the subject matter; and
    adding the matching reference to the reference prompt as a suggested reference.

13. The method of claim 10, further comprising:
    detecting a reference within the project; and
    generating a reference prompt configured to alert the user that the reference is out-of-date.

14. The method of claim 10, wherein determining whether to change to the guideline prompt comprises determining another target publication for the project.

15. The method of claim 10, wherein the guideline comprises a template of a basic article structure for the target publication.

16. The method of claim 15, wherein the guideline prompt comprises a request for input for a section of the template.

17. A system, comprising:
    network interface circuitry configured to:
      establish a first communication link with a publication server; and
      establish a second communication link with a client device; and
    host server circuitry in data communication with the network interface circuitry, the host server circuitry configured to:
      determine a target publication for a project, the target publication associated with the publication server;
      access a compulsory guideline defined for the target publication, the compulsory guideline defining an automatic ground for rejection from the target publication;
      analyze the project to determine whether the compulsory guideline has been addressed;
      when the compulsory guideline has not been addressed:
        cause, via the second communication link, a display of a suggestion prompt configured to suggest a third party action to address the compulsory guideline; and
      when the compulsory guideline has been addressed:
        cause, via the second communication link, a display of an indication that the project has met the compulsory guideline; and
        cause, via the second communication link, a display of a request prompt configured to request permission to submit the project to the target publication; and
        responsive to reception of permission to submit the project, cause the network interface circuitry to transmit at least a first portion of the project to the publication server via the first communication link.

18. The system of claim 17, wherein:
    the compulsory guideline comprises a grammatical accuracy guideline; and
    the third party action comprises submission of a portion of the project to a manuscript editing service.

19. The system of claim 17, wherein:
    the compulsory guideline comprises a peer review requirement; and
    the third party action comprises submission of at least a second portion of the project for review by an outside reviewer.

20. The system of claim 17, wherein the host server circuitry is further configured to:
    after transmission of the first portion of the project, receive a review indication from the publication server; and
    responsive to the review indication, submit at least a second portion of the project for review by an outside reviewer.

* * * * *